(12) United States Patent
Coffland

(10) Patent No.: US 7,527,485 B2
(45) Date of Patent: May 5, 2009

(54) ROTATIONALLY INDUCED VARIABLE VOLUME CHAMBERS

(76) Inventor: Donald W. Coffland, 4103 Sunnyside Ave., N., Seattle, WA (US) 98103

( * ) Notice: Subject to any disclaimer, the term of this patent is extended or adjusted under 35 U.S.C. 154(b) by 61 days.

(21) Appl. No.: 11/006,407

(22) Filed: Dec. 7, 2004

(65) Prior Publication Data

US 2006/0118078 A1    Jun. 8, 2006

(51) Int. Cl.
*F03C 4/00*    (2006.01)
*F04C 18/00*    (2006.01)

(52) U.S. Cl. .................. 418/196; 418/68; 418/209; 123/246

(58) Field of Classification Search ............. 418/68, 418/196, 197, 209; 123/241, 246
See application file for complete search history.

(56) References Cited

U.S. PATENT DOCUMENTS

| 3,439,654 A | 4/1969 | Campbell, Jr. |
| 3,709,199 A | 1/1973 | Molyneaux |
| 4,390,331 A | 6/1983 | Nachtrieb |
| 6,139,290 A | 10/2000 | Masterson |

FOREIGN PATENT DOCUMENTS

FR    2652391 A1    3/1991

JP    52-029514 A    3/1977

OTHER PUBLICATIONS

[http://www.pumps.org/public/pump_resourecs/pump_pdf/dynamic_dfs.htm] PDF document title: Figure 3.8—Single lobe pump.
[http://www.pumps.org/public/pump_resources/pump_pdf/dynamic_pdfs.htm] PDF document title: Figure 3.9—Three lobe pump.
[http://www.pumps.org/public/pump_resources/pump_pdf/dynamic_pdfs.htm] PDF document title: Figure 3.12—Internal gear pump (without crescent).
[http://www.pumps.org/public/pump_resources/pump/_pdf/dynamic_pdfs.htm] PDF document title: Figure 3.13—Circumferential piston pump.

*Primary Examiner*—Theresa Trieu
(74) *Attorney, Agent, or Firm*—Peloquin, PLLC; Mark S. Peloquin, Esq.

(57) ABSTRACT

Methods and apparatuses are disclosed that create variable volume chambers. A method includes synchronizing rotation of a plurality of geometrical elements to create a first chamber with the plurality of the geometrical elements and a housing. A continuous portion of the first chamber, defined by the plurality of geometrical elements, permits a volume of the first chamber to be varied. An apparatus includes a first chamber disposed between a plurality of geometrical elements and a housing. The plurality of geometrical elements are configured for synchronized rotation within the housing and a continuous portion of the first chamber, defined by the plurality geometrical elements, permits a volume of the first chamber to be varied. A plurality of chambers can be formed with a plurality of geometrical elements configured for synchronized rotation within a housing.

3 Claims, 47 Drawing Sheets

FIGURE 24

$$R_{SPHERE} = \frac{2*R1*(2-\sqrt{3}) + 2*R2*(1+\sqrt{3})}{2*\pi}$$

2400

ROTATIONALLY INDUCED VARIABLE VOLUME CHAMBERS

BACKGROUND OF THE INVENTION

1. Field of Invention

The invention relates generally to methods and apparatuses that process fluids or gases and, more specifically, to methods and apparatuses for extracting useful work from gases subsequent to combustion or to methods and apparatuses that move gasses or liquids.

2. Art Background

Processing liquids and gases during the extraction of useful work, such as in an internal combustion engine or while transferring a liquid or a gas from point A to point B, has been the subject of much activity. For example, deriving useful work from the combustion of fuels has been of value to mankind for many years. Internal combustion engines are known in the art and are used in a wide range of devices, such as grass trimmers, automobiles, and large scale earth moving equipment such as trucks, bull dozers, etc.

Many of the current internal combustion engines are based around a reciprocating piston design or a translating rotor. In a reciprocating piston design, a piston travels back and forth in a cylinder moving to and fro, reversing direction at each end of its range of motion within the cylinder. A piston has a finite mass and thus energy is required to change the direction of the piston within the cylinder as the piston travels to and fro. This energy is deducted from the energy developed during the operation of the engine and necessarily reduces the amount of energy available as useful work output of an engine. Energy directed to non-useful work output contributes to the inefficiency of an engine.

Internal combustion engines typically burn fossil fuels and expel products of combustion. Fossil fuels exist in limited quantities and are viewed as non-renewable resources. Society is in general agreement that improved fuel efficiency is a useful and beneficial goal. Since fossil fuels exist in limited supply, the current fuel efficiency of such engines may present a problem. Additionally, the products of combustion are a source of environmental pollution and may also present a problem.

Internal combustion engines also employ valves to interrupt the flow of gas during the various cycles of operation, such as intake and exhaust valves. Thus, gas accelerates and decelerates during the operation of the engine resulting in non-uniform flow. Such non-uniform flow can contribute to engine inefficiency via the inertial effects described above in conjunction with the piston or the translating rotor as well as other effects not discussed herein. Such non-uniform flow may present a problem.

Pumps are known and used in the art to move materials such as viscous materials, fluids, and/or gasses from one location to another. Pumps are made using the reciprocating piston design discussed above. Work input to a pump is required to operate the pump. Therefore, energy inefficiency can result from a reciprocating piston pump design. Similarly, diaphragm pumps employ a moving diaphragm which changes direction continuously, resulting in an expenditure of energy to change the direction of the diaphragm; such inefficiency may present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like numerical references indicate similar elements, however, like alpha or alphanumeric references do not indicate similar elements, from drawing to drawing, unless so indicated.

FIG. 24 shows a relationship between the circumferential shape of FIG. 22A and a sphere.

DETAILED DESCRIPTION

In the following detailed description of embodiments, reference is made to the accompanying drawings in which is shown by way of illustration, specific embodiments in which the invention may be practiced. These embodiments are described in sufficient detail to enable those of skill in the art to practice the invention. In other instances, well-known structures and techniques have not been shown in detail in order not to obscure the understanding of this description. The following detailed description is, therefore, not to be taken in a limiting sense, and the scope of the invention is defined only by the appended claims.

Apparatuses and methods are disclosed to create a variable volume chamber. In various embodiments, a variable volume chamber is configured as an internal combustion engine, a pump, a compressor, etc.

Figure 1:
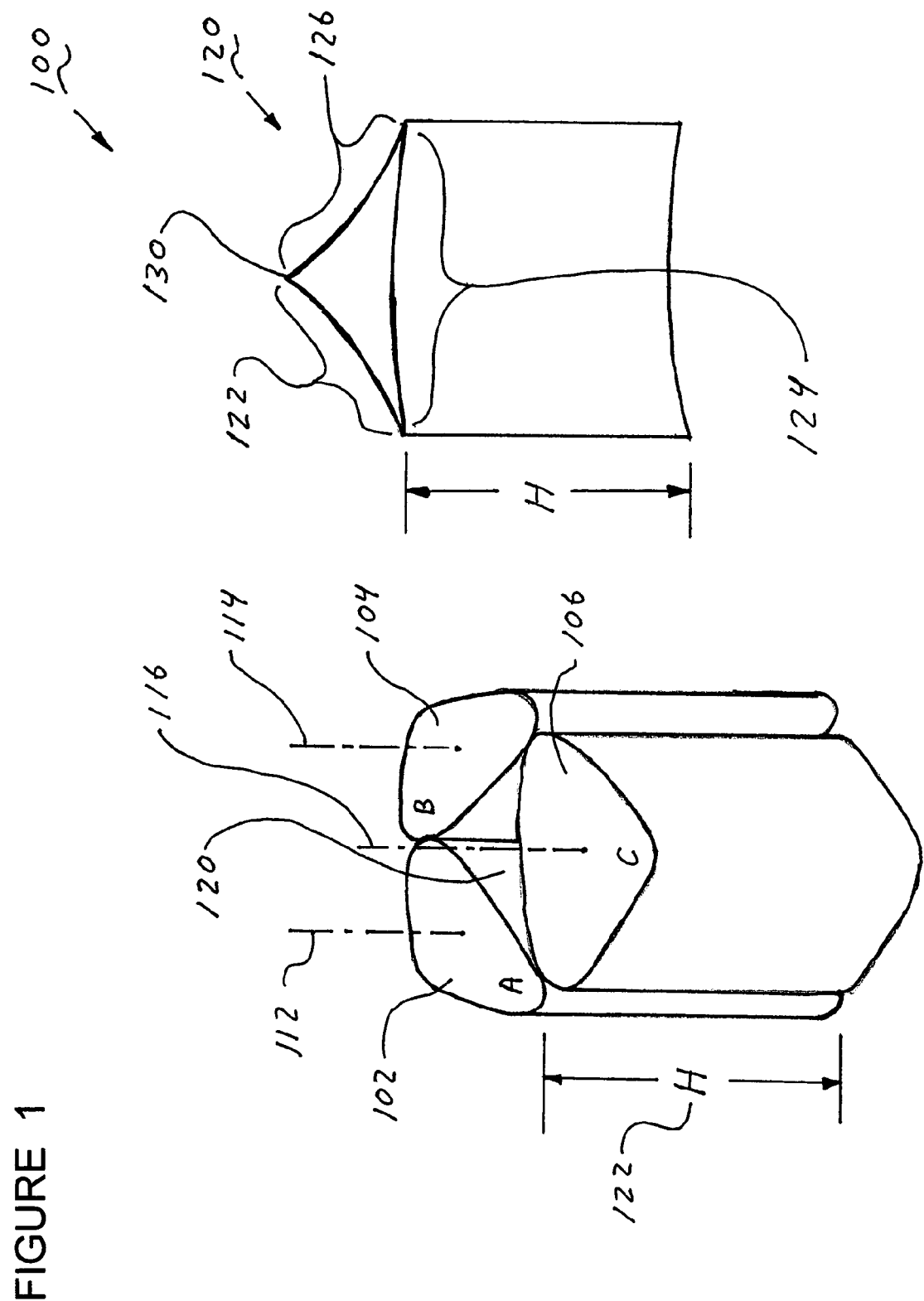
FIG. 1 illustrates one embodiment of an isometric view of a variable volume chamber.

FIG. 1 illustrates one embodiment of an isometric view of a variable volume chamber generally at 100. With reference to FIG. 1, three geometrical elements, 102, 104, and 106 are configured for rotation about their respective axis, which is indicated by axes 112, 114, and 116. A chamber 120 is created by the location of the geometrical elements 102, 104, and 106 proximate to each other. The chamber 120 has a height 122, indicated by letter H.

The chamber 120 has a circumferential shape 130, which is created by contributions from the adjacent geometrical elements 102, 104, and 106. The geometrical element 102 has contributed a portion 122 to the circumferential shape 130 of the chamber 120. Similarly, the geometrical element 104 has contributed a portion 126 to the circumferential shape 130 of the chamber 120 and the geometrical element 106 has contributed a portion 124 to the circumferential shape 130 of the chamber 120.

The chamber 120 is enclosed by a housing (not shown), which will be described below in conjunction with the figures that follow. The geometrical elements are supported for rotation in various ways, such as but not limited to, with shafts, bearing, rollers, grooves, etc. For example, a shaft can be located in the position indicated by the axis 112 to facilitate rotation of the geometrical element 102. In like manner, the other geometrical elements 104, and 106 can be configured for rotation on shafts suitably positioned.

Figure 2:
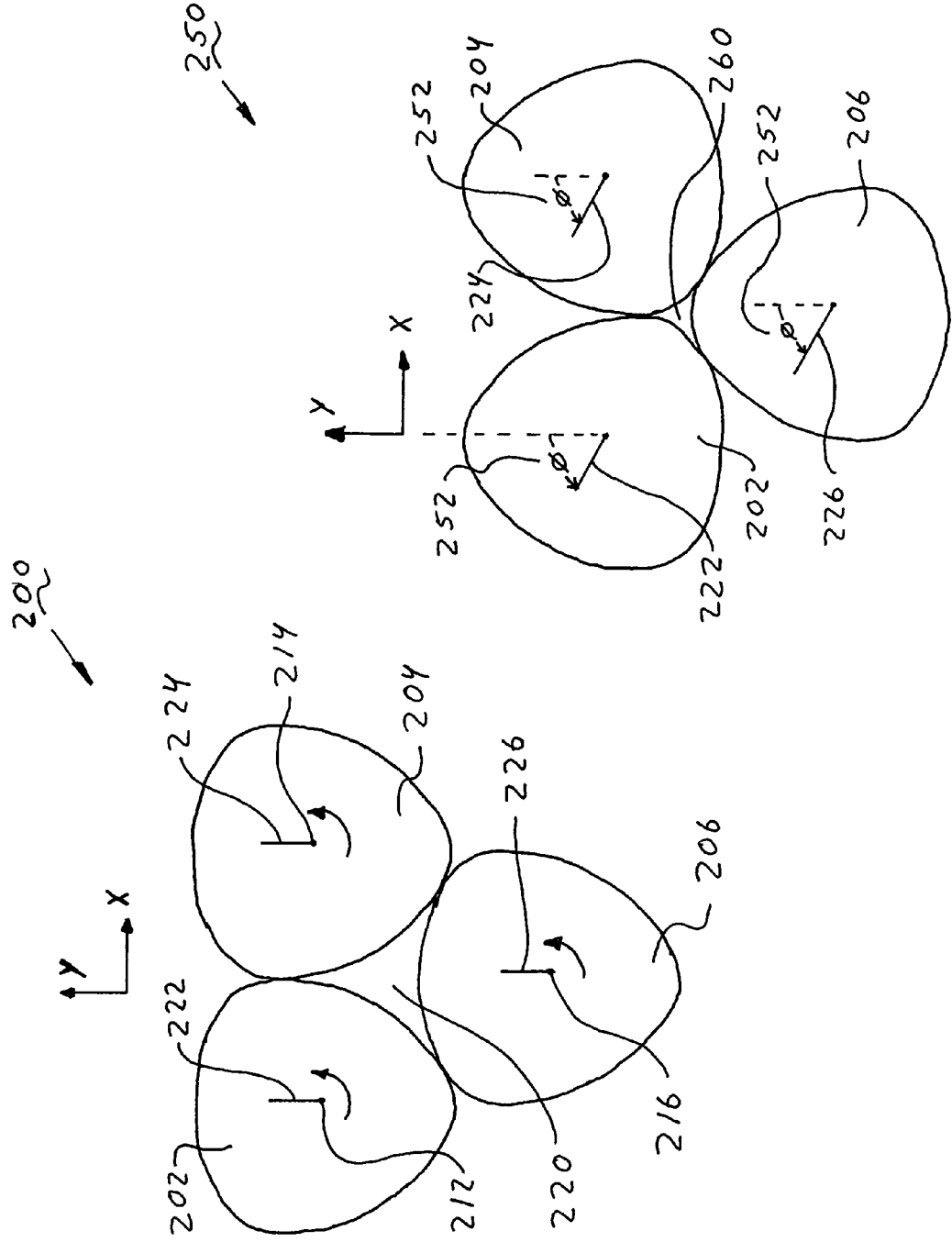
FIG. 2 illustrates one embodiment of a plan view of a variable volume chamber.

FIG. 2 illustrates one embodiment of a plan view of a variable volume chamber. With reference to FIG. 2, a first position 200 and a second position 250 of three geometrical elements are shown generally therein. In the first position 200, a geometrical element 202 has an axis indicated by 212. A reference mark 222 is indicated to facilitate understanding by the reader and to indicate relative alignment between geometrical elements. Similarly, a geometrical element 204 has an axis 214 and a reference mark 224 and a geometrical element 206 has an axis 216 with a reference mark 226.

The reference mark 222 can coincide with a principle axis of the geometrical element or the reference mark can be arbitrarily placed on the geometrical element. To facilitate understanding, the reference mark 222 as well as reference marks 224, and 226 are located parallel to the respective principle axis of a given geometrical element.

The geometrical elements 202, 204, and 206 are designed and configured for synchronized rotation about axes selected to provide contact or near contact between adjacent elements and to define a chamber indicated by 220 in the first position 200. It will be noted that FIG. 2 presents a plan view and, as such, the depth of the geometrical elements is not indicated within FIG. 2 or in any other figure in which a plan view is presented; therefore, the chamber 220 will have a height that is not shown within the figure. The height, however, will be similar to the height 122 (H in FIG. 1) or is adjusted for a particular application. It will be noted that the relative magnitude of the height H is arbitrarily depicted in FIG. 1 and that a variety of different heights are contemplated within the teachings presented herein and that no limitation is implied by the height displayed in FIG. 1.

Returning to FIG. 2, position 250 illustrates the three geometrical elements 202, 204, and 206 after they have experienced a counterclockwise rotation, indicated by an angle 252. The three geometrical elements experience synchronized rotation at the same angular speed which ensures the same initial condition of contact or near contact; thereby changing a volume of a chamber 260 that results in position 250 relative to the volume of the chamber 220 in position 200.

Figure 3:
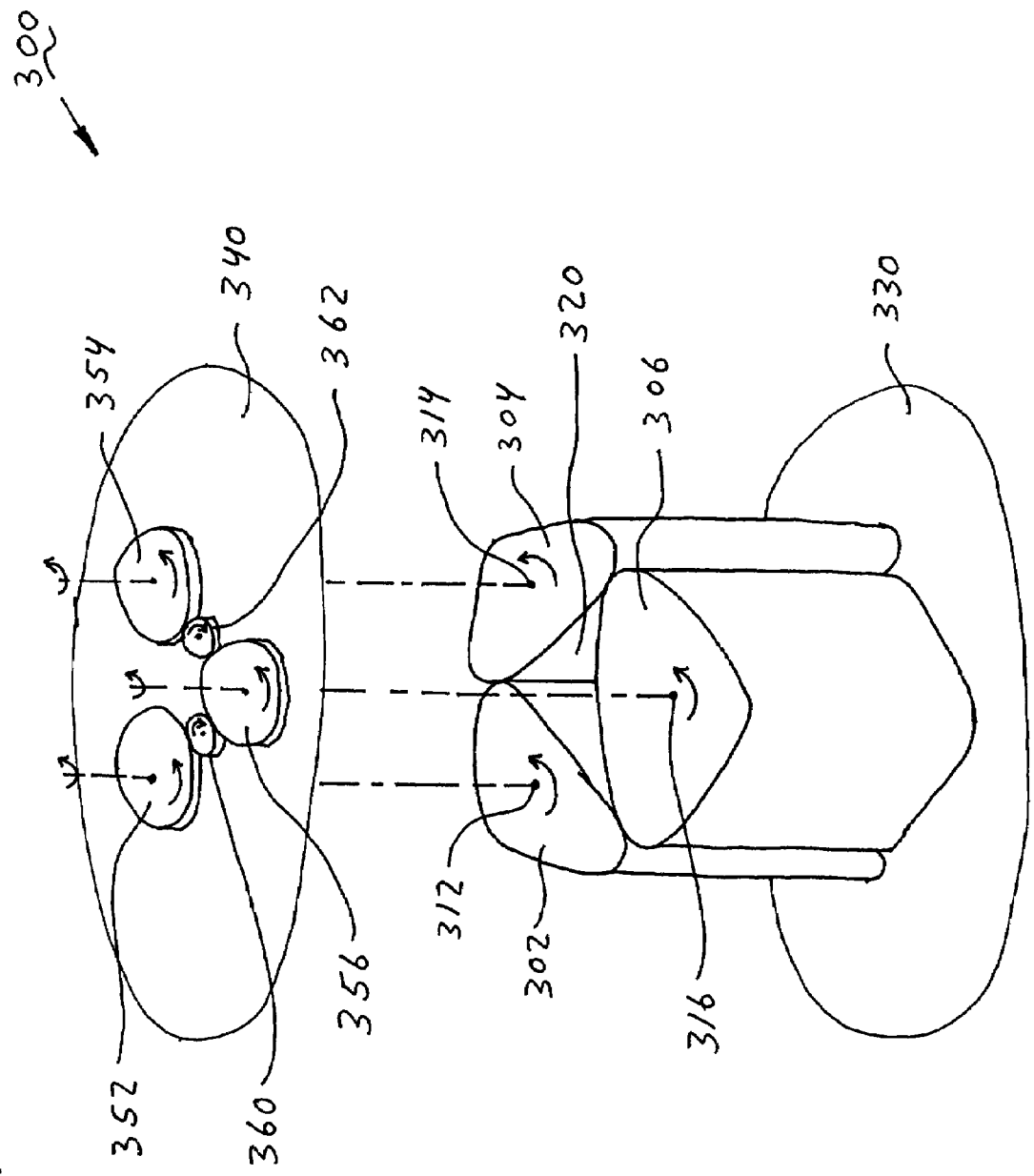
FIG. 3 illustrates one embodiment of synchronizing rotation of geometrical elements.

FIG. 3 illustrates one embodiment of synchronizing rotation of geometrical elements with an exploded view, generally at 300. With reference to FIG. 3, three geometrical elements 302, 304, and 306 are arranged proximate to each other. A housing 330 and 340 provides surfaces that combine with the surfaces of the geometrical elements to form a chamber 320. The housing 330 and 340 locates and supports the geometrical elements 302, 304, and 306 for synchronized rotation about axes 312, 314, and 316 respectively. The housing 330 and 340 is planar and a plane of the geometrical elements 302, 304, and 306 is also planar. In other embodiments, other shapes are employed, such as a spherical housing and associated geometrical elements having a spherical surface, which are used therewith as described below in conjunction with the figures that follow.

It will be noted that there is a variety of ways to synchronize the rotation of the geometrical elements 302, 304, and 306. One way is illustrated with gears 352, 354, 356, 360, and 362. In one embodiment, a gear 352 is fixedly attached to rotate with the geometrical element 302. Such fixing can be accomplished, for example, by supporting the geometrical element 302 for rotation on a shaft (not shown) and fixing the gear 352 to the shaft, such that the shaft, the geometrical element 302, and the gear 352 rotate as a unit. Fixing can be accomplished by using methods known in the art, such as with splines, keys and keyways, etc. The other geometrical elements, 304, and 306 are configured with their respective gears 354 and 356. Intermediate gears 360 and 362 rotate in a direction counter to the direction that the geometrical elements rotate. The resulting configuration facilitates synchronized rotation of the three geometrical elements. Other arrangements of gears, as well as other mechanisms can be used to provide synchronized rotation of geometrical elements, such as but not limited to belts and pulleys, etc.

Figure 4:
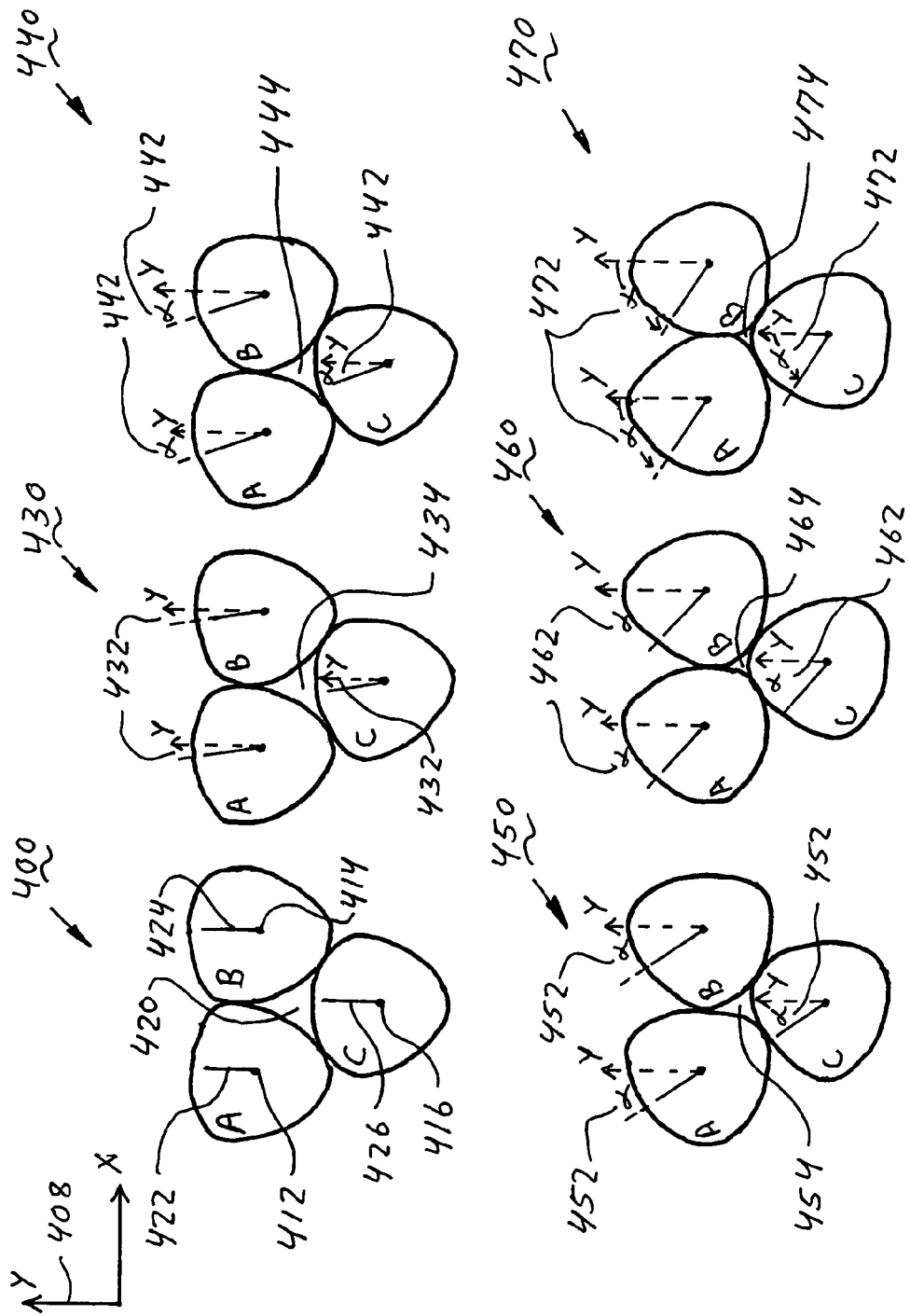
FIG. 4 illustrates various cross-sectional shapes of a variable volume chamber according to one embodiment.

FIG. 4 illustrates various cross-sectional shapes of a variable volume chamber according to one embodiment. With reference to FIG. 4, position 400 indicates an orientation of three geometrical elements indicated by A, B, and C. The use of reference notation A, B, and C in FIG. 4 is meant to indicate similar elements and such use of A, B, and C is confined to FIG. 4. Therefore, an object marked with an "A" in FIG. 4 is not necessarily equivalent to an object marked with an "A" in a figure different from FIG. 4, unless so indicated. Geometrical element A rotates about an axis 412 and has a reference line indicated by 422. Geometrical element B rotates about an axis 414 and has a reference line indicated by 424. Geometrical element C rotates about an axis 416 and has a reference line indicated by 426. For clarity in the illustration, corresponding indicia for the axes and reference lines have been omitted from the geometrical elements A, B, and C in positions 430, 440, 450, 460, and 470. The geometrical elements arranged within position 400 provide a maximum cross sectional area for the chamber indicated at 420. Angular positions are indicated relative to a Y axis 408; however, other references are equally suitable from which angular positions can be measured.

Position 430 displays the three geometrical elements after they have undergone synchronized rotation, indicated by an angle 432 (α). Within position 430, the cross sectional area of the chamber 420 (position 400) has decreased to the area shown at 434, which corresponds to a reduction in chamber volume due to the rotation of the geometrical elements A, B, and C.

Position 440 displays the three geometrical elements after they have undergone synchronized rotation, indicated by an angle 442 (α). Within position 440, the cross sectional area of the chamber 434 (position 430) has decreased to the area shown at 444, which corresponds to a reduction in chamber volume due to further rotation of the geometrical elements A, B, and C.

Position 450 displays the three geometrical elements after they have undergone synchronized rotation, indicated by an angle 452 (α). Within position 450, the cross sectional area of the chamber 444 (position 440) has decreased to the area shown at 454, which corresponds to a reduction in chamber volume due to further rotation of the geometrical elements A, B, and C.

Position 460 displays the three geometrical elements after they have undergone synchronized rotation, indicated by an angle 462 (α). Within position 460, the cross sectional area of the chamber 454 (position 450) has decreased to the area shown at 464, which corresponds to a reduction in chamber volume due to further rotation of the geometrical elements A, B, and C.

Position 470 displays the three geometrical elements after they have undergone synchronized rotation, indicated by an angle 472 (α). Within position 470, the cross sectional area of the chamber 464 (position 460) has decreased to the area shown at 474, which corresponds to a reduction in chamber volume due to further rotation of the geometrical elements A, B, and C. Position 470 displays the angular position which also coincides with a minimum cross sectional area of the chamber defined between the geometrical elements A, B, and C. It will be appreciated that geometrical elements A, B, and C so configured for rotation can be arranged at any angle. The angular positions 400, 430, 440, 450, 460, and 470 are merely examples selected for illustration and no limitation is implied thereby in FIG. 2 or any of the other figures in which geometrical elements are illustrated at various angular positions.

Figure 5:
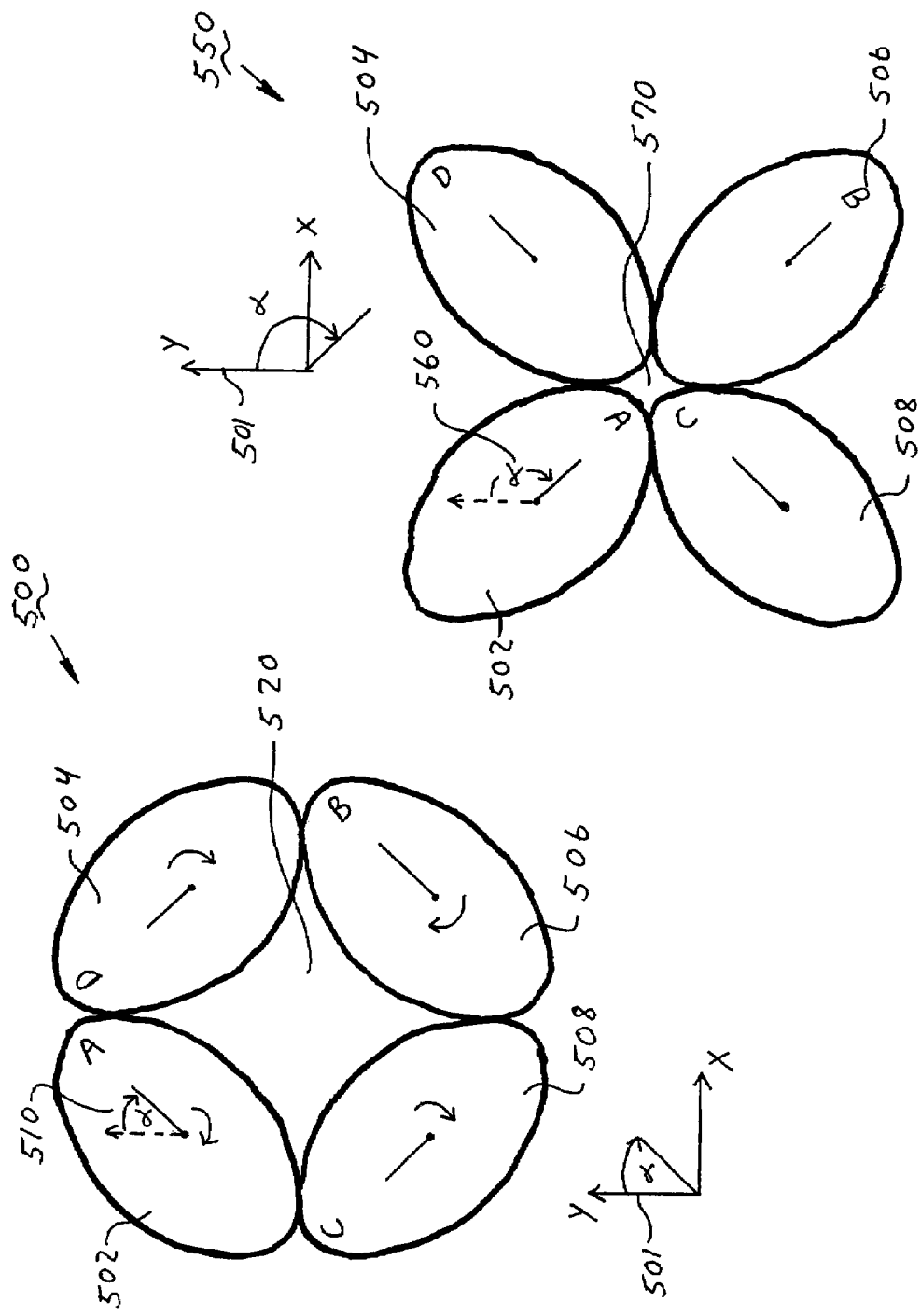
FIG. 5 illustrates another embodiment of a variable volume chamber in plan view.

FIG. 5 illustrates another embodiment of a variable volume chamber in plan view. In a position 500, the geometrical elements 502 and 506 are arranged with their principle axes parallel to one another and at an initial angle 510 (α) measured from the Y axis 501. Also in the position 500, the geometrical elements 504 and 508 are arranged with their principle axes parallel to one another and perpendicular to the principle axes of the geometrical elements 502 and 506. Together, the four geometrical elements create a chamber 520 by contributing to a circumferential shape of the chamber 520 with a portion of their respective surfaces. The height of the chamber is determined, in part, from the length of the geometrical elements (not shown in the plan view of FIG. 5) as well as from any enclosed volume provided from a recess in the housing (not shown). A housing can contribute to the volume of a chamber, but need not. The orientation of the geometrical elements of position 500 provides maximum volume for the chamber 520.

A second position for the geometrical elements is indicated by the geometrical elements in position 550. Within position 550, the geometrical elements 502, 504, 506, and 508 experience synchronized rotation through an angle of approximately ninety degrees to a new position as indicated at 550. The position illustrated at 550 produces a minimum volume for a chamber 570 created by the geometrical elements 502, 504, 506, and 508.

Figure 6:
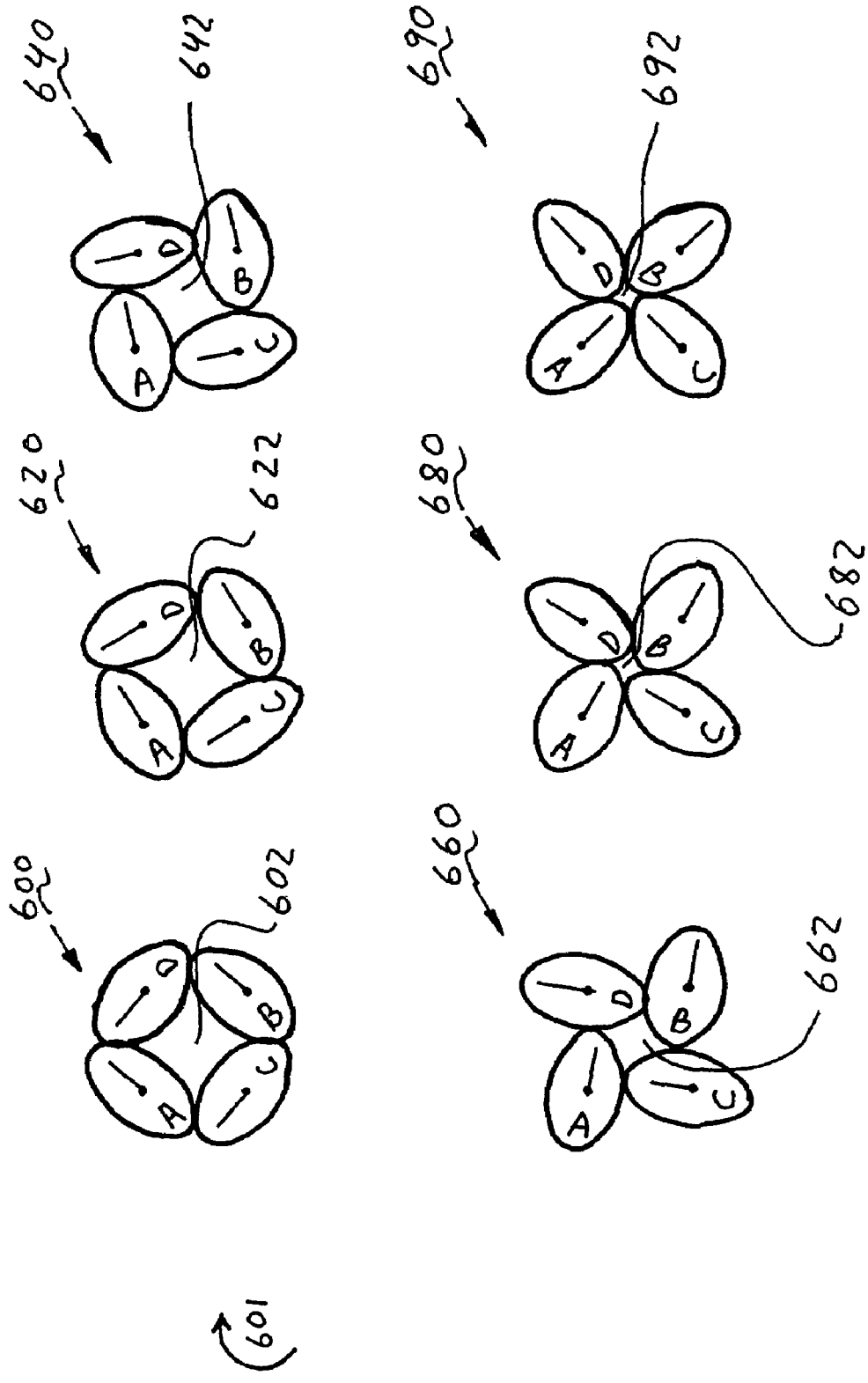
FIG. 6 illustrates another embodiment of various cross-sectional shapes of a variable volume chamber in plan view.

FIG. 6 illustrates another embodiment of various cross-sectional shapes of a variable volume chamber in plan view. With reference to FIG. 6, four geometrical elements, indicated by reference letters A, B, C, and D are arranged in a maximum volume configuration (position 600), similar to the position of the elements 502, 506, 508, and 504 in position 500 (FIG. 5). The resulting chamber 602 is at the maximum volume position. Rotation of the geometrical elements in a clockwise direction, as indicated by an arrow 601, results in successive positions 620, 640, 660, 680, and 690. Each position (620, 640, 660, 680, and 690) has a respective chamber cross-sectional area (622, 642, 662, 682, and 692) associated respectively, therewith. Thus, a variable volume of a chamber defined between the geometrical elements is illustrated, ranging from a maximum volume position at 602 to a minimum position indicated at 692.

Further rotation from the position 690, in the direction indicated at 601, cycles the geometrical elements A, B, C, and D through a succession of positions (not shown) and finally to the starting position 600.

Figure 7:
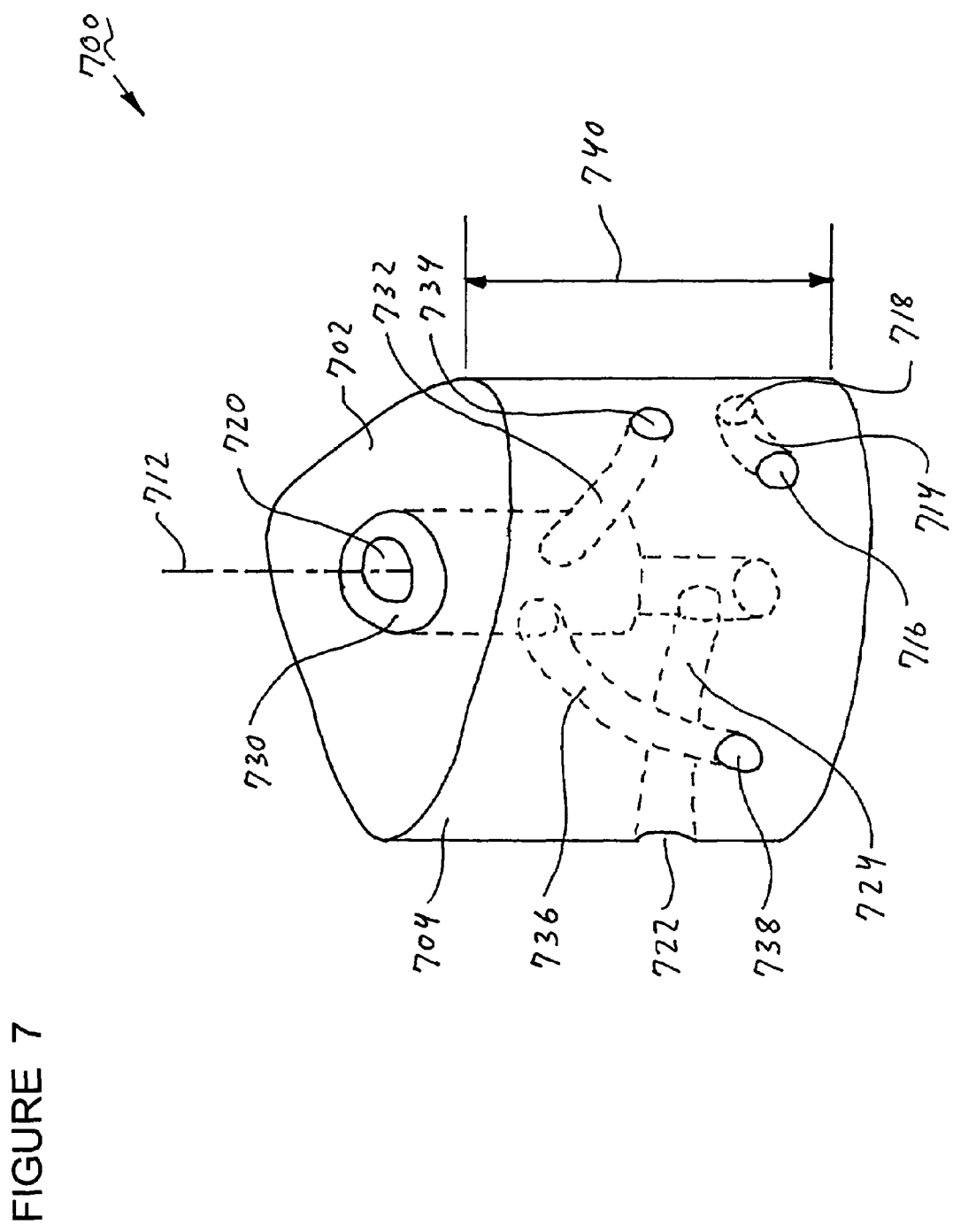
FIG. 7 depicts an isometric view of a geometrical element according to one embodiment.

FIG. 7 depicts an isometric view of a geometrical element according to one embodiment. With reference to FIG. 7, a geometrical element is depicted generally at 700. The geometrical element depicted in 700 has an axis 712, a top surface 702, and a circumferential surface 704 wrapping around the circumference of the geometrical element 700. The circumferential surface 704 is the portion of the geometrical element that contributes to creating a chamber between adjacent geometrical elements as described above in the preceding figures. As described previously, geometrical elements have a height associated therewith and the geometrical element 700 has a depth or a height indicated by 740.

In various embodiments, geometrical elements, such as 700 and those previously described in conjunction with the other figures, can have one or more ports (passageways) within a volume of the geometrical element that provide a path through which a material, such as viscous material, a fluid or a gas can flow. A passageway or a port is used synonymously herein for an opening; such a feature can provide a path for material to flow into or out of a chamber. For example, material can flow through a passageway to the outside world (or vice versa) or a passageway can provide a path for fluid to flow from a first chamber to a second chamber when a multi-chambered structure has been created with geometrical elements. Multi-chambered structures are described in conjunction with the figures that follow.

One such passageway that connects a first chamber with a second chamber is indicated by 714. Passageway 714 connects openings 716 and 718. At various times, openings 716 and 718 can be in communication (fluidic communication) with a single chamber, with two different chambers or with a plurality of chambers.

Another passageway is indicated by 732. Passageway 732 can connect a chamber to an external source of a material, such as a viscous material, a fluid or a gas or an environment in which to deposit such a material. Passageway 732 connects opening 734 with opening 730. Opening 730 can be configured with a means for rotation of the geometrical element; thereby providing a seal for the passageway so that a nonrotating connection can be made with the geometrical element; such connections between non-rotating and rotating members are known to those of skill in the art. A second passageway 736 can provide a path 736 from opening 738 in the circumferential surface 704 of the geometrical element 700, to the opening 730. Such a dual passageway (732, 736) can be used to supply a material, such as a viscous material, gas, liquid, etc. to multiple chambers when geometrical element 700 is used in embodiments that provide multi-chambered structures.

Another passageway 724 can provide a path between an opening 722 and an opening 720. Typically, the opening 720 is distinct from the opening 730, which keeps the two pathways distinct. For example, gas or liquid flowing in passageway 724 is prevented from flowing in passageway 732 and 736. The configuration of passageways described in conjunction with FIG. 7 will be used in a multi-chambered system, described in conjunction with FIG. 9 through FIG. 14 below. It will be noted that other arrangements of passageways are possible within the teachings presented herein. The passageways indicated within the geometrical elements are for illustrative purposes only and do not limit the embodiments described herein.

In other embodiments, a passageway into a chamber can be provided by a port within a housing in an area of the housing that contributes to forming a chamber. Multiple passageways into a chamber can be provided by arranging multiple ports in the housing in the area of the housing that contributes to creating a chamber.

Figure 8:
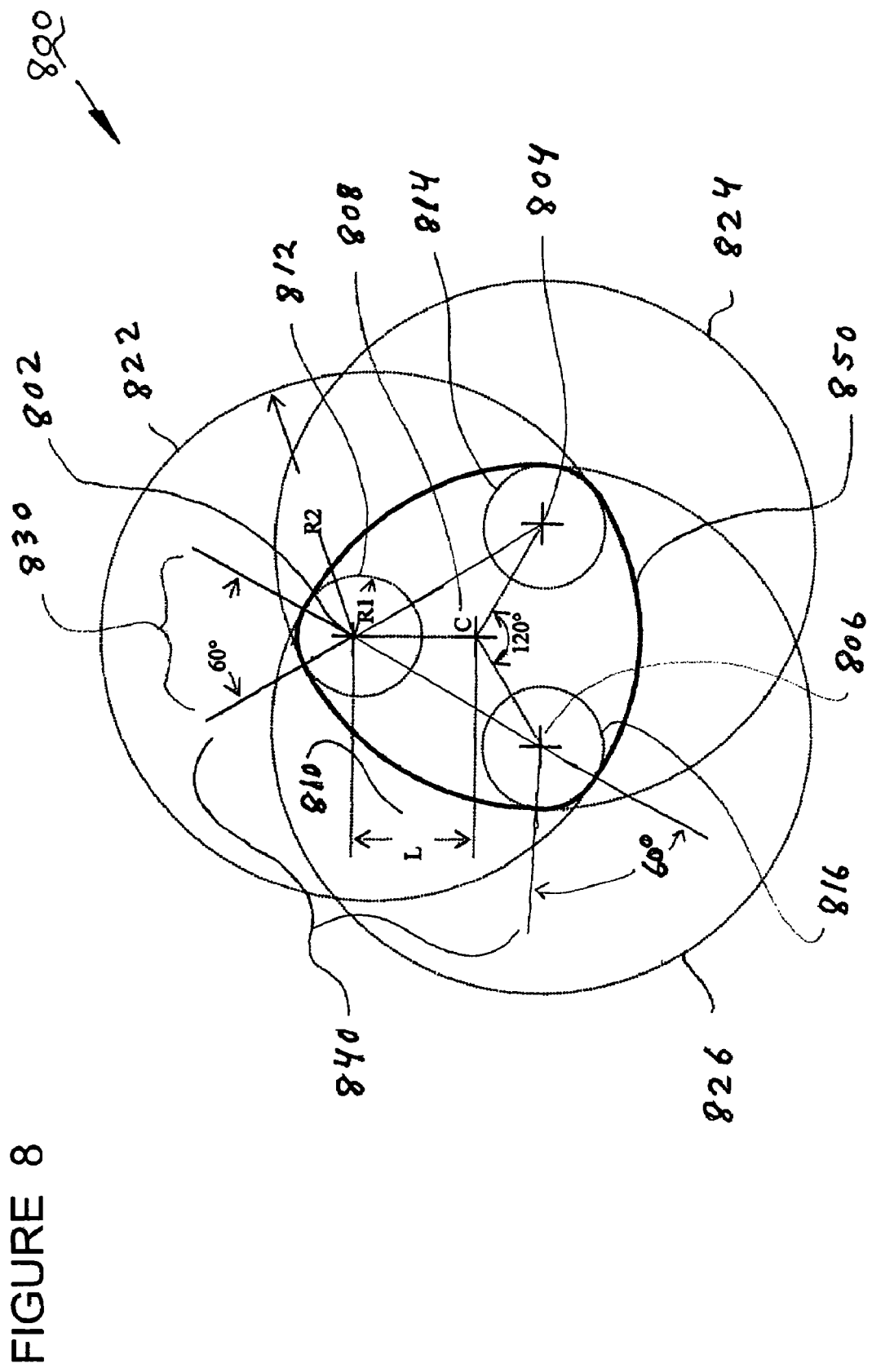
FIG. 8 illustrates a circumferential shape of a geometrical element according to one embodiment.

FIG. 8 illustrates a circumferential shape of a geometrical element according to one embodiment. With reference to FIG. 8, the geometrical element 800 is constructed by creating an equilateral triangle with vertices 802, 804, and 806 and a center at 808 (C). Each of the vertices 802, 804, and 806 are positioned a distance "L" from the center 808 (C), as indicated by 810. A circle 812, having radius R1, is centered on the vertex 802. Similarly, a circle 814, having radius R1, is centered on vertex 804 and a circle 816, having radius R1, is centered on vertex 806. A circle having radius R2 is centered on vertex 802 and is sized to be tangent to the circles 814 and 816. Similarly, circles of radius R2 are centered on vertex 804 and vertex 806, the circles of radius R2 are tangent to the respective circles of R1 centered on the other vertices of the equilateral triangle. A series of six regions, three having radius of curvature R1, one of which is indicated at 830, and three having radius of curvature R2, one of which is indicated at 840, combine to form a circumferential shape 850 for the geometrical element 800. Variation of the ratio of R1 and R2 will create a different ratio of maximum to minimum volume of the associated chamber defined between adjacent geometrical elements.

Figure 9:
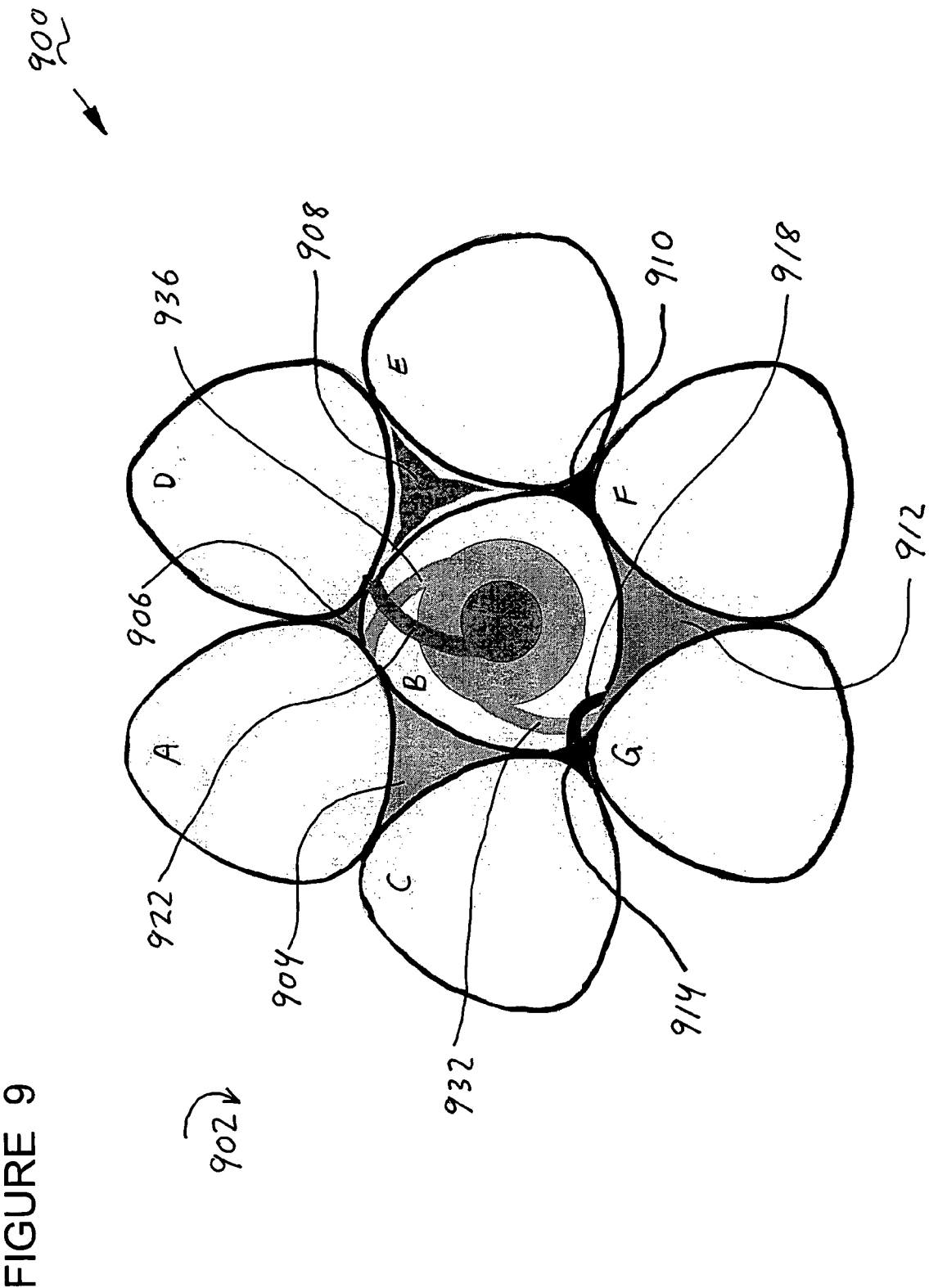
FIG. 9 depicts an arrangement of geometrical elements that form six chambers according to one embodiment.

FIG. 9 depicts an arrangement of geometrical elements that form six chambers, according to one embodiment. FIG. 9 through FIG. 14 illustrate geometrical elements using alpha markings A, B, C, D, E, F, and G to indicate the same geometrical element across FIG. 9 through FIG. 14 only. With respect to FIG. 9, an arrangement of seven geometrical elements labeled, A, B, C, D, E, F, and G is configured for synchronized rotation in the direction indicated by arrow 902 to create a multi-chambered device 900. The seven geometrical elements are designed according to the principles described in conjunction with FIG. 8 above. In the embodiment illustrated, the central geometrical element, B, or common element has been selected to contain passageways that permit the arrangement to function as an internal combustion engine. In the embodiment illustrated, the six chamber device 900 is designed to provide a four cycle internal combustion engine with an extra intake and compression cycle, providing a "supercharger" function for an effective 6 cycle system. In other embodiments, the passageways can be located in other geometrical elements. In yet other embodiments, arrangements of elements are configured as pumps, compressors, etc., as described below in the figures that follow.

The geometrical element B contains four passageways. A passageway 922 provides for outflow from a chamber and is used to provide exhaust following combustion. A passageway 932 and a passageway 936 provide for inflow into two different chambers and are used as intake paths for fuel within the embodiment under discussion. The passageway 918 permits flow between adjacent chambers for a fraction of a rotational cycle of a geometrical element and is used in one embodiment for the supercharge function, which is described below. In one embodiment, an igniter (not shown) is also located within each chamber to ignite the compressed fuel mixture at the appointed time. Alternatively, in another embodiment, a fuel that ignites under pressure, such as diesel fuel could be used omitting the igniter. In yet other embodiments, an injector can be used to inject fuel into a chamber. As used in this description of the geometrical elements, arranged for use as an internal combustion engine, "gas" or "fuel" is used broadly to describe a combustible mixture of a compressible substance, such as a fuel and a carrier gas, if needed. For example, in various embodiments, "gas" is a combination of a fuel, such as a hydrocarbon, and air. Some examples of hydrocarbons are, but are not limited to, alcohol, gasoline, propane, butane, etc. In other embodiments, a "gas" is another combustible mixture of gases, such as but not limited to, hydrogen and oxygen, etc.

FIG. 9 through FIG. 14 describe the cycles of the system as the geometrical elements move through approximately 80 degrees of clockwise rotation. The state of the system begins, for the purpose of this description in FIG. 9, at an arbitrarily selected point in time, with a chamber 904 completing a first intake cycle; the chamber 904 is at maximum volume. A chamber 906 has completed an exhaust cycle and is at minimum volume. A chamber 908 has completed a power cycle following ignition and is at maximum volume. A chamber 910 has completed a second compression cycle with a double charge of fuel and is ready for ignition; this chamber is at minimum volume. A chamber 912 is currently receiving a transfer of fuel from a chamber 914, since the chamber 914 (minimum volume position) is at a higher pressure than the chamber 912 (maximum volume position). The chamber 914 has previously received a first charge of fuel from the passageway 936 and has been compressed to create the state illustrated. The chamber 904 has just finished a first intake cycle, receiving fuel via the passageway 936.

Figure 10:
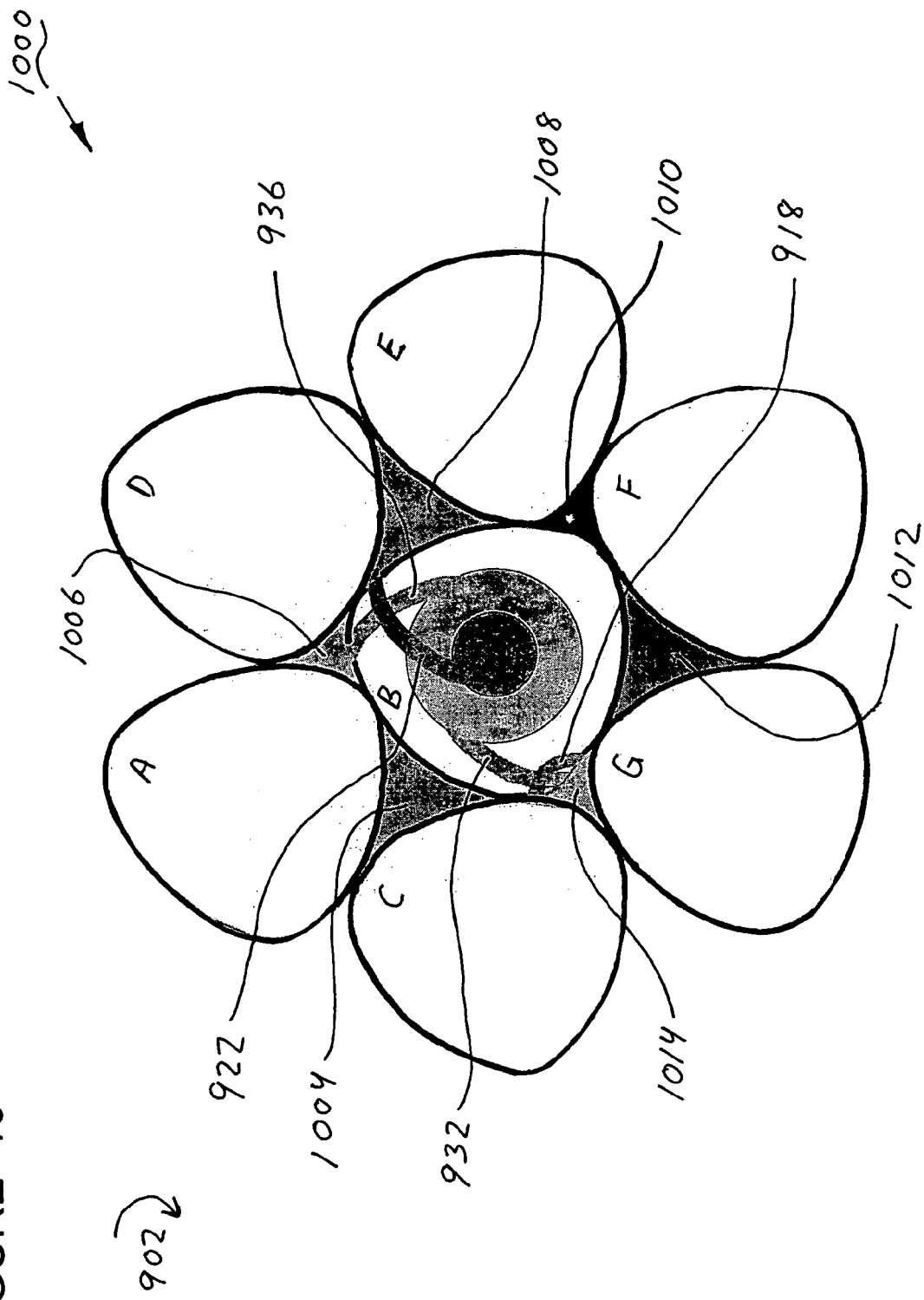
FIG. 10 illustrates a rotation of the geometrical elements from the position depicted in FIG. 9.

FIG. 10 illustrates a rotation of the geometrical elements from the position depicted in FIG. 9. The geometrical elements A, B, C, D, E, F, and G have advanced through an angular rotation as indicated with arrow 902. A chamber 1006 is in the intake cycle and its volume is expanding following the conclusion of the exhaust cycle 906 (FIG. 9). The chamber 1008 is now in the process of exhausting into passageway 922, following the conclusion of the expansion cycle 908 (FIG. 9). A chamber 1010 is now firing to ignite the fuel mixture thereby causing the chamber 1010 to expand and the geometrical elements to rotate in the direction of arrow 902. A chamber 1012, having received the double charge of fuel previously at 912 (FIG. 9) is now compressing the fuel mixture during the second compression cycle. A chamber 1014 is in a first intake cycle, while expanding and receiving a first charge of fuel via passageway 932, after having previously given up its compressed charge of fuel during the supercharge cycle from the chamber 914 to the chamber 912 (FIG. 9). A chamber 1004 is going through a first compression cycle after having received its first charge of fuel at 904 in FIG. 9.

Figure 11:
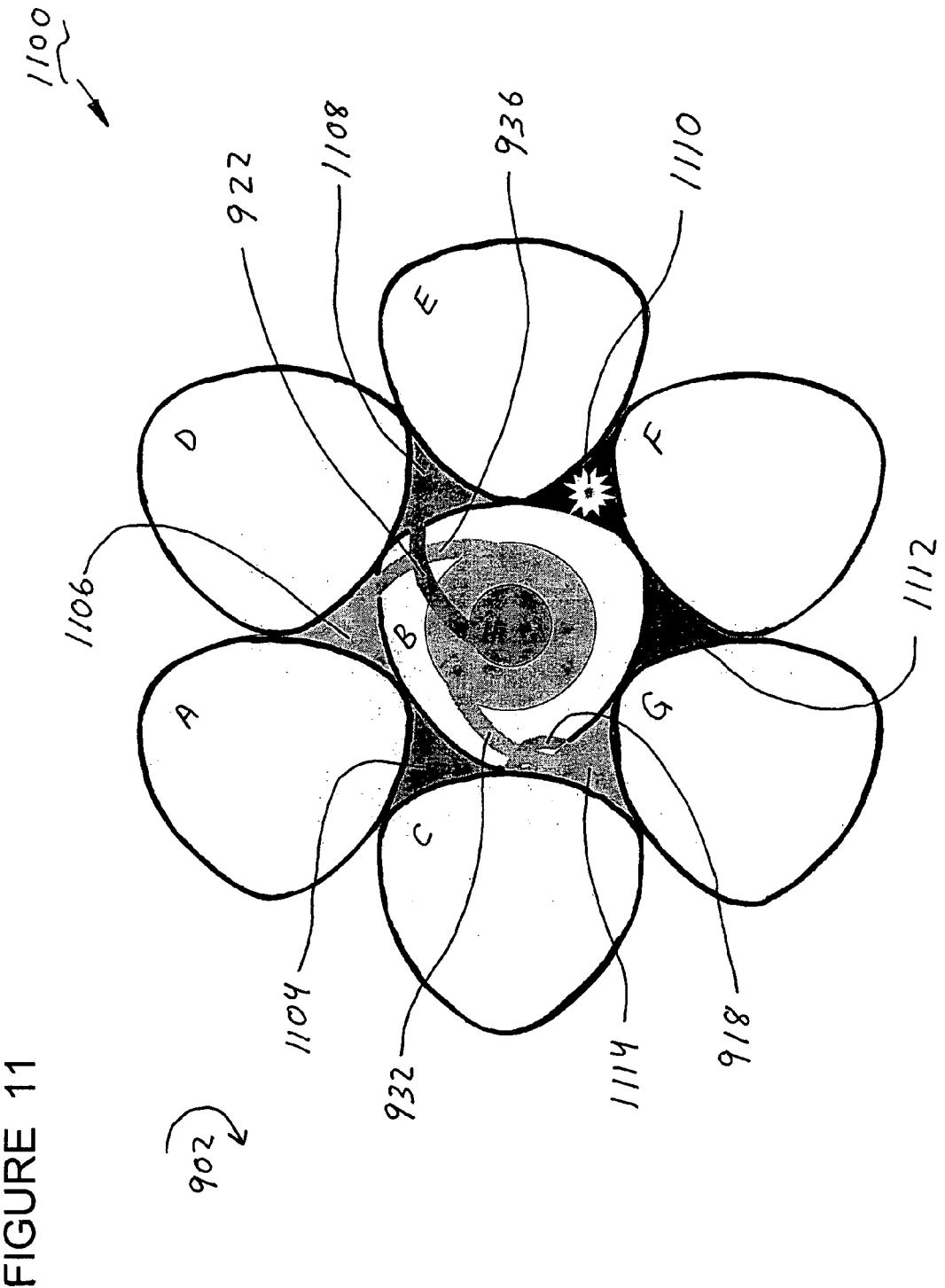
FIG. 11 illustrates a rotation of the geometrical elements from the position depicted in FIG. 10.

FIG. 11 illustrates a rotation of the geometrical elements from the position depicted in FIG. 10. The geometrical elements A, B, C, D, E, F, and G have advanced through an angular rotation as indicated with arrow 902. A chamber 1106 is still in the intake cycle and its volume is expanding. The chamber 1108 is continuing the process of exhausting into passageway 922. A chamber 1110 is still firing to ignite the fuel mixture thereby causing chamber 1110 to expand and the geometrical elements to rotate in the direction of arrow 902. A chamber 1112, having received the double charge of fuel previously, is still compressing the fuel mixture during the second compression cycle. A chamber 1114 is still in the first intake cycle, while expanding and receiving the first charge of fuel via passageway 932. A chamber 1104 is still going through the first compression cycle after having received its first charge of fuel.

Figure 12:
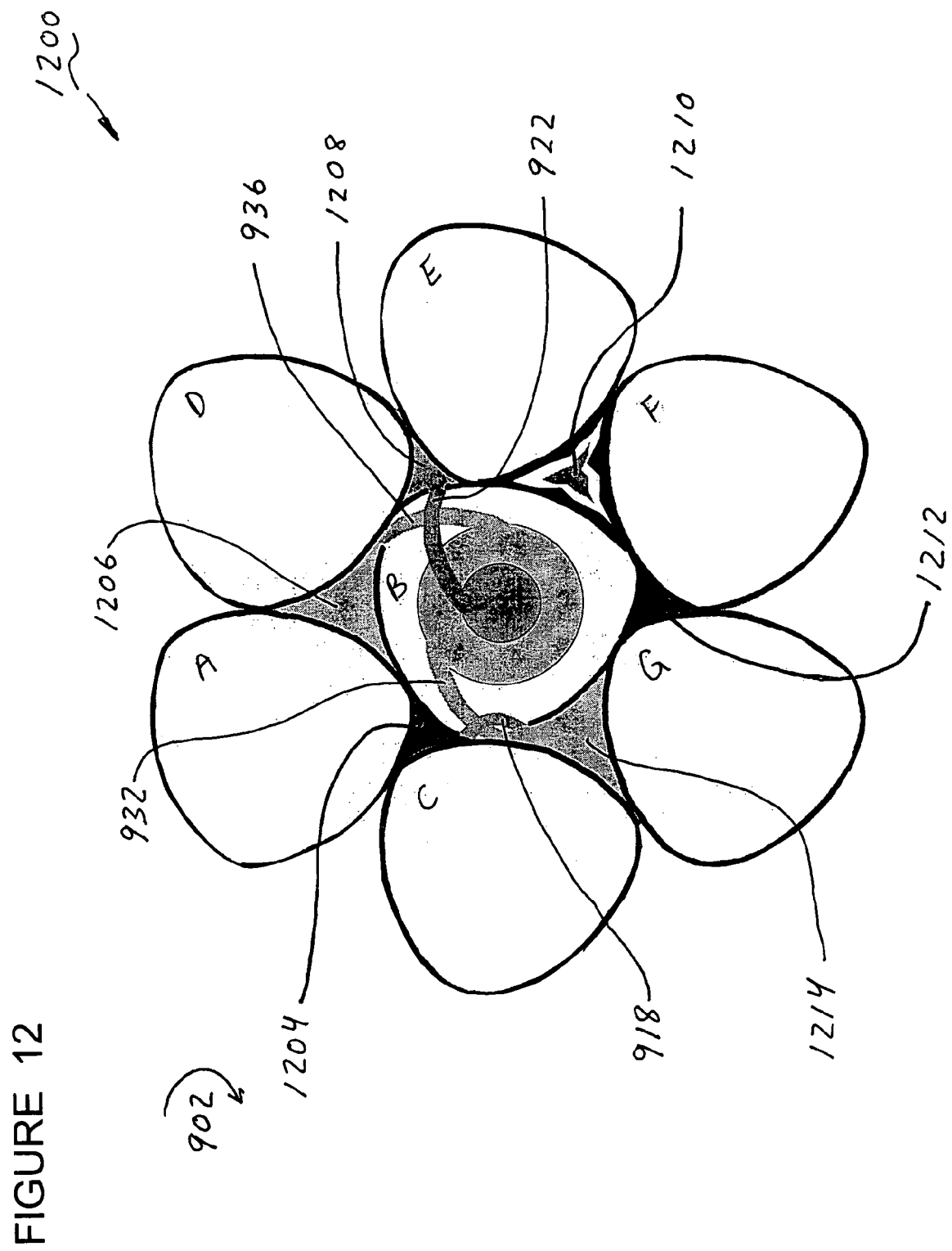
FIG. 12 illustrates a rotation of the geometrical elements from the position depicted in FIG. 11.

FIG. 12 illustrates a rotation of the geometrical elements from the position depicted in FIG. 11. The geometrical elements A, B, C, D, E, F, and G have advanced through an angular rotation as indicated with arrow 902. A chamber 1206 is near the end of the intake cycle and its volume is still expanding. The chamber 1208 is continuing the process of exhausting into passageway 922. A chamber 1210 is still expanding following ignition thereby causing chamber 1210 to expand and the geometrical elements to rotate in the direction of arrow 902. A chamber 1212, having received the double charge of fuel previously, is still compressing the fuel mixture during the second compression cycle. A chamber 1214 is still in the first intake cycle, while expanding and receiving the first charge of fuel via passageway 932. A chamber 1204 is still going through the first compression cycle, after having received its first charge of fuel. The chamber 1204 is nearing the point at which passageway 918 will permit the supercharge cycle to transfer compressed fuel from the chamber 1204 into the chamber 1214.

Figure 13:
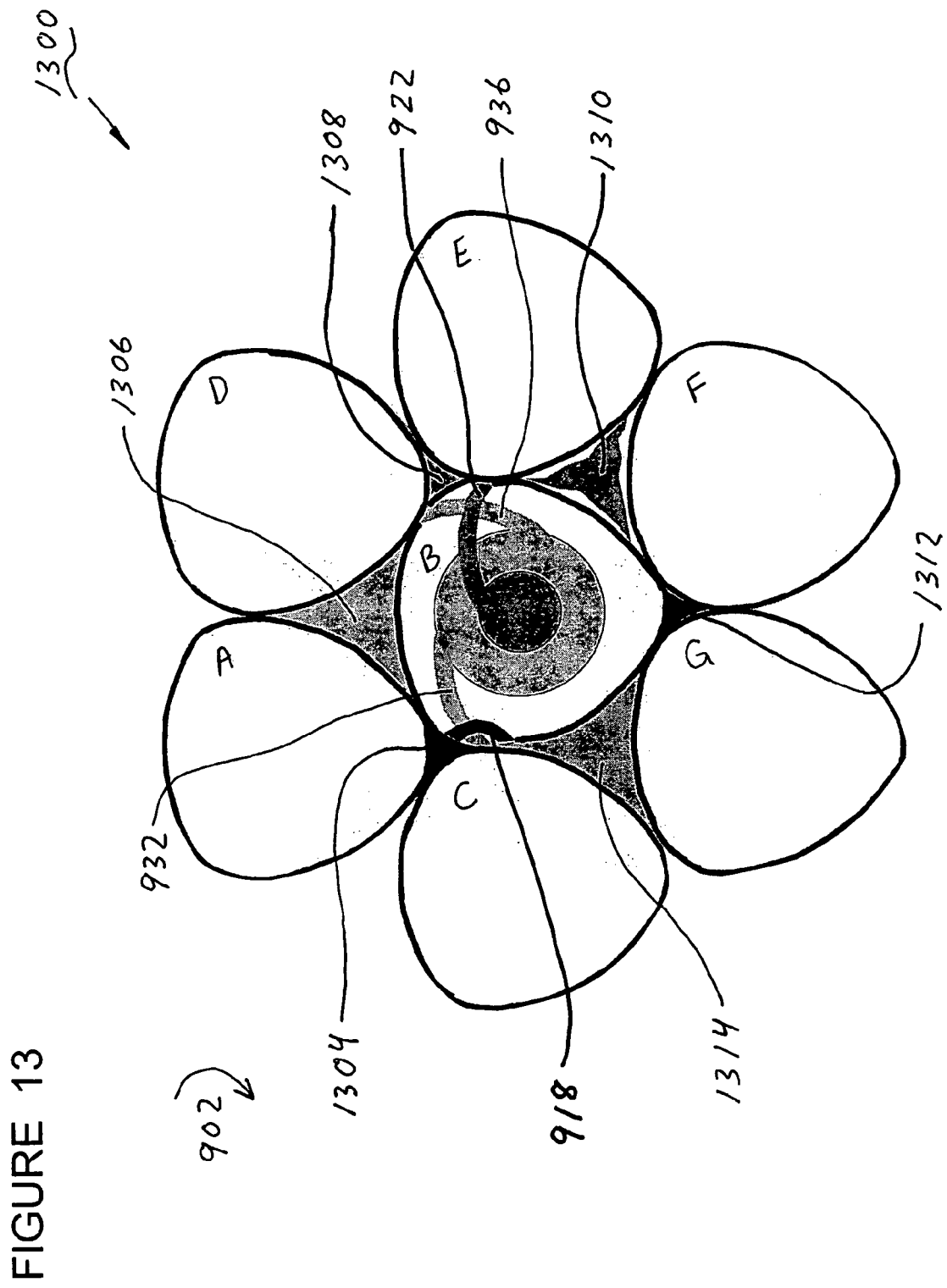
FIG. 13 illustrates a rotation of the geometrical elements from the position depicted in FIG. 12.

FIG. 13 illustrates a rotation of the geometrical elements from the position depicted in FIG. 12. The geometrical elements A, B, C, D, E, F, and G have advanced through an angular rotation of approximately 60 degrees relative to the orientation illustrated in FIG. 9, in the direction as indicated by arrow 902. A chamber 1306 is at the end of the intake cycle and its volume is at maximum. The chamber 1308 has finished the process of exhausting into passageway 922. A chamber 1310 has finished expansion (the end of the power cycle) and is at maximum volume. A chamber 1312 is at maximum compression (minimum volume) and will experience ignition momentarily. A chamber 1314 is currently receiving a transfer of fuel from a chamber 1304, since the chamber 1304 is at high pressure (minimum volume) and the chamber 1314 is at low pressure (maximum volume).

Figure 14:
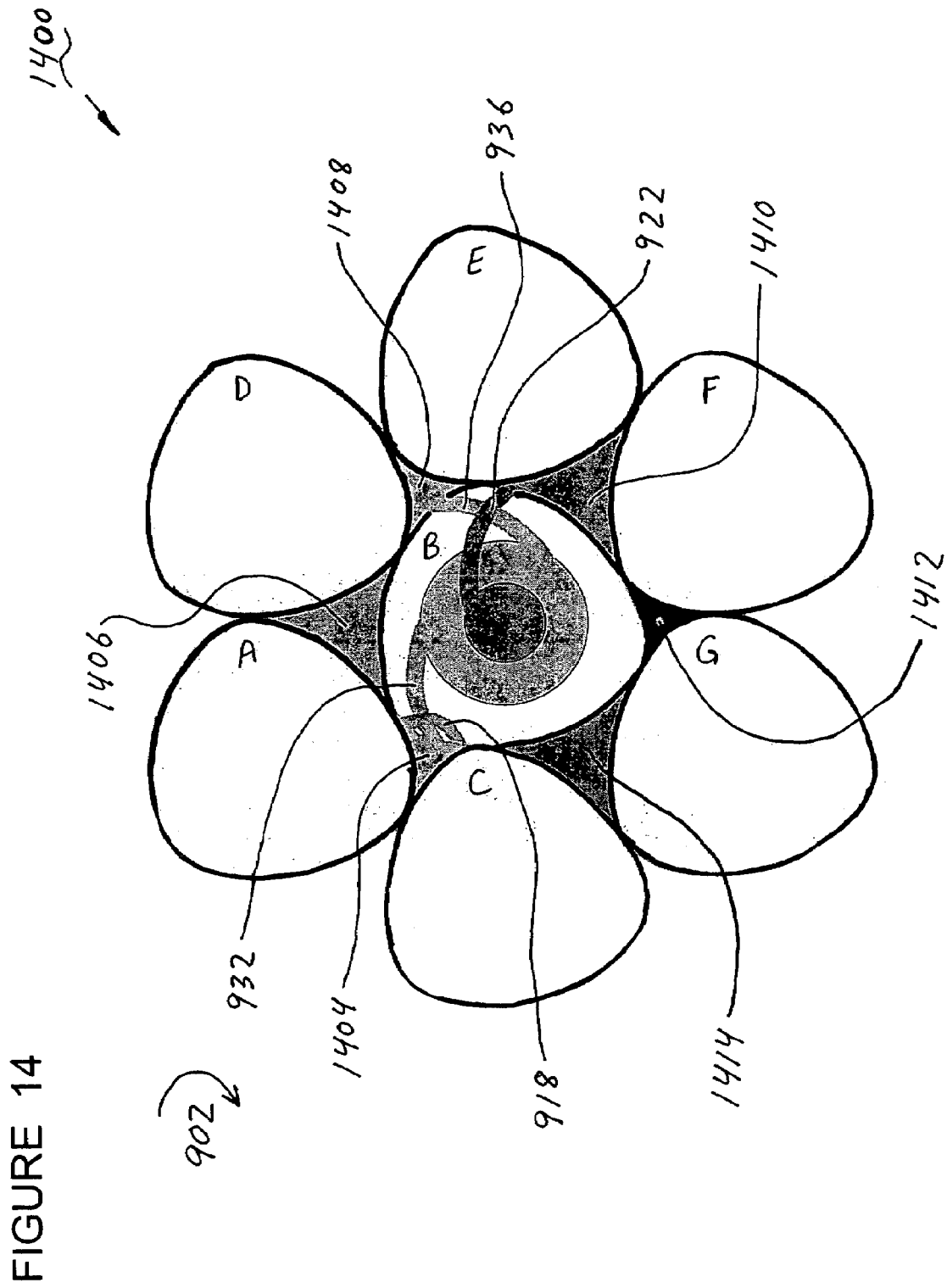
FIG. 14 illustrates a rotation of the geometrical elements from the position depicted in FIG. 13.

FIG. 14 illustrates a rotation of the geometrical elements from the position depicted in FIG. 13. The geometrical elements A, B, C, D, E, F, and G have advanced through an angular rotation as indicated with arrow 902. A chamber 1406 is going through a first compression cycle after having received its first charge of fuel. A chamber 1408 is in the first intake cycle and its volume is expanding. The chamber 1410 is now in the process of exhausting into passageway 922. A chamber 1412 is now firing to ignite the fuel mixture thereby causing chamber 1412 to expand and the geometrical elements to rotate in the direction of arrow 902. A chamber 1414, having received the double charge of fuel previously from the chamber 1304 (FIG. 13), is now compressing the fuel mixture during the second compression cycle. A chamber 1404 is in a first intake cycle, while expanding and receiving a first charge of fuel via passageway 932, after having previously given up its compressed charge of fuel during the supercharge cycle from the chamber 1304 to the chamber 1314 (FIG. 13).

FIG. 9 through FIG. 14 are used to illustrate approximately 80 degrees of clockwise rotation of the geometrical elements A, B, C, D, E, F, and G. It will be appreciated that in continuous operation, an internal combustion engine will follow the description of the cycles given above throughout the rest of the rotation of the geometrical elements as the chambers experience the six cycles on a rotating basis during operation.

A compression ratio for the system illustrated in FIG. 9 through FIG. 14 can be approximately defined as a ratio of the maximum volume of a chamber to a minimum volume of the chamber, which is increased by the supercharger. It will be noted that a parameter such as the compression ratio is a design parameter of an internal combustion engine. The compression ratio can be manipulated by adjusting a design parameter of the geometrical elements, such as a circle radius R1 (FIG. 8).

The teachings directed to assembling geometrical elements to form multi-chambered systems can be applied to create more chambers by adding more geometrical elements. The geometrical shape described in FIG. 8 is scalable thereby allowing the system to be scaled both within the plane of the existing system as well as in a direction perpendicular to the plane.

In one embodiment, scaling perpendicular to the plane of the figures is accomplished by adding additional housing members, such as 340 (FIG. 3), and additional layers of geometrical elements. For example, referring to FIG. 3, another row of geometrical elements (not shown) is added above the housing 340 or below the housing 330 and another housing member 350 (not shown) is added along with the new row of geometrical elements. Synchronized rotation of the multiple planes or layers of geometrical elements is achieved, in one embodiment, by extending mechanical connection between layers of geometrical elements positioned above one another according to various methods. One such method mounts geometrical elements positioned above one another on the same shaft for rotation and in the case of geometrical elements with passageways, the common shaft allows the passageways to be serviced by the same plenum arrangement for providing intake and/or exhaust passageways.

Figure 15:
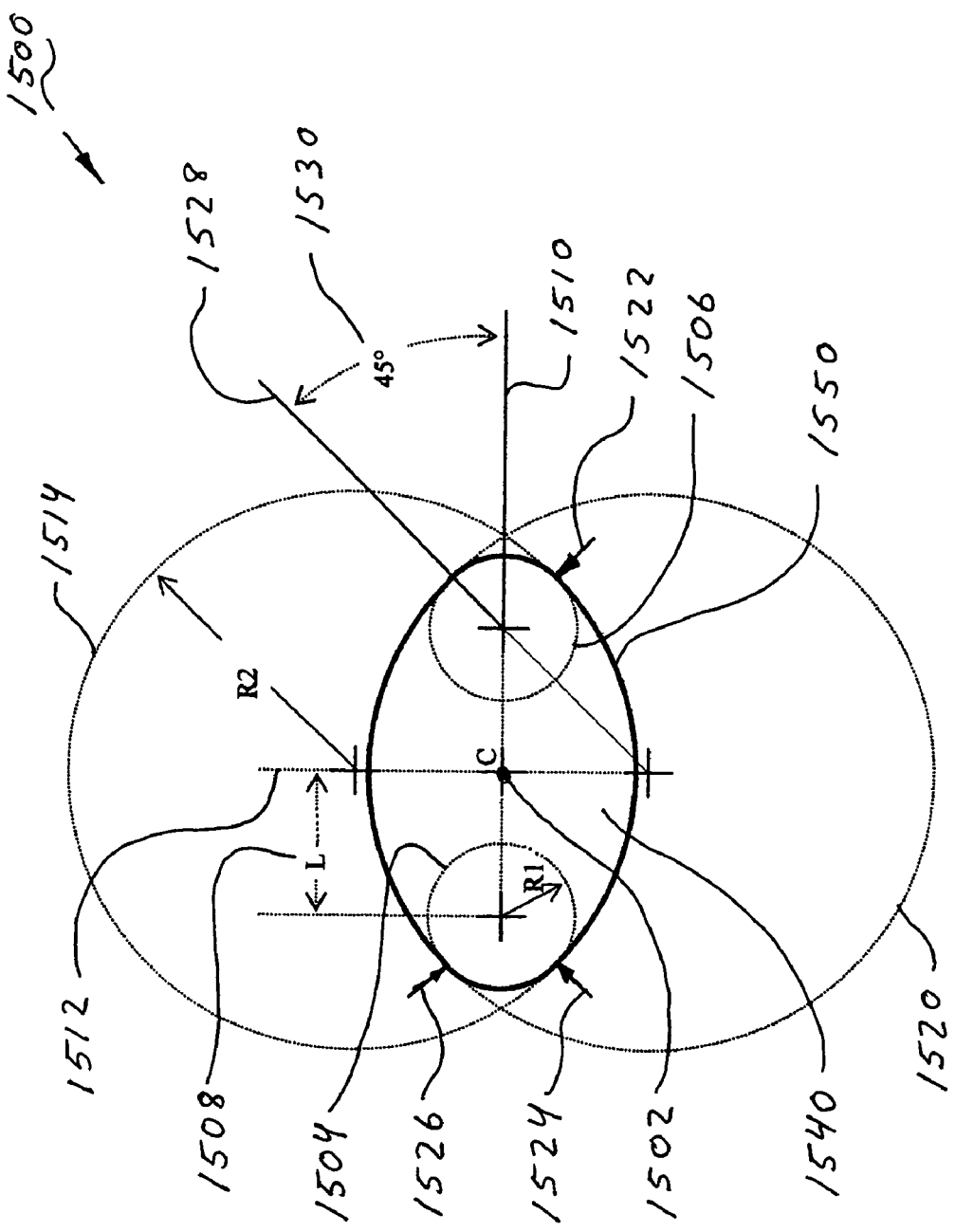
FIG. 15 illustrates a circumferential shape of a geometrical element according to another embodiment.

FIG. 15 illustrates a circumferential shape of a geometrical element according to another embodiment. Referring to FIG. 15, a geometrical element 1500 has a circumferential shape 1550 that is generally elliptical. The circumferential shape 1550 of the geometrical element 1500 is made by positioning a first circle 1504, having radius R1, and a second circle 1506, having radius R1, each a distance 1508 (L) from a point 1502 (C) of a line 1510. The line 1510 intersects the centers of circles 1504 and 1506. A line 1512 is drawn perpendicular to the line 1510 and through the point 1502 (C). A circle 1514, having radius R2, is positioned along the line 1512 and above the line 1510. The location on the line 1512, for the center of the circle 1514, is selected such that the center of circle 1514 and a center of circle 1504 form a line that makes an angle of 45 degrees with line 1510. The magnitude of radius R2 is selected so that the circle 1514 is tangent to circles 1504 (at 1524) and 1506 (at 1522). Similarly, a circle 1520, having radius R2, is located on the line 1512 and below the line 1510. The location on the line 1512, for the center of the circle 1520, is selected such that the center of circle 1520 and a center of circle 1506 form a line that makes an angle of 45 degrees (1530) with the line 1510. The circle 1520, also having radius R2, is tangent to circles 1504 (at 1526) and 1506 (at 1528).

The circle 1506 and the circle 1520 intersect at a point of common tangency, the location of which is indicated by a line 1528. The line 1528 makes an angle of 45 degrees (1530) with the line 1510. A similar point of common tangency occurs between the circle 1506 and the circle 1514 at a location 45 degrees below line 1510 as indicated at 1522. Similar points of common tangency occur between the circle 1504 and the circle 1514 at 1524 and the between the circle 1504 and the circle 1520 at 1526. It will be noted that the circumferential shape 1550 of the geometrical element 1500 is made up of four regions. Two of the regions correspond to contributions from circles 1506 and 1504, having radius of curvature R1, and two of the regions correspond to contributions from circles 1520 and 1514, having radius of curvature R2. The geometrical element 1500 is mounted for rotation about the point 1502 (C).

Figure 16:
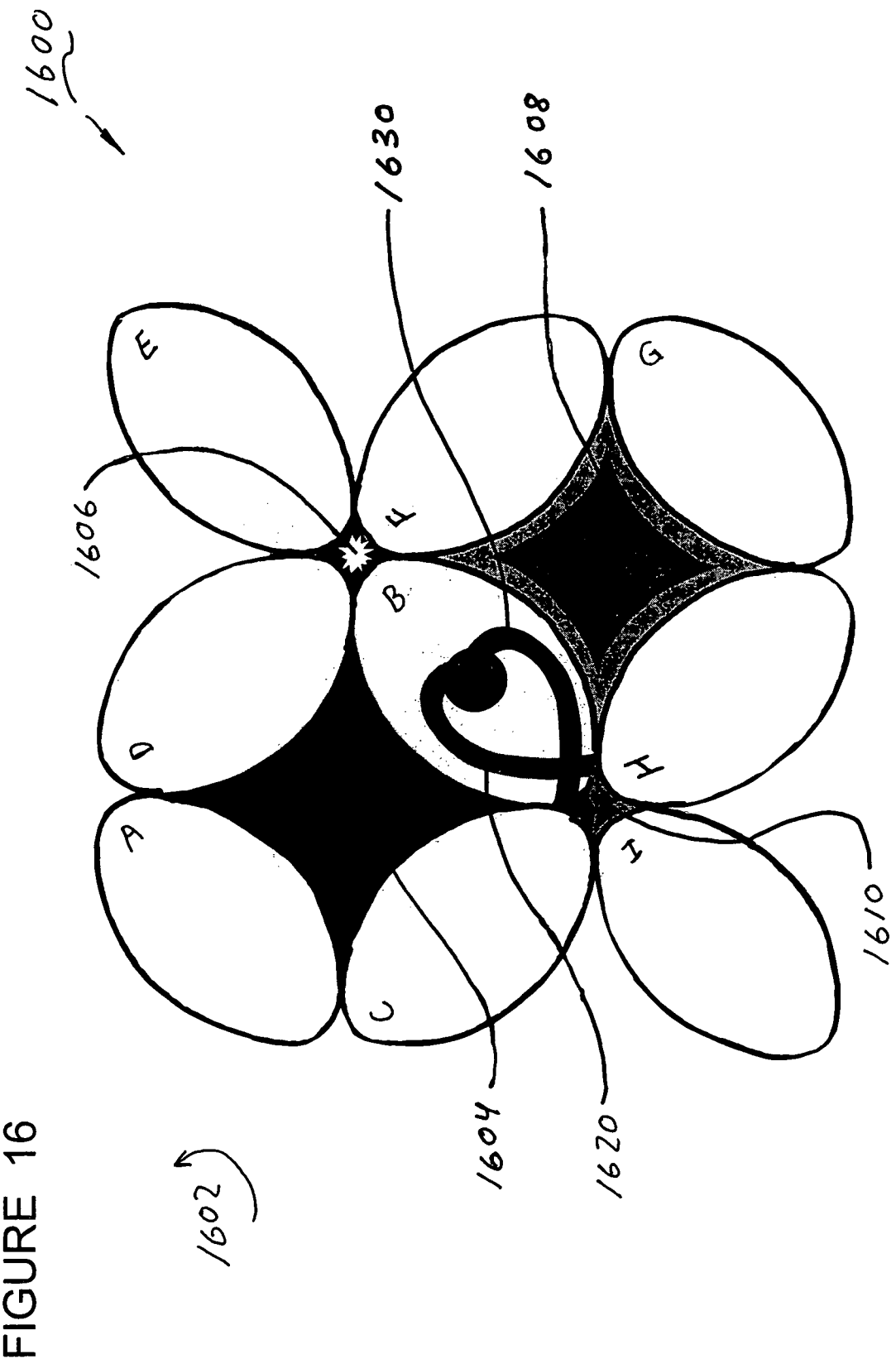
FIG. 16 depicts an arrangement of geometrical elements that form four chambers according to one embodiment.

FIG. 16 depicts an arrangement of geometrical elements that form four chambers according to one embodiment. FIG. 16 through FIG. 21 illustrate geometrical elements using alpha markings A, B, C, D, E, F, G, H, and I to indicate the same geometrical element across FIG. 16 through FIG. 21 only. With respect to FIG. 16, an arrangement of nine geometrical elements labeled, A, B, C, D, E, F, G, H, and I is configured for synchronized rotation in the direction indicated by arrow 1602 to create a multi-chambered device 1600. The nine geometrical elements are designed according to the principles described in conjunction with FIG. 15 above. In the embodiment illustrated, the central geometrical element, B, which can also be referred to as a common element, has been selected to contain passageways that permit the arrangement to function as an internal combustion engine. In other embodiments, the passageways can be located in other geometrical elements or within a housing containing the geometrical elements. In yet other embodiments, some of which are described below in conjunction with the figures that follow, arrangements of elements can be configured as pumps, single stage pumps, multistage pumps, etc.

In the embodiment illustrated, the four chamber device 1600 is designed to provide a four cycle internal combustion engine. The geometrical element B contains two passageways. A passageway 1620 provides for outflow from a chamber and is used as a passageway to permit exhaust following combustion. A passageway 1630 provides for inflow into a chamber and is used as an intake path for a generic "gas" within the embodiment under discussion. An igniter (not shown) is also located within each chamber to ignite the compressed fuel mixture at the appointed time. An igniter can be located within one or more geometrical elements or an igniter can be incorporated into a housing containing the geometrical elements. Alternatively, in another embodiment, a fuel that ignites under pressure, such as diesel fuel could be used omitting the igniter. In yet other embodiments, an injector can be used to inject fuel into a chamber. As described above, in the context of the other configurations of geometrical elements arranged for use as an internal combustion engine, "gas" or "fuel" is used broadly to describe a combustible mixture of a compressible substance, such as a fuel and a carrier gas, if needed. For example, in various embodiments, "gas" is a combination of a fuel, such as hydrocarbon, and air. Some examples of hydrocarbons are, but are not limited to, alcohol, gasoline, propane, butane, etc. In other embodiments, a "gas" is another combustible mixture of gases, such as but not limited to, hydrogen and oxygen, etc.

FIG. 16 through FIG. 21 describe the cycles of the system as the geometrical elements move through approximately 90 degrees of counter-clockwise rotation as indicated at 1602. The state of the system begins, for the purpose of this description in FIG. 16, at an arbitrarily selected point in time, with a chamber 1604 completing a first intake cycle; the chamber 1604 is at maximum volume. A chamber 1606 has completed a compression cycle and is ready for ignition. A chamber 1608 has completed an expansion cycle, following a previous ignition and is ready to start an exhaust cycle through the passageway 1620. A chamber 1610 is at a point of minimum volume following an exhaust cycle and is ready to start an intake cycle through the passageway 1630.

Figure 17:
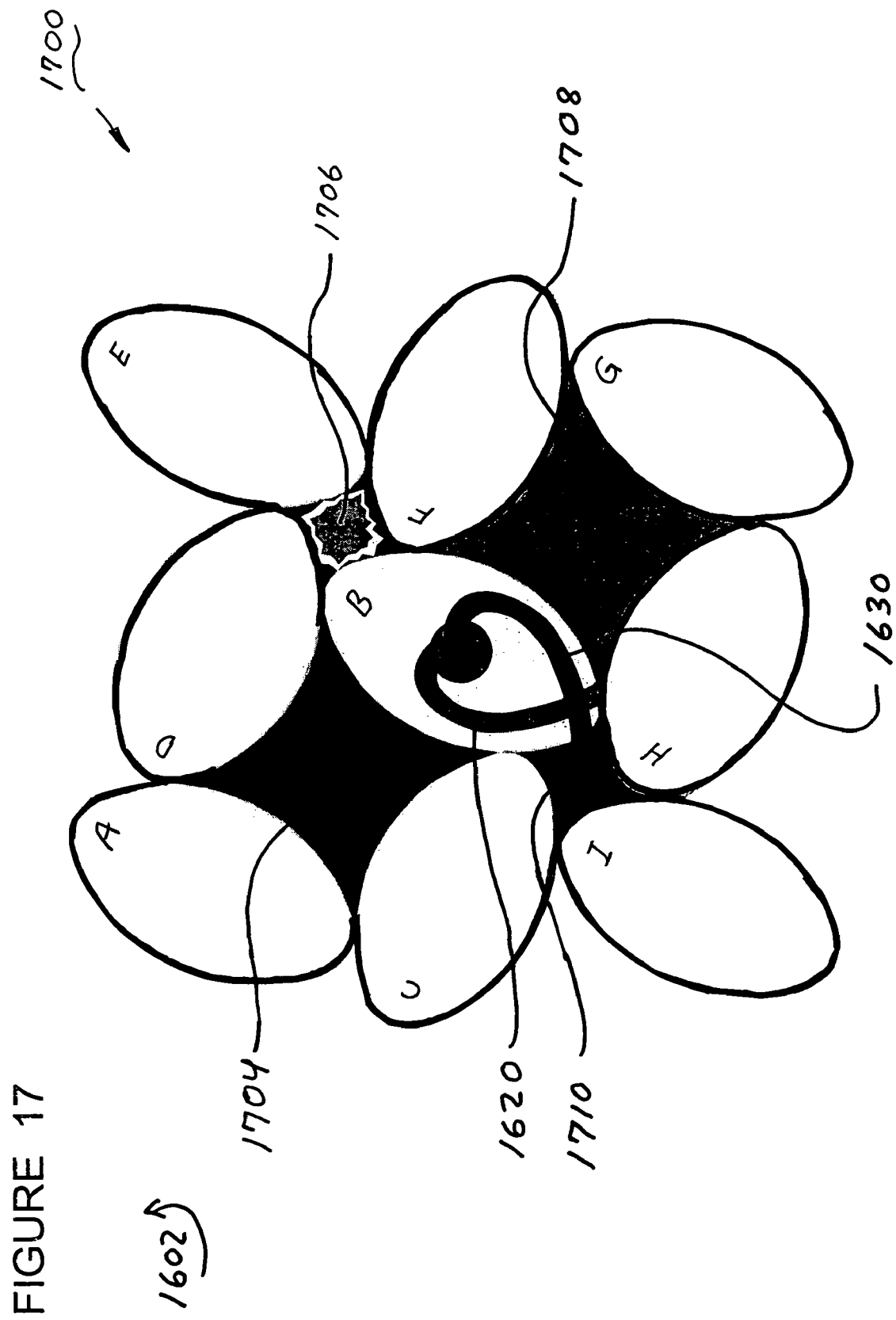
FIG. 17 illustrates a rotation of the geometrical elements from the position depicted in FIG. 16.

FIG. 17 illustrates a rotation of the geometrical elements from the position depicted in FIG. 16. The geometrical elements A, B, C, D, E, F, G, H, and I have advanced through another increment of angular rotation in the direction indicated by arrow 1602. A chamber 1704 is in the compression cycle following completion of the intake cycle. A chamber 1706 is in an expansion cycle following the earlier ignition. A chamber 1708 is beginning the exhaust cycle through the passageway 1620. A chamber 1710 is beginning the intake cycle through the passageway 1630.

Figure 18:
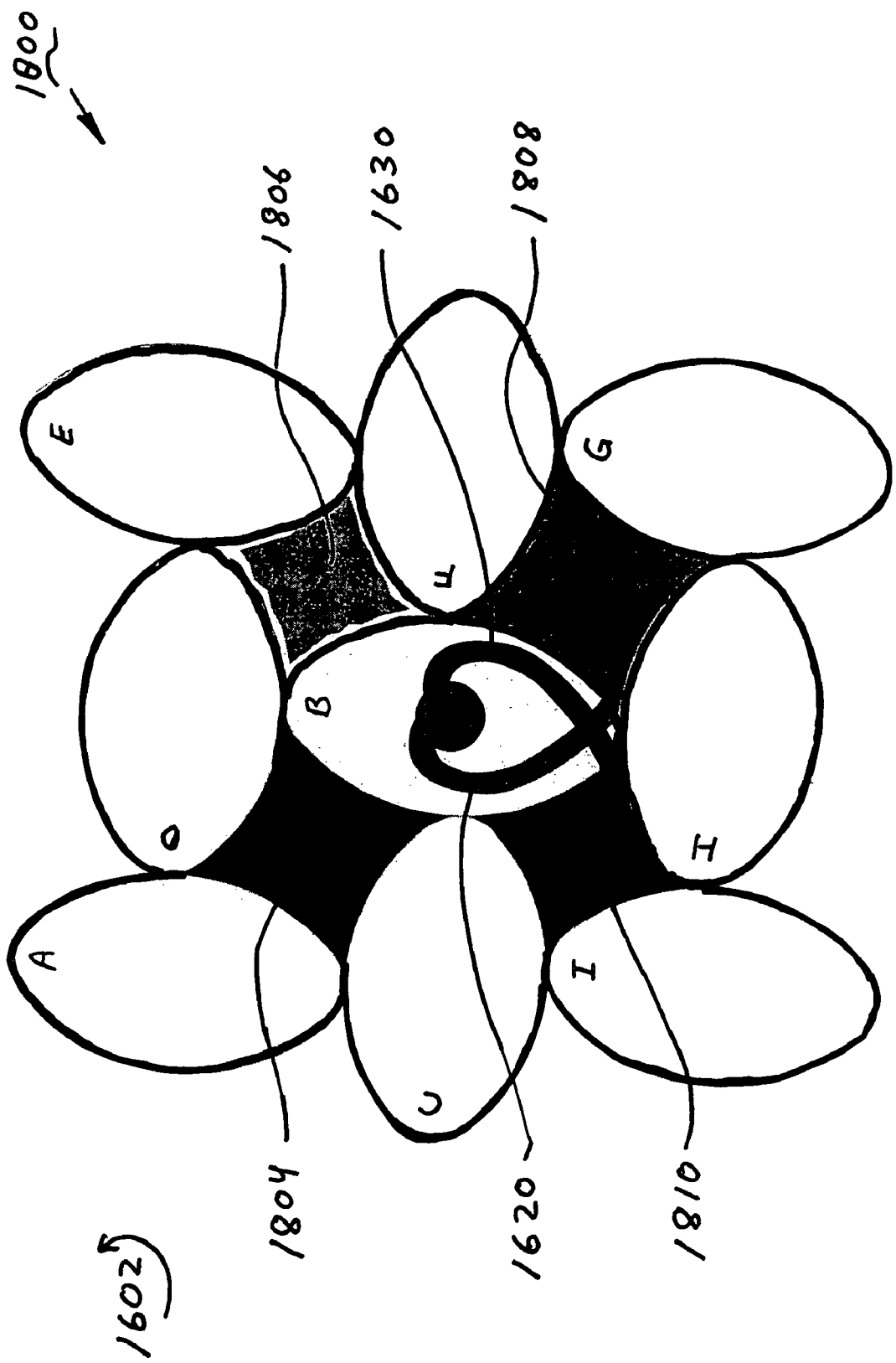
FIG. 18 illustrates a rotation of the geometrical elements from the position depicted in FIG. 17.

FIG. 18 illustrates a rotation of the geometrical elements from the position depicted in FIG. 17. The geometrical elements A, B, C, D, E, F, G, H, and I have advanced through another increment of angular rotation in the direction indicated by arrow 1602. The compression cycle is progressing in a chamber 1804. The expansion cycle is progressing in a chamber 1806. The exhaust cycle is progressing in a chamber 1808 as the products of combustion move out through passageway 1620 and the volume of the chamber 1808 decreases. The intake cycle is progressing in a chamber 1810 as gas is drawn in through the passageway 1630.

Figure 19:
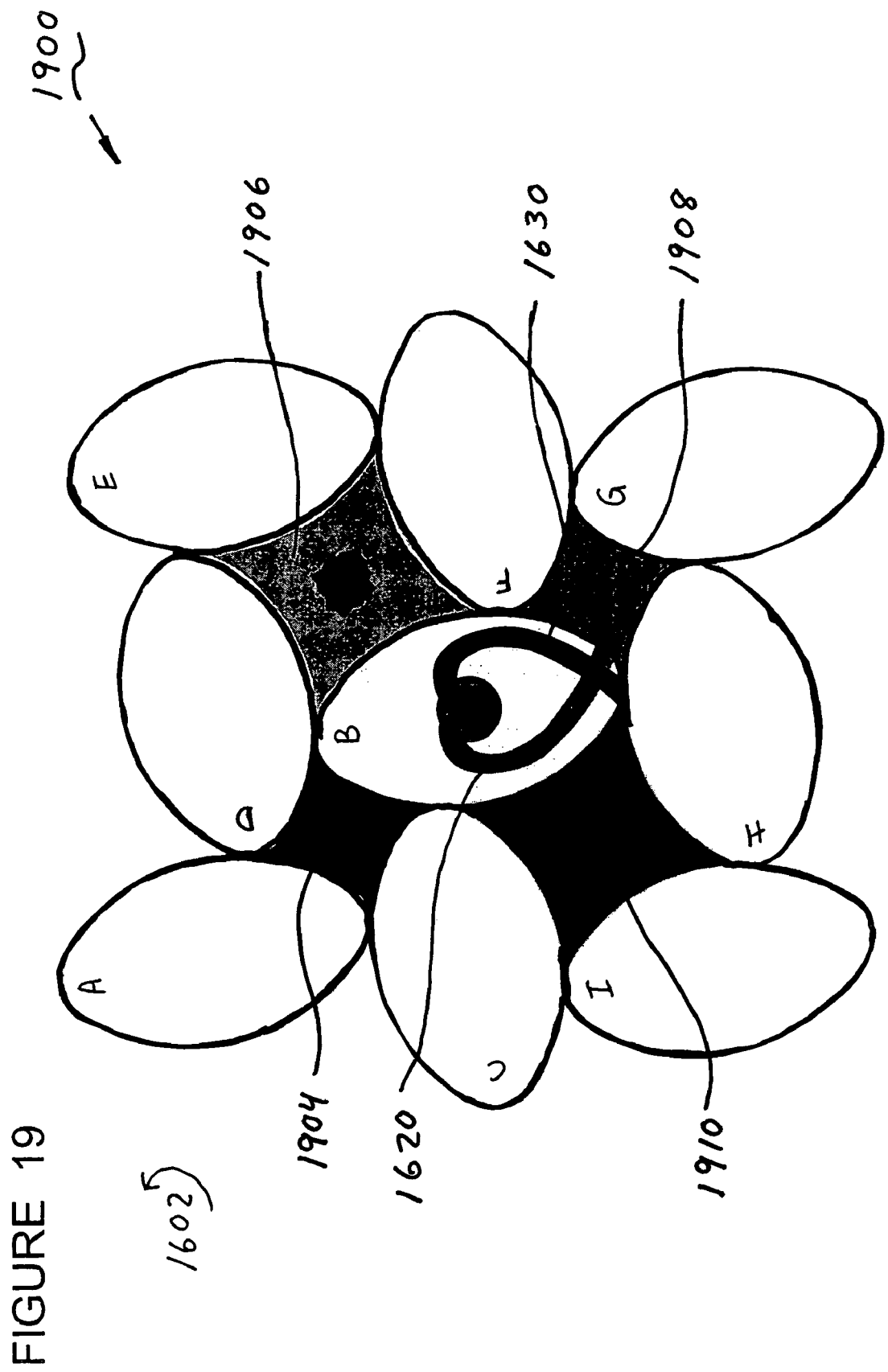
FIG. 19 illustrates a rotation of the geometrical elements from the position depicted in FIG. 18.

FIG. 19 illustrates a rotation of the geometrical elements from the position depicted in FIG. 18. The geometrical elements A, B, C, D, E, F, G, H, and I have advanced through another increment of angular rotation in the direction indicated by arrow 1602. The compression cycle is progressing in a chamber 1904. The expansion cycle is progressing in a chamber 1906. The exhaust cycle is progressing in a chamber 1908 as the products of combustion move out through passageway 1620 as the volume of the chamber 1908 decreases. The intake cycle is progressing in a chamber 1910 as gas is drawn in through the passageway 1630.

Figure 20:
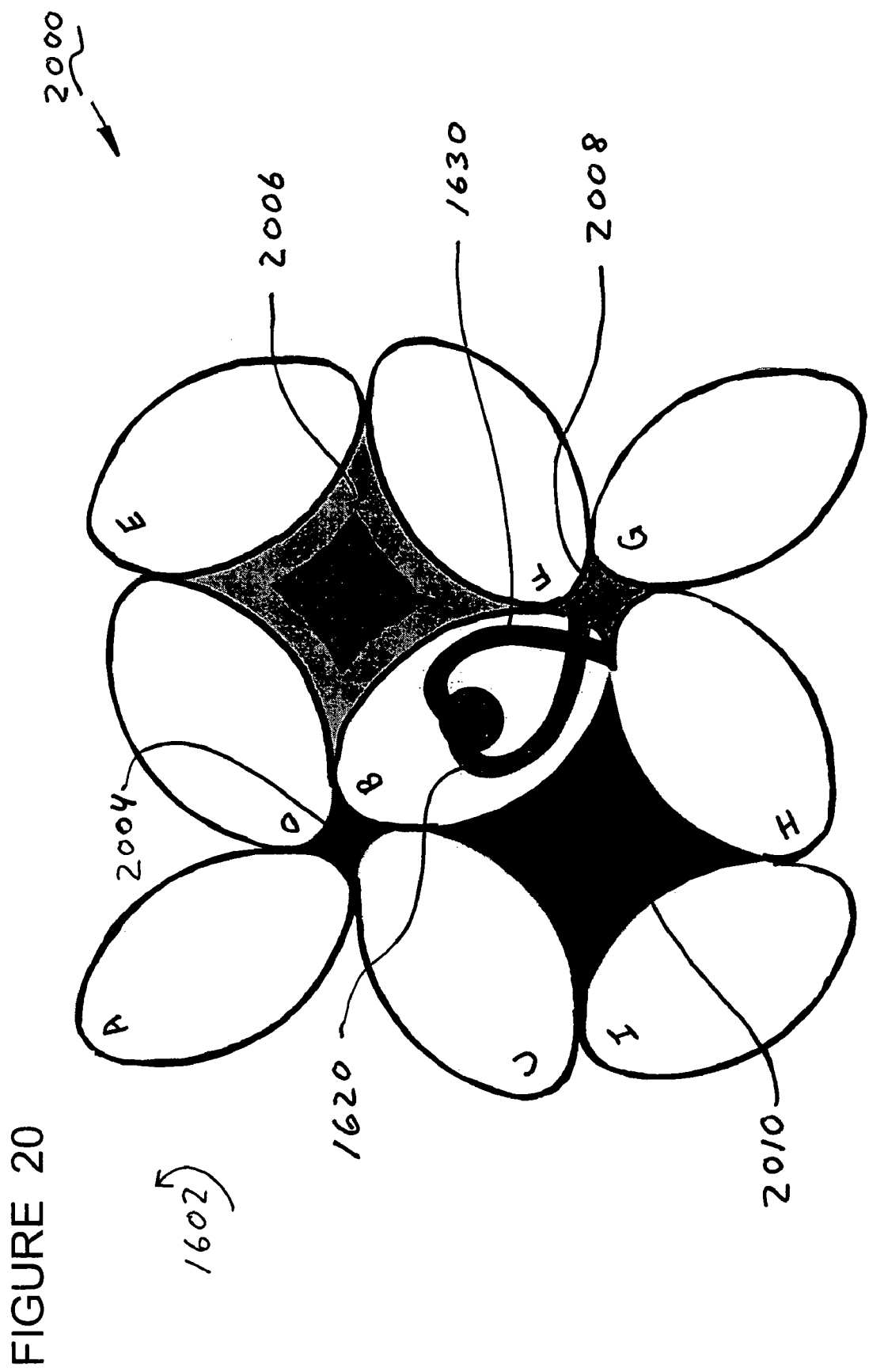
FIG. 20 illustrates a rotation of the geometrical elements from the position depicted in FIG. 19.

FIG. 20 illustrates a rotation of the geometrical elements from the position depicted in FIG. 19. The geometrical elements A, B, C, D, E, F, G, H, and I have advanced through another increment of angular rotation in the direction indicated by arrow 1602. The compression cycle is nearing completion in a chamber 2004. The expansion cycle is nearing completion in a chamber 2006 as the products of combustion move out through passageway 1620 as the volume of a chamber 2008 decreases. The exhaust cycle is nearing completion in the chamber 2008. The intake cycle is nearing completion in a chamber 2010 as gas is drawn in through the passageway 1630.

Figure 21:
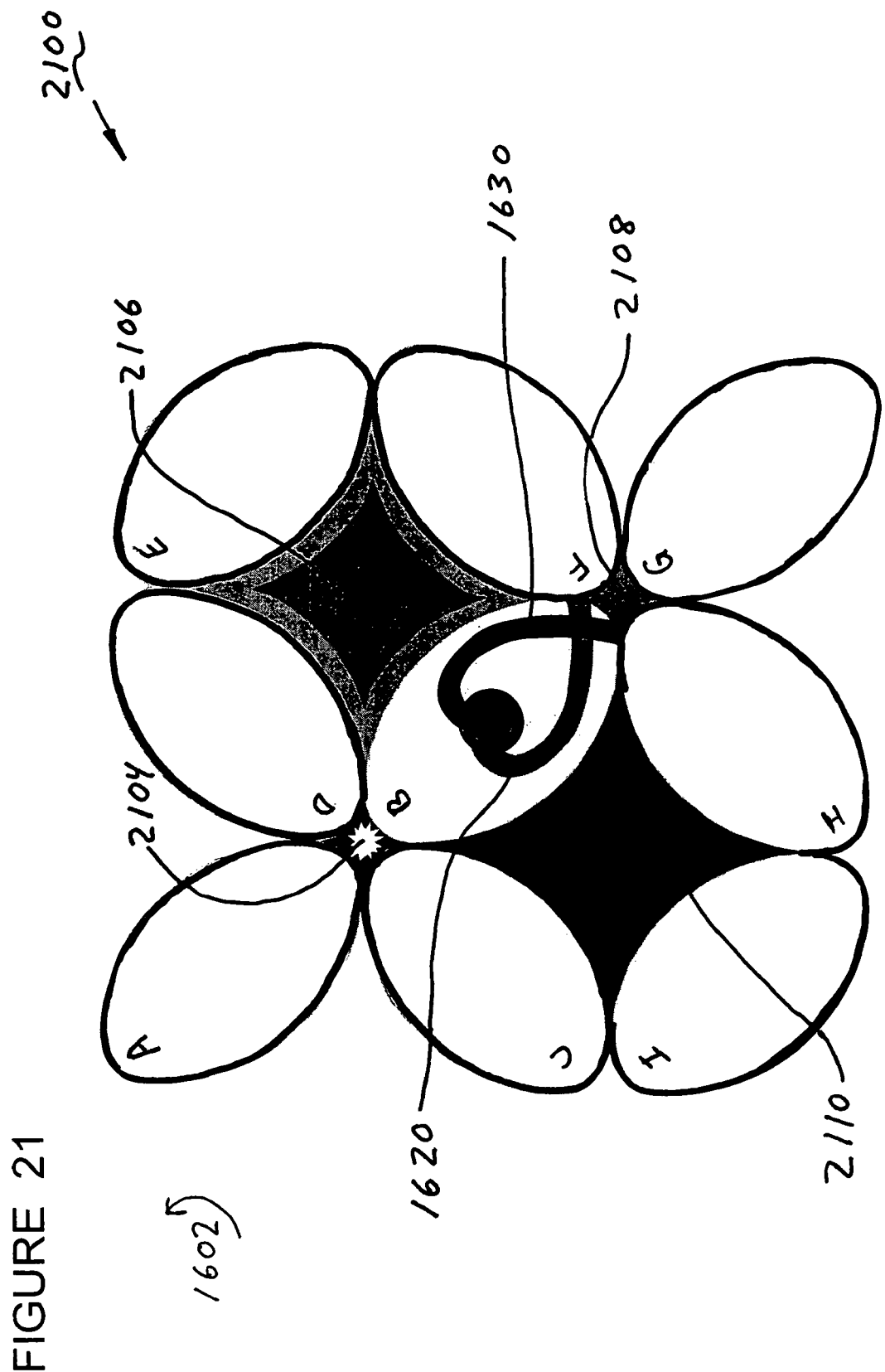
FIG. 21 illustrates a rotation of the geometrical elements from the position depicted in FIG. 20.

FIG. 21 illustrates a rotation of the geometrical elements from the position depicted in FIG. 20. The geometrical elements A, B, C, D, E, F, G, H, and I have advanced through another increment of angular rotation in the direction indicated by arrow 1602. The compression cycle is complete in a chamber 2104 and ignition is imminent. The expansion cycle has ended in the chamber 2106 and the volume of a chamber 2106 is at maximum. The exhaust cycle has ended in a chamber 2108 and the intake cycle is just beginning. The intake cycle is complete in a chamber 2110 and the volume of the chamber 2110 is at maximum.

FIG. 16 through FIG. 21 are used to illustrate approximately 90 degrees of counterclockwise rotation of the geometrical elements A, B, C, D, E, F, G, H, and I. It will be appreciated that in continuous operation an internal combustion engine will follow the description of the cycles given above throughout the rest of the rotation of the geometrical elements as the chambers experience the four cycles of intake, compression, expansion, and exhaust on a rotating basis during operation.

A compression ratio for the system illustrated in FIG. 16 through FIG. 21 can be defined as a ratio of the maximum volume of a chamber to a minimum volume of a chamber. It will be noted that a parameter such as the compression ratio is a design parameter of an internal combustion engine. The compression ratio can be manipulated by adjusting a design parameter of the geometrical elements such as a circle radius R1 (FIG. 15).

Figure 22A:
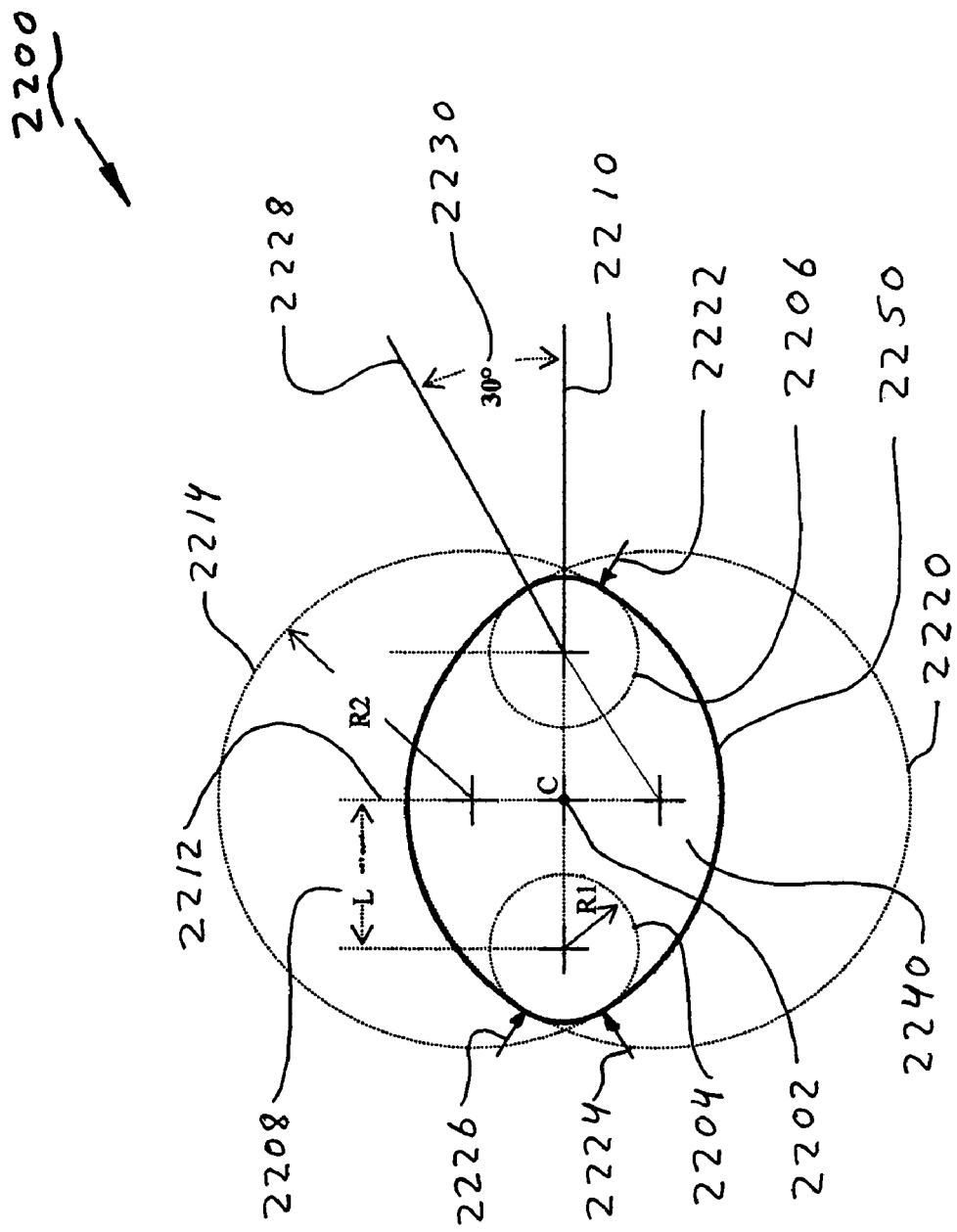
FIG. 22A illustrates a circumferential shape of a geometrical element adapted to a spherical configuration according to one embodiment.

FIG. 22A illustrates a circumferential shape of a geometrical element adapted to a spherical configuration according to one embodiment. Referring to FIG. 22A, a geometrical element 2200 has a generally elliptical circumferential shape 2250. The circumferential shape 2250 of the geometrical element 2200 is made by positioning a first circle 2204, having radius R1, and a second circle 2206, having radius R1, each a distance 2208 (L) from a point 2202 (C) of a line 2210. The line 2210 intersects the centers of circles 2204 and 2206. A line 2212 is drawn perpendicular to the line 2210 and through the point 2202 (C). A second circle 2214, having radius R2, is positioned along the line 2212 and above the line 2210. The location on the line 2212, for the center of the circle 2214, is selected such that the center of circle 2214 and a center of circle 2204 form a line that makes an angle of 30 degrees with the line 2210. The magnitude of radius R2 is selected so that the circle 2214 is tangent to circles 2204 and 2206. Similarly, a second circle 2220, having radius R2, is located on the line 2212 and below the line 2210. The location on the line 2212, for the center of the circle 2220, is selected such that the center of circle 2220 and a center of circle 2206 form a line that makes an angle of 30 degrees (2230) with the line 2210. The circle 2220, also having radius R2, is tangent to circles 2204 and 2206.

The circle 2206 and the circle 2220 intersect at a point of common tangency, the location of which is indicated by a line 2228. The line 2228 makes an angle (2230) of 30 degrees with the line 2210. A similar point of common tangency occurs between the circle 2206 and the circle 2214 at a location 30 degrees below line 2210, as indicated at 2222. Similar points of common tangency occur between the circle 2204 and the circle 2214 at 2224 and the between the circle 2204 and the circle 2220 at 2226. It will be noted that the circumferential shape 2250 of the geometrical element 2200 is made up of four regions. Two of the regions correspond to contributions from circles 2206 and 2204, having radius of curvature R1, and two of the regions correspond to contributions from circles 2220 and 2214, having radius of curvature R2. The geometrical element is mounted for rotation about the point 2202 (C).

Figure 22B:
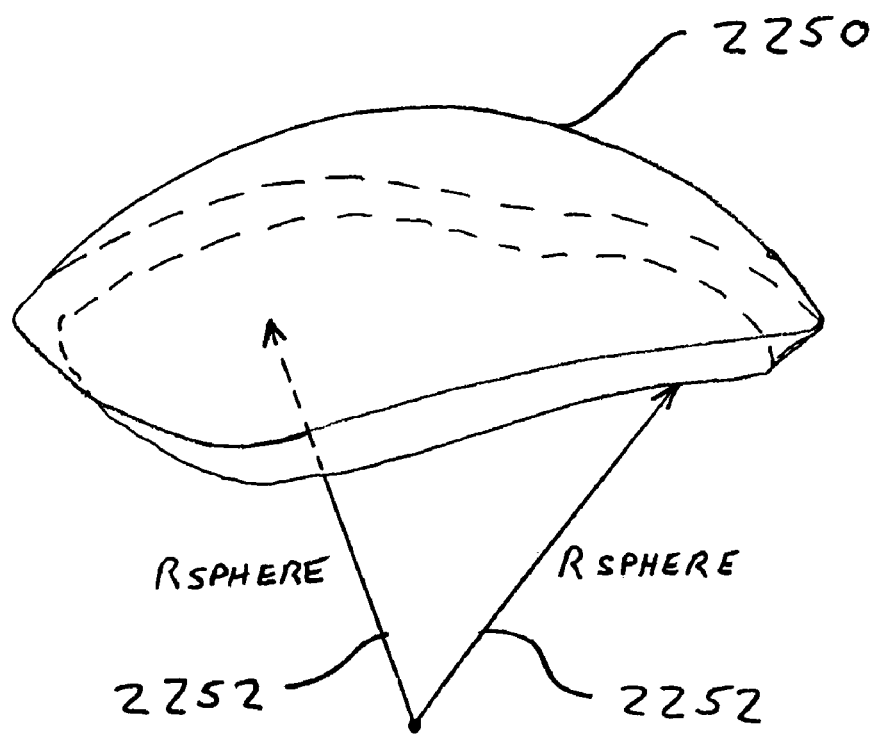
FIG. 22B illustrates a geometrical element with a spherical shape.
Figure 23:
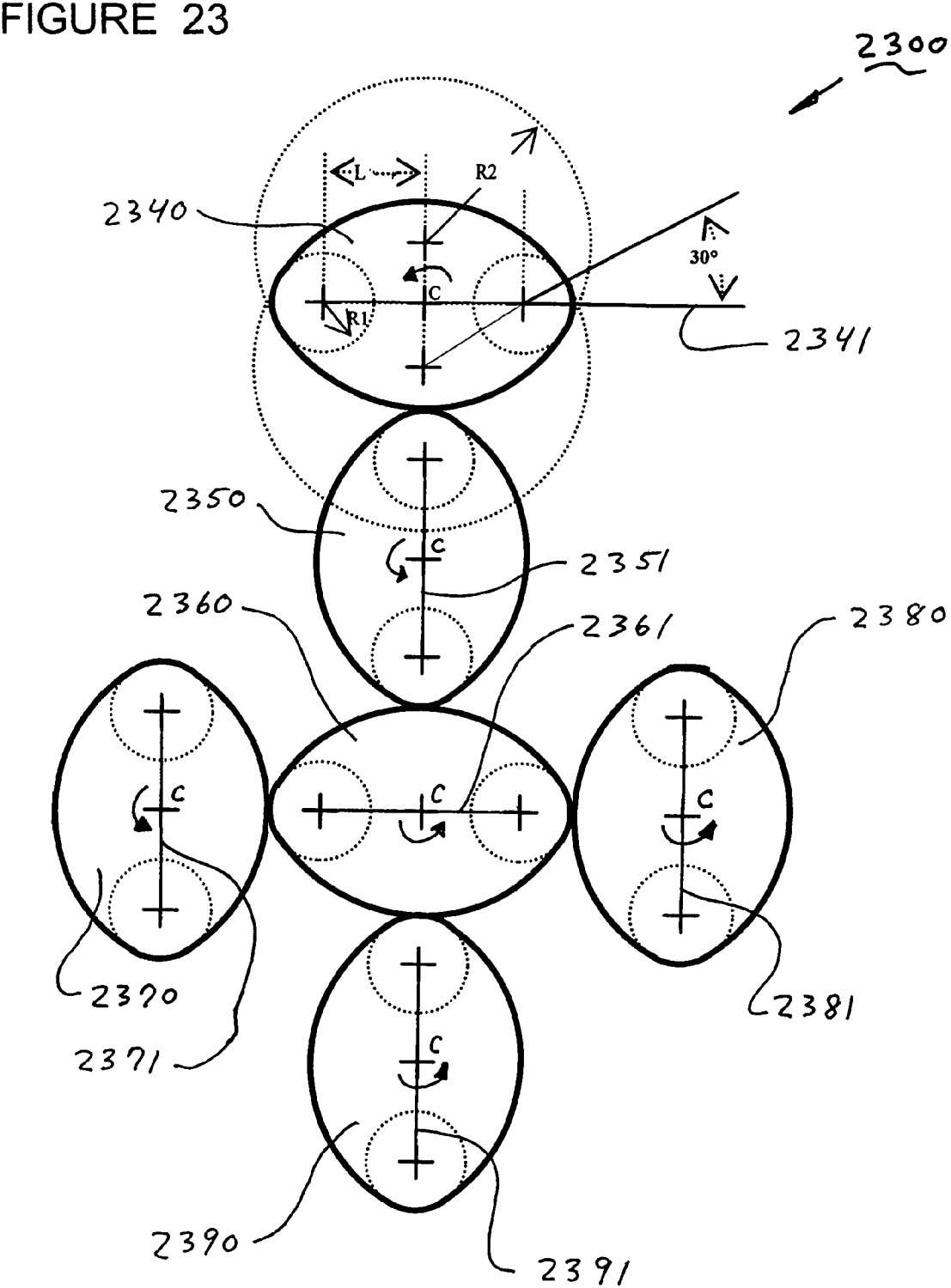
FIG. 23 illustrates an arrangement of the geometrical elements shown in FIG. 22A.

Referring to FIG. 22B, the geometrical element 2200 (FIG. 22A) is designed to be wrapped on a sphere to create a spherical shape 2250, having a radius "R$_{SPHERE}$" as indicated at 2252. Referring back to FIG. 22A, the geometrical element 2250 is configured to rotate around the point 2202 (C). Additional geometrical elements, such as geometrical element 2200, are configured to form a plurality of chambers. A volume of a chamber is made to vary with the rotation of the geometrical elements. FIG. 23 illustrates an arrangement of geometrical elements, each of which have the circumferential shape 2250 (FIG. 22). Referring to FIG. 23, geometrical elements 2340 and 2360 are arranged with lines 2341 and 2361 parallel to one another on the flat pattern of FIG. 23. The lines 2341 and 2361 will coincide with meridians of a sphere after the flat pattern of the geomelilcal elements.is transformed to spherical coordinates. Geometrical elements 2350, 2370, 2380, and 2390 are rotated 90 degrees from the orientation of geometrical elements 2340 (second common geometrical element) and 2360 (first common geometrical element) (lines 2351, 2371, 2381, and 2391 being perpendicular to lines 2341 and 2361). In one embodiment, the arrangement of geometrical elements shown in FIG. 23 is wrapped around a sphere to form a spherical arrangement of geometrical elements. FIG. 24 shows a relationship between the circumferential shape of FIG. 22 or FIG. 23 and a sphere. The radius of the sphere (R$_{SPHERE}$) is given by an equation 2400 in FIG. 24. The geomebical elements are configured for rotation about their central points marked with the letter "C" in FIG. 23 and indicated by 2202 (C) in FIG. 22.

Figure 25:
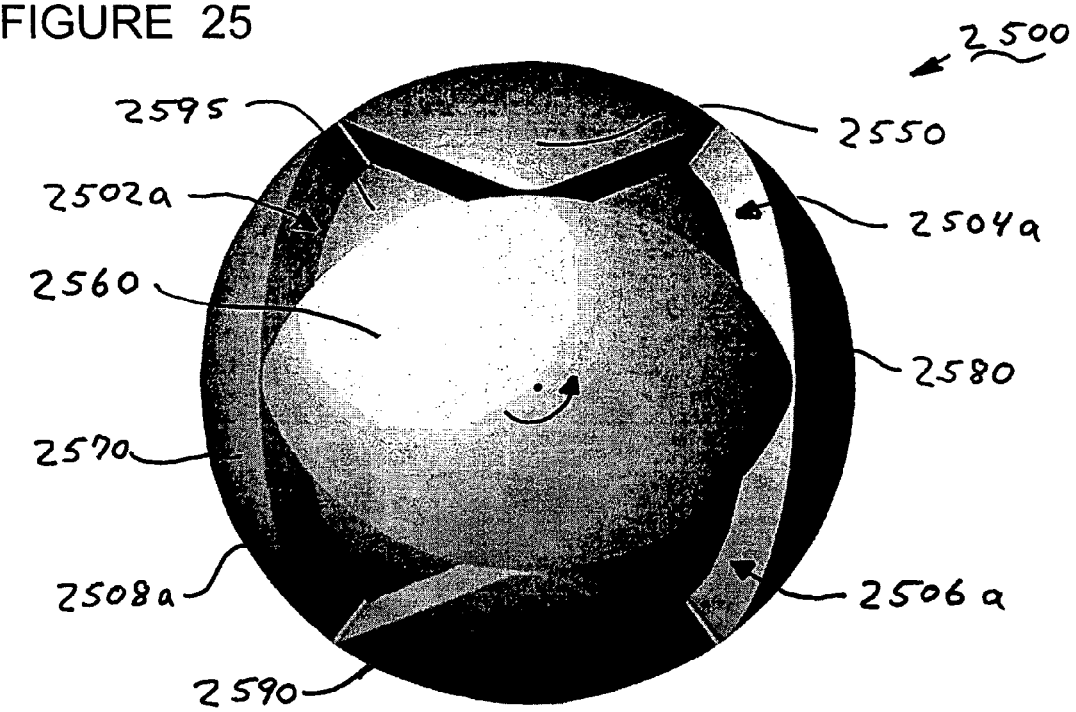
FIG. 25 depicts arrangements of geometrical elements that form eight chambers according to one embodiment.
Figure 25:
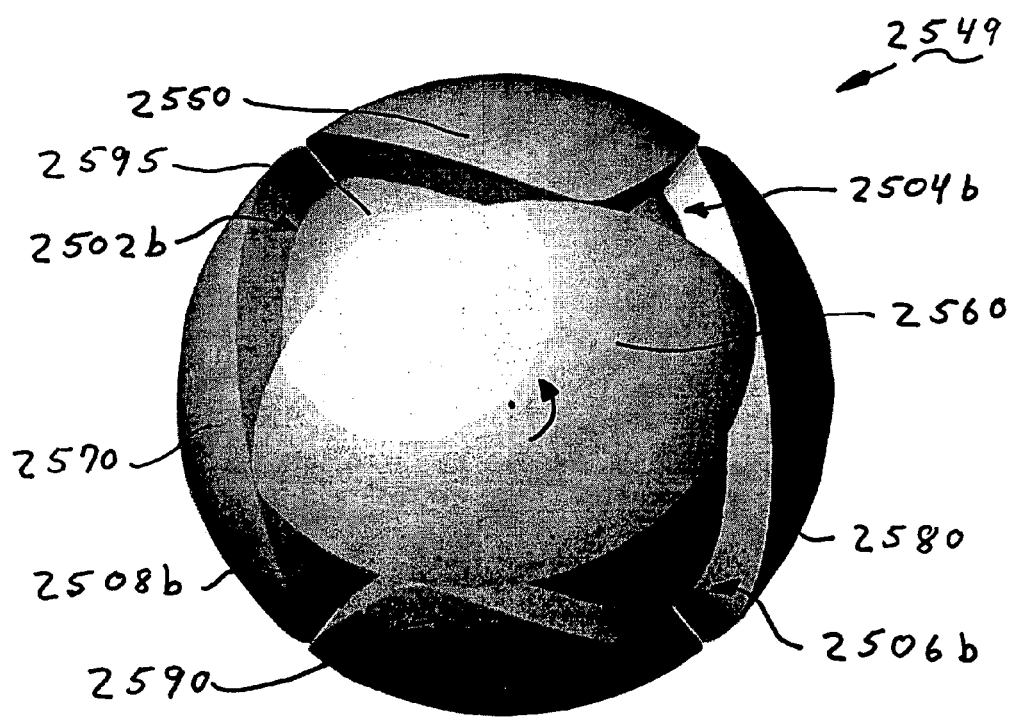

FIG. 25 depicts arrangements of geometrical elements that form eight chambers according to one embodiment. It will be noted that the design of geometrical elements, according to the description directed to FIG. 22, can produce a variety of differently shaped geometrical elements, for example, radius R1 can be varied to produce chambers that have different maximum and minimum volumes between adjacent geometrical elements than the chambers illustrated in the figures. The shapes and chambers illustrated in the figures are provided for illustration only and are not to be taken in a limiting sense.

In one embodiment, with respect to FIG. 25, an arrangement of six geometrical elements 2550, 2560, 2570 (first common geometrical element), 2580, 2590, and 2540 (second common aeomefrical element, not visible on the back side; however, 2540 appears in the same orientation as 2560 appears because of symmetry) is wrapped on a sphere 2595 and is configured for synchronized counterclockwise rotation as indicated by the arrows in FIG. 23. The direction of rotation can also be observed when a geometrical element is viewed from above the surface of the element and along an axis that intersects the center of the sphere and corresponds to a point of rotation, such as the point 2202 (C) in FIG. 22. In other embodiments, the geometrical elements are configured for clockwise rotation about their respective axes.

In the embodiment illustrated, any geometrical element, such as 2560, can be configured with passageways that permit the arrangement of geometrical elements to function as an internal combustion engine. For example, geometrical element 2560 can be configured with passageways, such as passageway 1620 and 1630 (FIG. 16) thereby providing intake and exhaust functionality to the four chambers 2502a, 2504a, 2506a, and 2508b. In other embodiments, the passageways can be located in other geometrical elements or in a housing used in conjunction with the geometrical elements. In yet other embodiments, arrangements of elements with suitable passageways can be configured as a pump, as described below in conjunction with the figures that follow.

FIG. 25 through FIG. 27A provide illustrations of five positions of the geometrical elements 2550, 2560, 2570, 2580, 2590, and 2540 (not visible on the back side) thereby illustrating creation of chambers and varying the volume of the chambers during rotation of the geometrical elements. The chambers are created with the geometrical elements 2550, 2560, 2570, 2580, 2590, and 2540 (not visible on the back side), a contained sphere 2595, and a spherical housing (not shown) described below, in one embodiment, in conjunction with FIG. 27B. In position 2500, the geometrical elements 2550, 2560, 2570, 2580, 2590, and 2540 (not visible on the back side) are arranged at an arbitrary starting point that coincides with the flat orientation of geometrical elements shown in FIG. 23 at 2300. Eight chambers are formed; however, only four chambers, 2502a, 2504a, 2506a, and 2508a are visible in the view presented in FIG. 25. The other four chambers are formed in a similar manner and are located on the back side of the sphere. The other four chambers, on the back side of the sphere, can be configured with appropriate passageways, such as passageways 1620 and 1630 (FIG. 16) within the geometrical element 2540 (not visible) to provide intake and exhaust functionality. It will be noted that different configurations of passageways can be provided for the chambers, other than the ones described, including passageways exclusively in a housing as well as passageways within a combination of geometrical elements and a housing.

Position 2549 illustrates synchronized rotation of the geometrical elements through an arbitrarily selected angular interval relative to position 2500. A chamber 2502b has increased in volume relative to the volume of the chamber 2502a. A chamber 2504b has decreased in volume relative to the volume of the chamber 2504a. A chamber 2506b has increased in volume relative to the volume of the chamber 2506a. A chamber 2508b has decreased in volume relative to a volume of the chamber 2508a.

Figure 26:
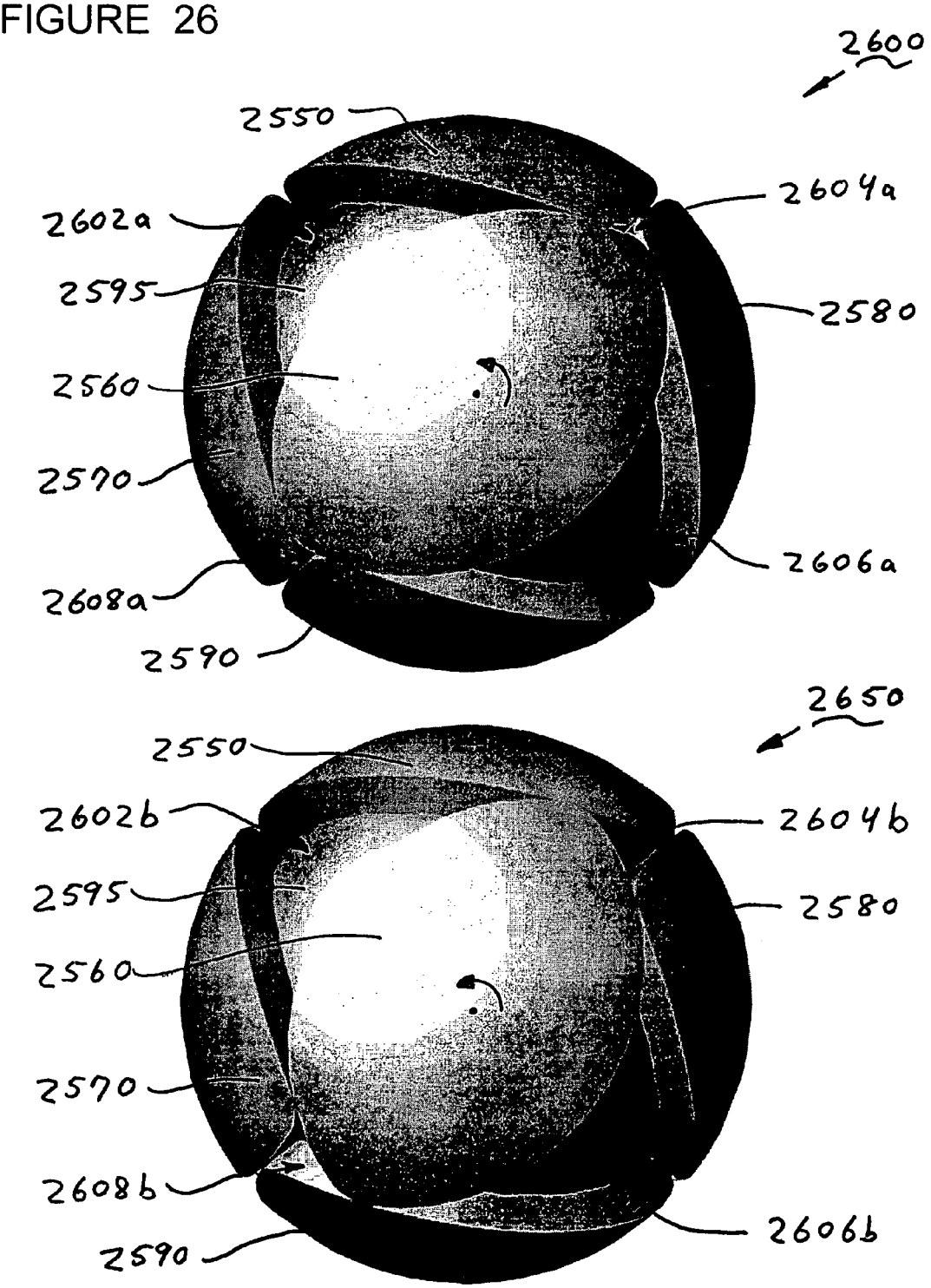
FIG. 26 illustrates rotations of the geometrical elements from the positions depicted in FIG. 25.

FIG. 26 illustrates rotations of the geometrical elements from the positions depicted in FIG. 25. With reference to FIG. 26, position 2600 illustrates synchronized rotation of the geometrical elements through an arbitrarily selected angular interval relative to position 2549 (FIG. 25). A chamber 2602a has increased in volume relative to the volume of chamber 2502b. The chamber 2602a is almost at maximum volume. A chamber 2604a has decreased in volume relative to the volume of the chamber 2504b. The chamber 2604a is close to a minimum volume condition. A chamber 2606a has increased in volume relative to the volume of the chamber 2506b. The chamber 2606a is almost at a maximum volume condition. A chamber 2608a has decreased in volume relative to a volume of the chamber 2508b. The chamber 2608a is almost at a minimum volume condition.

Position 2650 illustrates synchronized rotation of the geometrical elements through an arbitrarily selected angular interval relative to position 2600. A chamber 2602b has decreased in volume relative to the volume of the chamber 2602a. The chamber 2602b has passed through the maximum volume position. A chamber 2604b has increased in volume relative to the volume of the chamber 2604a. The chamber 2604b has passed through the minimum volume position. A chamber 2606b has decreased in volume relative to the volume of the chamber 2506a. The chamber 2606b has passed through the maximum volume position. A chamber 2608b has increased in volume relative to a volume of the chamber 2608a. The chamber 2608b has passed through the minimum volume position.

Figure 27A:
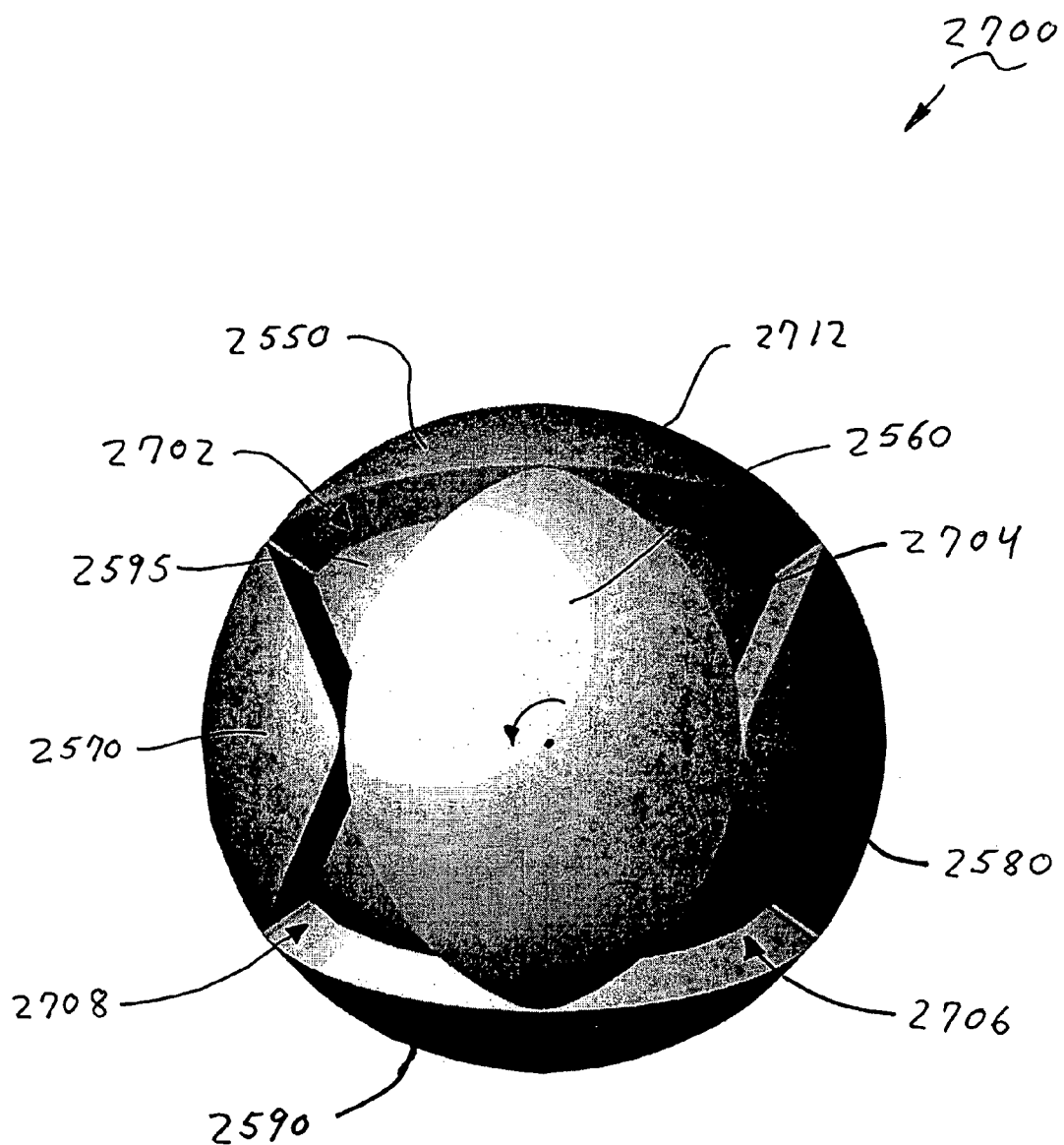
FIG. 27A illustrates a rotation of the geometrical elements from the positions depicted in FIG. 26.

FIG. 27A illustrates a rotation of the geometrical elements from the positions depicted in FIG. 26. With reference to FIG. 27A, position 2700 illustrates synchronized rotation of the geometrical elements through an arbitrarily selected angular interval relative to the position 2650 (FIG. 26).

A chamber 2702 has decreased in volume relative a volume of the chamber 2602b. A chamber 2704 has increased in volume relative to the volume of the chamber 2604b. A chamber 2706 has decreased in volume relative to the volume of the chamber 2606b. A chamber 2708 has increased in volume relative to the volume of the chamber 2608b.

Figure 27B:
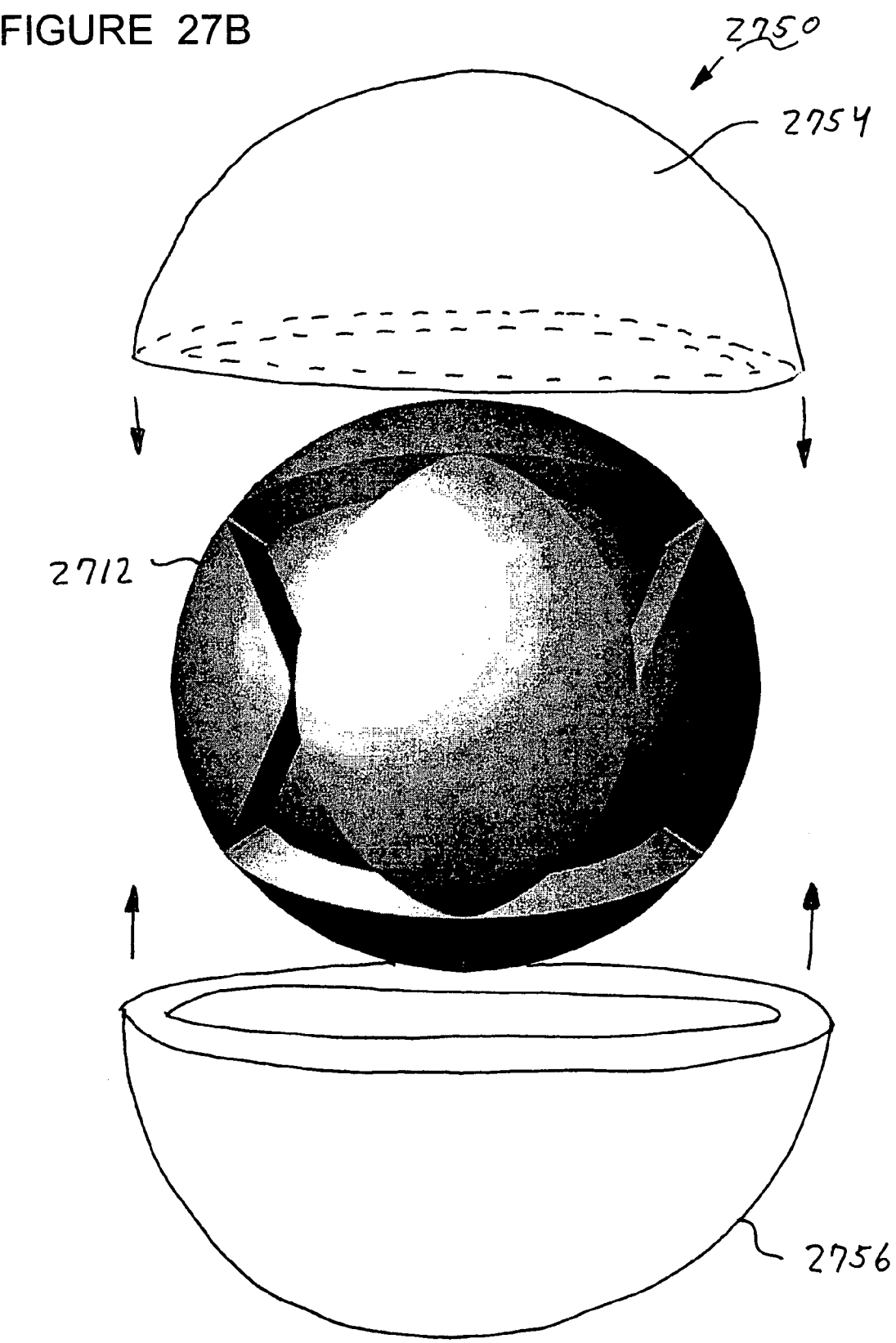
FIG. 27B depicts a spherical housing according to one embodiment.

FIG. 27B depicts a spherical housing according to one embodiment. Referring to FIG. 27B, a spherical housing is constructed over the spherically shaped geometrical elements and the contained sphere 2595 as shown in the preceding figures, such as in assembly 2712 in FIG. 27A. A spherical outer or inner housing can be assembled using a plurality of pieces. In one embodiment, a spherical outer housing is made in two parts, a first part 2754 and a second part 2756. The spherical outer housing and the spherical inner housing (such as the contained sphere 2595) contribute surface area to the chambers, such as the chambers 2702, 2704, 2706, and 2708 (FIG. 27A).

Figure 27C:
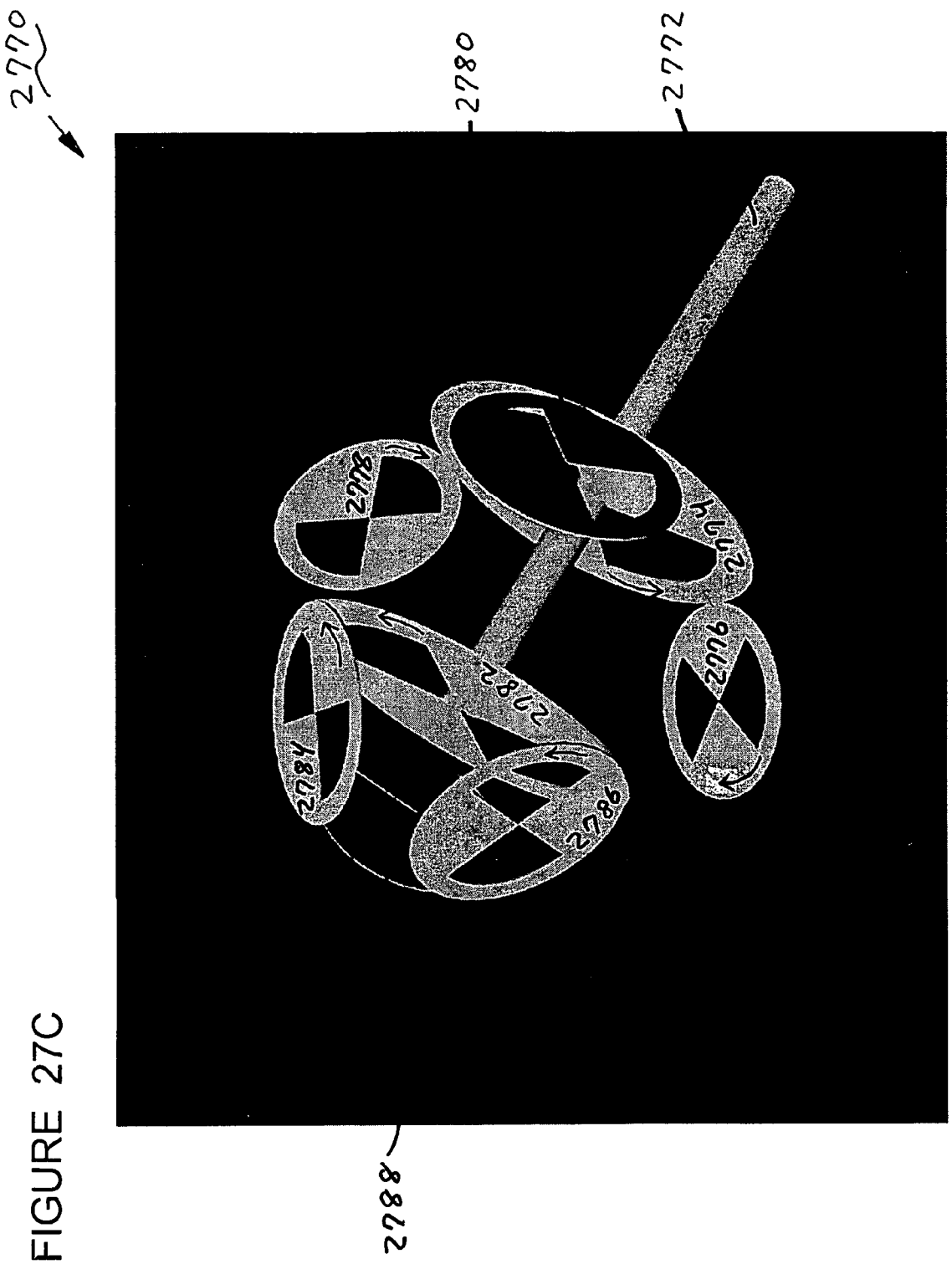
FIG. 27C illustrates synchronizing the rotation of spherically shaped geometrical elements according to one embodiment.

FIG. 27C illustrates synchronizing the rotation of spherically shaped geometrical elements according to one embodiment. Referring to FIG. 27C, a shaft 2772 is configured with a gear 2774 and a gear 2782. The gear 2774 engages and rotates gears 2776, 2778, and 2780. Similarly, the gear 2782 engages and rotates gears 2784, 2786, and 2788. Each of the gears 2774, 2776, 2778, 2784, 2786, and 2788 are connected to a spherically shaped geometrical element. As the shaft 2772 rotates, each of the spherically shaped geometrical elements rotates in the same direction thereby a state of synchronized rotation is achieved with the six spherically shaped geometrical elements. The example given above is one illustration of a mechanism for achieving synchronized rotation of spherically shaped geometrical elements and no limitation is implied thereby.

Figure 28:
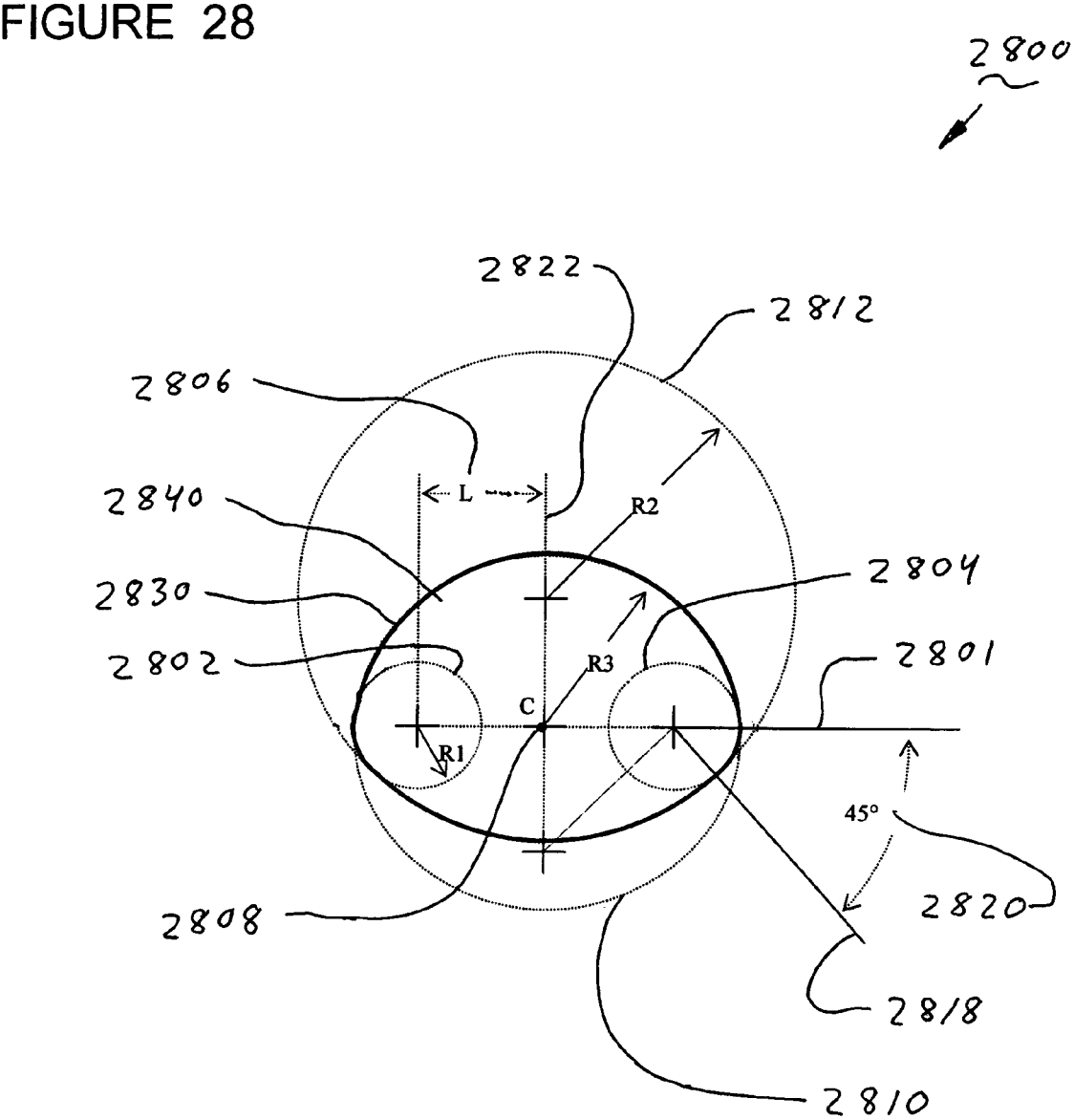
FIG. 28 illustrates a circumferential shape of a hybrid geometrical element according to one embodiment.

In various embodiments, other circumferential shapes can be employed with geometrical elements, which are configured to form chambers. A hybrid geometrical element substitutes a circular section for a portion of the geometrical element's circumferential shape. FIG. 28 illustrates a circumferential shape of a hybrid geometrical element according to one embodiment. Similar alpha and alphanumeric symbols refer to the same quantity in FIG. 28 and FIG. 29 only. With reference to FIG. 28, a hybrid geometrical element 2800 is a geometrical element that rotates adjacent to a geometrical element that has a different circumferential shape; the geometrical element that has the different circumferential shape is described as having a complementary shape. A geometrical element that has a complementary shape to 2800 is shown in FIG. 29 at 2900.

Referring back to FIG. 28, two circles 2802 and 2804, each having radius R1, are disposed along a line 2801, a distance 2806 (L) from a central point 2808 (C). A line 2822 is perpendicular to the line 2801 and the line 2822 intersects the point 2808 (C). A circle 2810, having radius R3, is centered on the point 2808 (C) and is tangent to circle 2804 at the intersection of the circle 2810 and the line 2801. Similarly, the circle 2810 is tangent to the circle 2802 at the intersection of the circle 2810 and the line 2801. A center of a circle 2812, having radius R2, is located on the line 2822 a distance 2806 (L) from the point 2808 (C) and above the line 2801. A circumferential shape 2830 for the geometrical element 2800 includes four regions. Two of the regions have a radius of curvature R1 and are contributions from the circle 2802 and the circle 2804. A third region has a radius of curvature R3 and is a contribution from the circle 2810. A fourth region has a radius of curvature R2 and is the contribution from the circle 2812. The circle 2812 is tangent to the circle 2804 at a location indicated by line 2818, which is 45 degrees (2820) relative to the line 2801.

Figure 29:
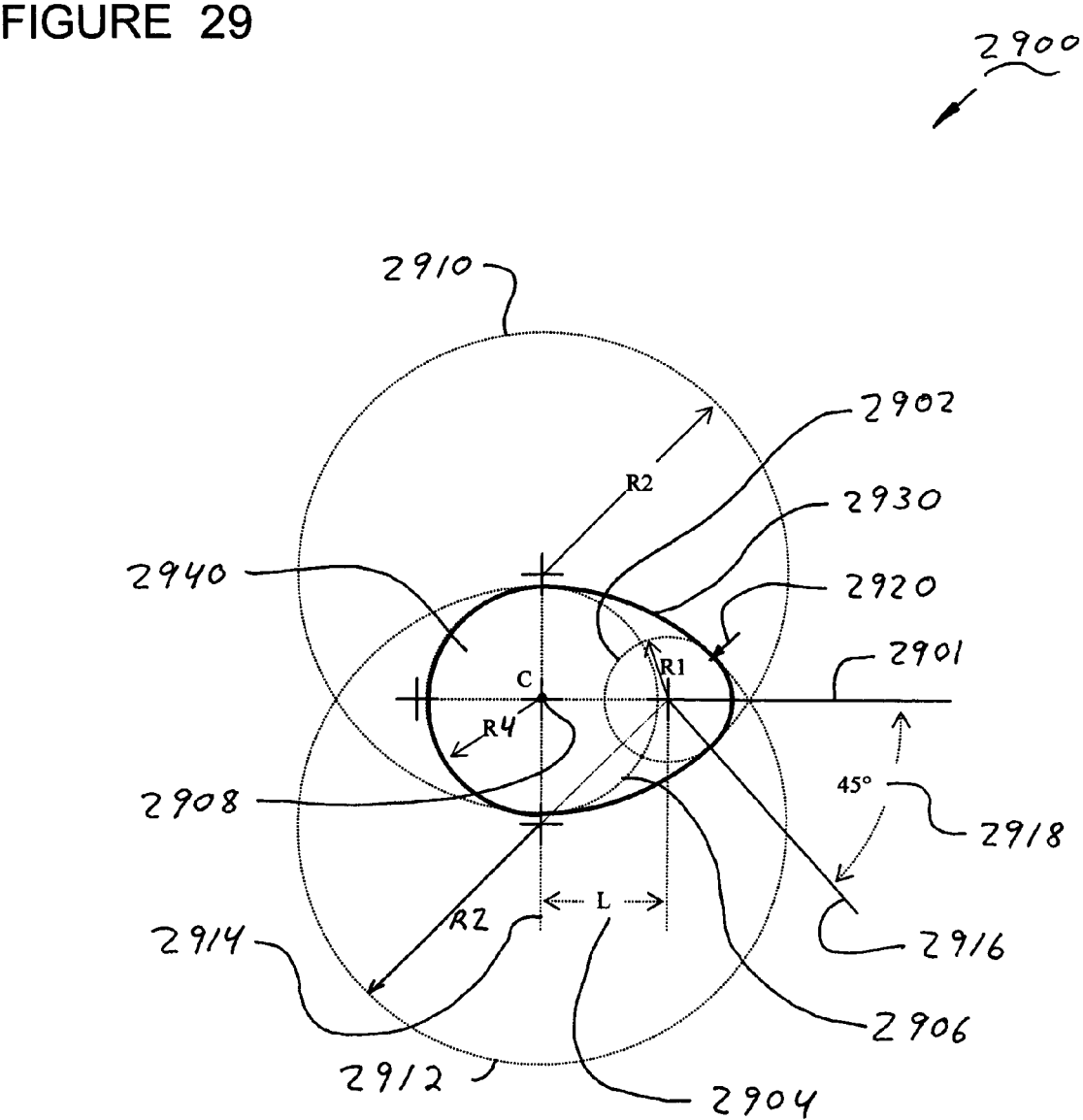
FIG. 29 illustrates a circumferential shape of a geometrical element that is complementary to the geometrical element of FIG. 28, according to one embodiment.

FIG. 29 illustrates a circumferential shape of a geometrical element that is complementary to the geometrical element of FIG. 28. Referring to FIG. 29, a circle 2902 having a radius R1 is located a distance L (2904) from a point 2908 (C) along a line 2901. A circle 2906 having radius R4 is centered on the point 2908 (C). A line 2914 is perpendicular to the line 2901 and passes through the point 2908 (C). A circle 2910 having radius R2 is located a distance L from the point 2908 (C) along the line 2914 and above the line 2901. A point of common tangency exists between the circle 2910 and the circle 2902 at a location indicated by a line 2916 which makes an angle (2918) of 45 degrees with the line 2901. A circle 2912 having radius R2 is located a distance L from the point 2908 (C) along the line 2914 and below the line 2901. A point of common tangency exists between the circle 2912 and the circle 2902 at a location indicated at 2920. A line passing through the point 2920 and the center of the circle 2902 makes an angle of 45 degrees with the line 2901. The circle 2906 is tangent to the circle 2912 and the circle 2910 at the intersection of the circles and the line 2914.

The circumferential shape 2930 of the geometrical element 2900 is represented by the portions of the circles contained between the points of common tangency as described above. The circumferential shape 2930 of the geometrical element 2900 includes four regions. Two of the regions have a radius R2 and are contributions from the circle 2910 and the circle 2912. A third region has a radius of curvature R4 and is a contribution from the circle 2906. A fourth region has a radius of curvature R1 and is the contribution from the circle 2902. The complementary geometrical element 2900 rotates about the point 2908 (C).

Figure 30:
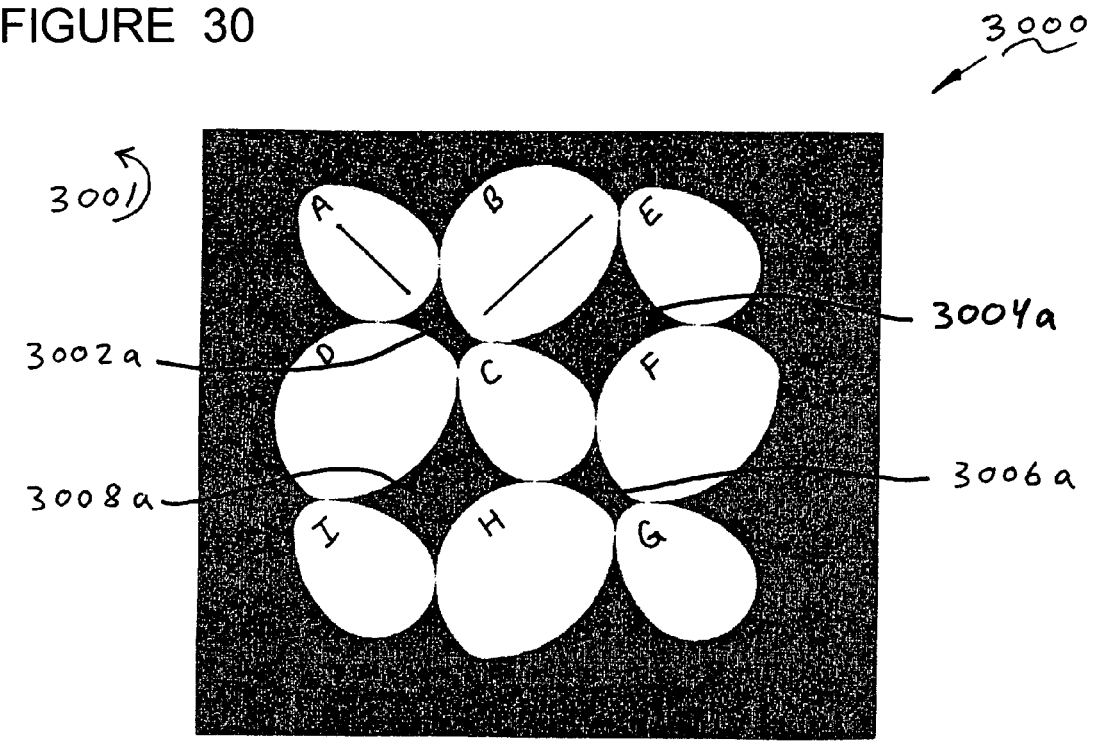
FIG. 30 depicts arrangements of the geometrical elements shown in FIG. 28, and FIG. 29, according to one embodiment.
Figure 30:
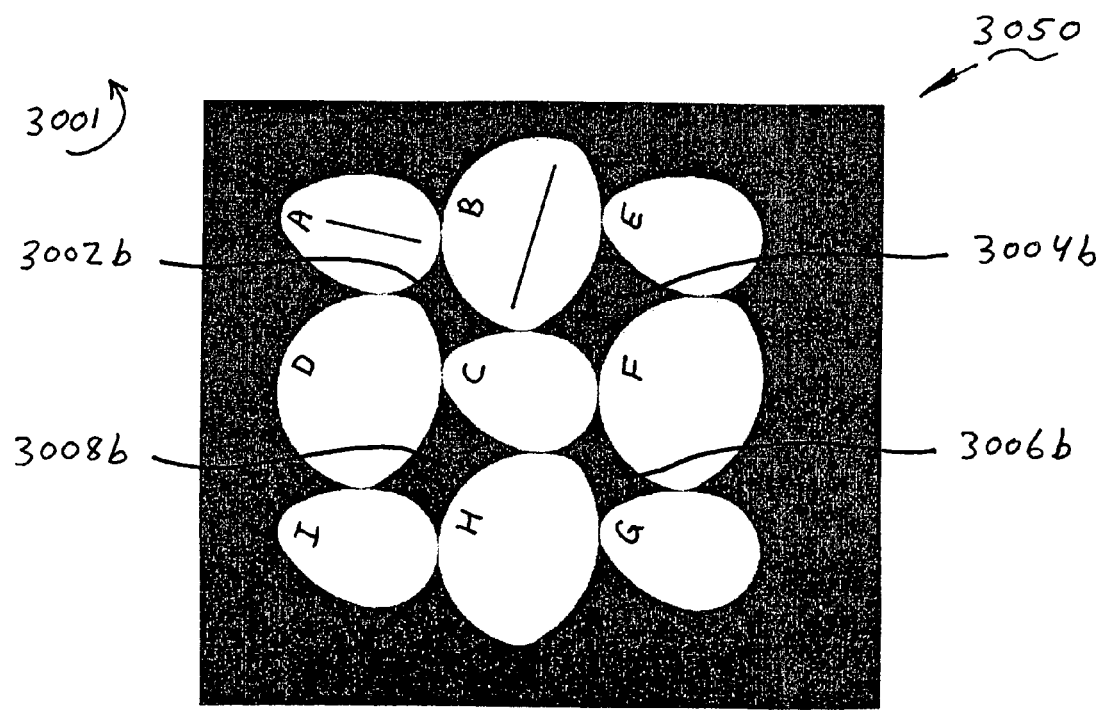

FIG. 30 depicts arrangements of the geometrical elements shown in FIG. 28, and FIG. 29, according to one embodiment. FIG. 30 through FIG. 33 illustrate hybrid geometrical elements and their compliments using alpha markings A, B, C, D, E, F, G, H, and I to indicate the same geometrical element across FIG. 30 through FIG. 33 only. Referring back to FIG. 30, two positions of geometrical elements are indicated by 3000 and 3050. In position 3000, geometrical elements A, B, C, D, E, F, G, H, and I are arranged for synchronized counterclockwise rotation as indicated by an arrow 3001. It will be noted that clockwise rotation can occur in other embodiments; no limitation is implied by the direction selected for rotation of the geometrical elements. Geometrical elements B, D, F, and H have been designed according to the principles described in conjunction with FIG. 28. Geometrical elements A, C, G, E, and I have been designed according to the principles described in conjunction with FIG. 29. Geometrical elements A and B have lines drawn thereon which correspond to the lines 2901 (FIG. 29) and the line 2801 (FIG. 28) to facilitate observation of the rotation of the geometrical elements by the reader.

Four chambers are created by the geometrical elements A, B, C, D, E, F, G, H, and I and appropriate planar housings (not shown). A chamber 3002a and a chamber 3006a are nominally at a position corresponding to a minimum volume. A chamber 3004a and 3008a are nominally at a position corresponding to a maximum volume.

Position 3050 illustrates synchronized rotation of the geometrical elements through an arbitrarily selected angular interval relative to the position 3000. A chamber 3002b has increased in volume relative to the volume of the chamber 3002a. A chamber 3004b has decreased in volume relative to the volume of the chamber 3004a. A chamber 3006b has increased in volume relative to the volume of the chamber 3006a. A chamber 3008b has decreased in volume relative to the volume of the chamber 3008a.

Figure 31:
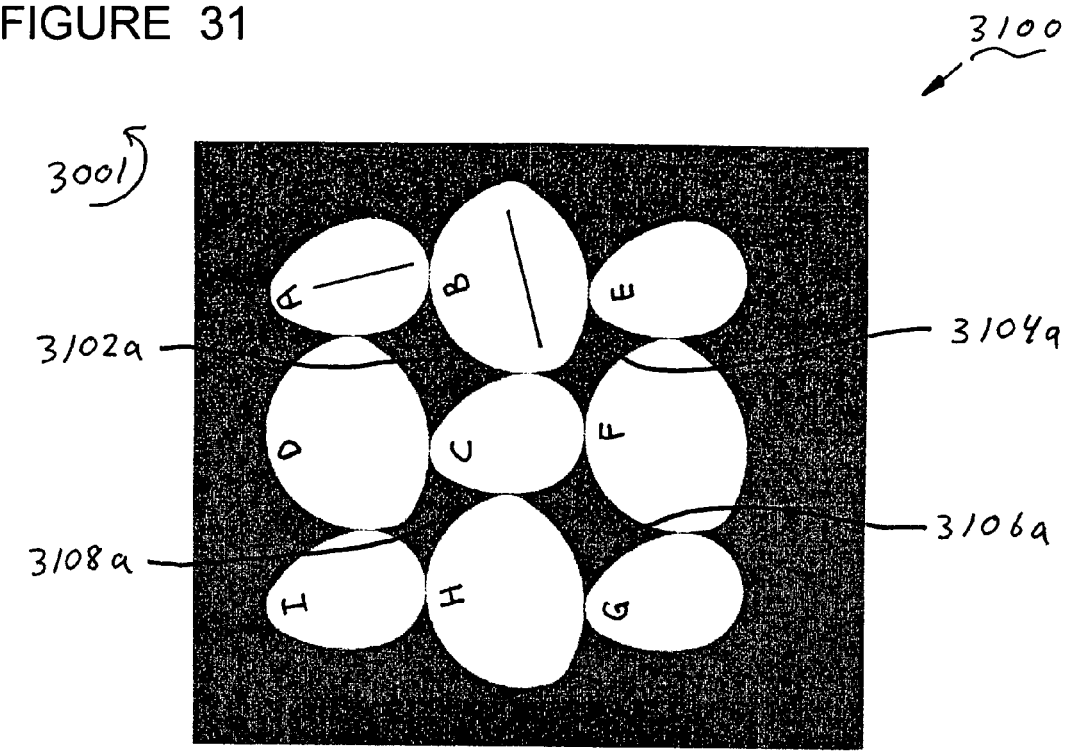
FIG. 31 illustrates rotations of the geometrical elements from the positions depicted in FIG. 30.
Figure 31:
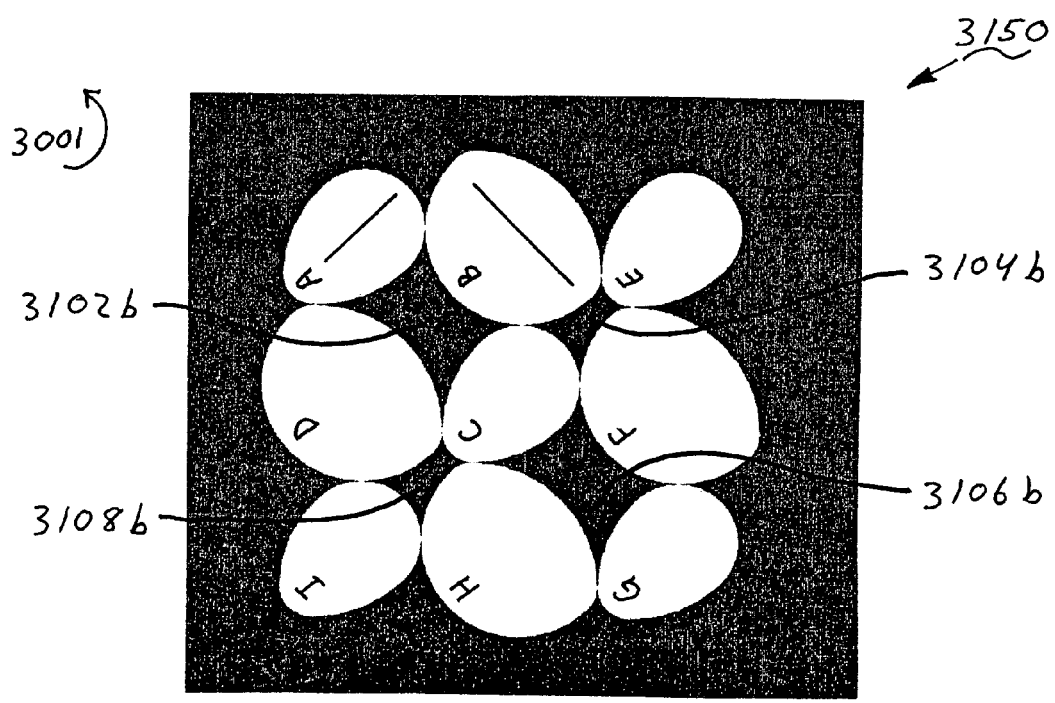

FIG. 31 illustrates rotations of the geometrical elements from the positions depicted in FIG. 30. Position 3100 illustrates synchronized rotation of the geometrical elements through an arbitrarily selected angular interval relative to the position 3050 (FIG. 30). A chamber 3102a has increased in volume relative to the volume of the chamber 3002b. A chamber 3104a has decreased in volume relative to the volume of the chamber 3004b. A chamber 3106a has increased in volume relative to the volume of the chamber 3006b. A chamber 3108a has decreased in volume relative to the volume of the chamber 3008b.

Position 3150 illustrates synchronized rotation of the geometrical elements through an arbitrarily selected angular interval relative to the position 3100, which, in this example represents a rotation of 90 degrees from the position 3000. A chamber 3102b has increased in volume relative to the volume of the chamber 3102a. A chamber 3104b has decreased in volume relative to the volume of the chamber 3104a. A chamber 3106b has increased in volume relative to the volume of the chamber 3106a. A chamber 3108b has decreased in volume relative to the volume of the chamber 3108a. The chambers 3104b and 3108b are nominally at a minimum volume condition and the chambers 3102b and 3106b are nominally at a maximum volume condition.

Figure 32:
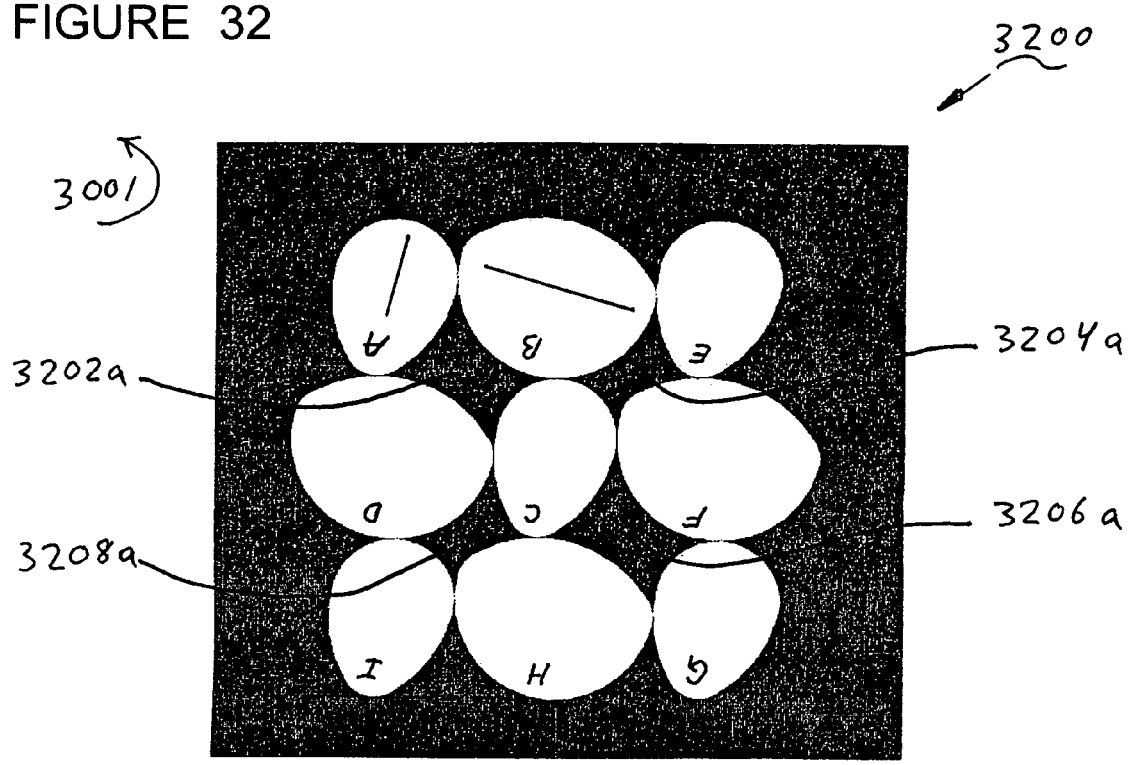
FIG. 32 illustrates rotations of the geometrical elements from the positions depicted in FIG. 31.
Figure 32:
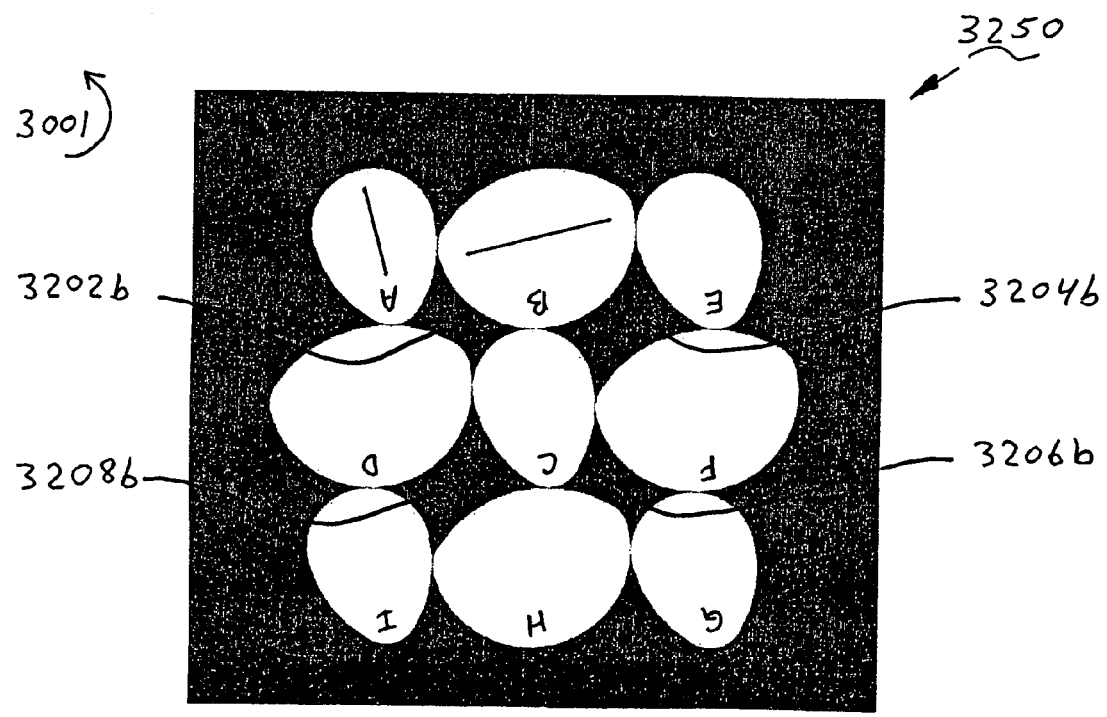

FIG. 32 illustrates rotations of the geometrical elements from the positions depicted in FIG. 31. Position 3200 illustrates synchronized rotation of the geometrical elements through an arbitrarily selected angular interval relative to the position 3150 (FIG. 31). A chamber 3202a has decreased in volume relative to the volume of the chamber 3102b. A chamber 3204a has increased in volume relative to the volume of the chamber 3104b. A chamber 3206a has decreased in volume relative to the volume of the chamber 3106b. A chamber 3208a has increased in volume relative to the volume of the chamber 3108b.

Position 3250 illustrates synchronized rotation of the geometrical elements through an arbitrarily selected angular interval relative to the position 3200. A chamber 3202b has decreased in volume relative to the volume of the chamber 3202a. A chamber 3204b has increased in volume relative to the volume of the chamber 3204a. A chamber 3206b has decreased in volume relative to the volume of the chamber 3206a. A chamber 3208b has increased in volume relative to the volume of the chamber 3208a.

Figure 33:
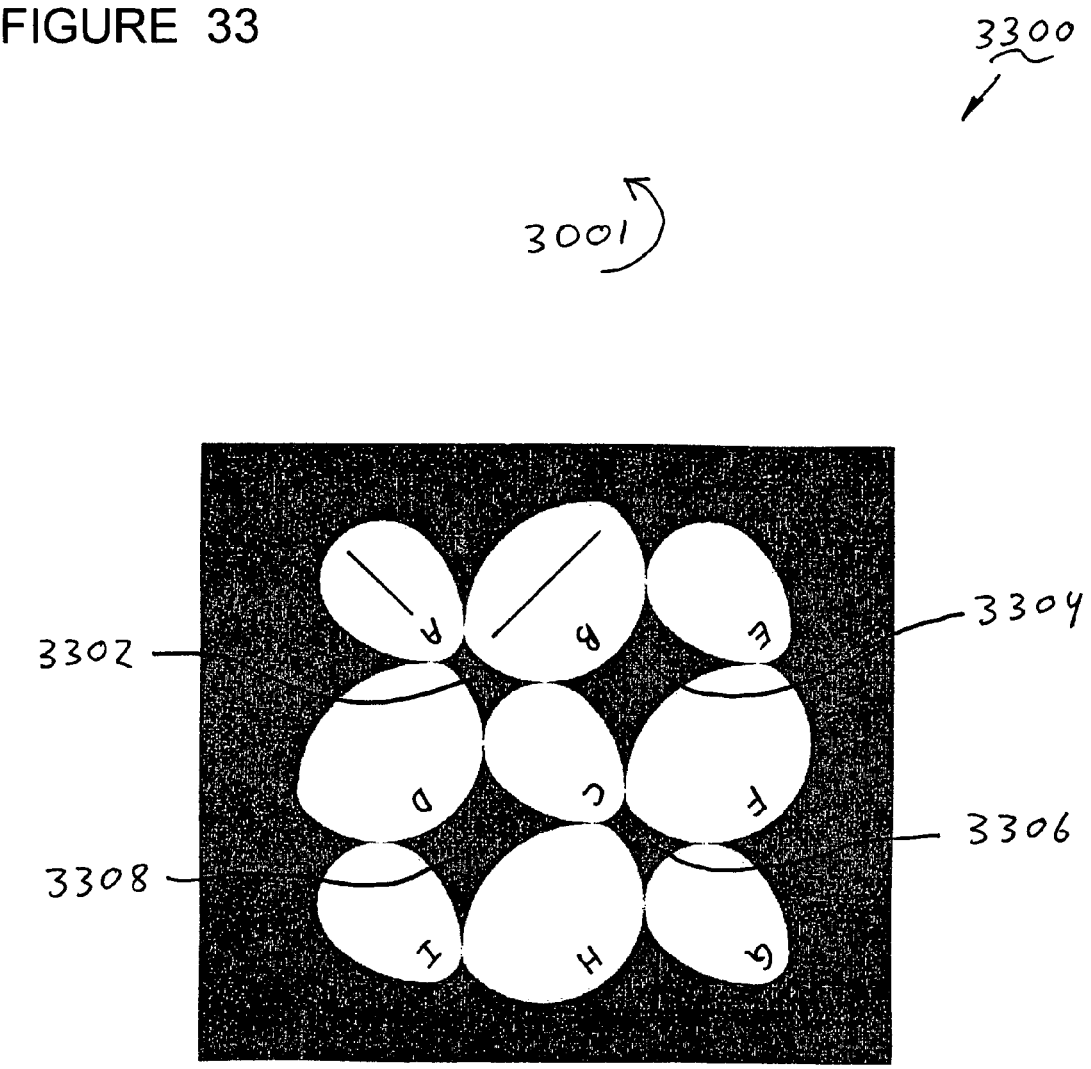
FIG. 33 illustrates a rotation of the geometrical elements from the positions depicted in FIG. 31.

FIG. 33 illustrates a rotation of the geometrical elements from the positions depicted in FIG. 32. Position 3300 illustrates synchronized rotation of the geometrical elements through an arbitrarily selected angular interval relative to the position 3250 (FIG. 32), which, in this example represents a rotation of 180 degrees from the position 3000. A chamber 3302 has decreased in volume relative to the volume of the chamber 3202b. A chamber 3304 has increased in volume relative to the volume of the chamber 3204b. A chamber 3306 has decreased in volume relative to the volume of the chamber 3206b. A chamber 3308 has increased in volume relative to the volume of the chamber 3208b. The chambers 3302 and 3306 are nominally at a minimum volume condition and the chambers 3304 and 3308 are nominally at a maximum volume condition.

In other embodiments, the circumferential shape described in conjunction with FIG. 28 can be used for the positions that geometrical elements A, C, G, E, and I occupy. In such an embodiment, the circumferential shape described in conjunction with FIG. 29 is used for the positions that geometrical elements B, D, F, and H occupy. It will be noted that the radii R1 and R2 in FIG. 28 and FIG. 29 can be varied to create different ratios of the maximum to minimum volumes that are created by the adjacent geometrical elements illustrated in FIG. 30, FIG. 31, FIG. 32, and FIG. 33. In various embodiments, the hybrid geometrical elements and their compliments can be configured for use as internal combustion engines or as pumps, compressors, etc.

Figure 34:
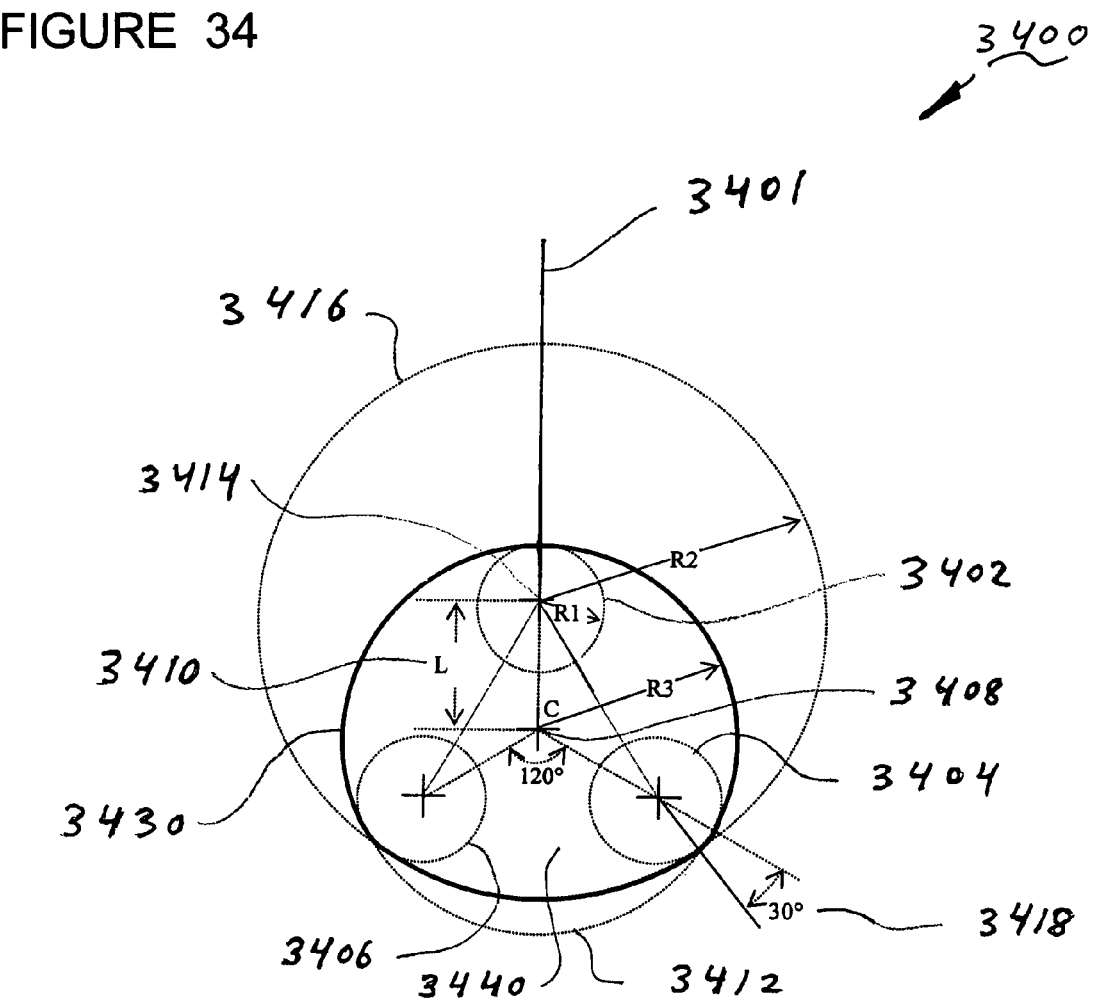
FIG. 34 illustrates a circumferential shape of a hybrid geometrical element according to another embodiment.

FIG. 34 illustrates a circumferential shape of a hybrid geometrical element 3400 according to another embodiment. Similar alpha and alphanumeric symbols refer to the same quantity in FIG. 34 through FIG. 37 only. Referring to FIG. 34, a circle of radius R1 is placed at each of the vertices of an equilateral triangle. A point 3408 (C) defines an axis of rotation for the geometrical element 3400. A center 3414 of a circle 3402, having radius R1, is located a distance 3410 (L) along a line 3401. The center of a circle 3404 is located along a line intersecting the point 3408 (C), which makes an angle of 120 degrees with the line 3401. Similarly, the center of a circle 3406 is located along a line intersecting the point 3408 (C) and making an angle of 120 degrees with the line on which the center of the circle 3404 coincides. A circle 3412, having radius R3, is centered at the point 3408 and is sized to be tangent to the circles 3402, 3404, and 3406. A circle 3416, having radius R2, is centered at the point 3414 and is sized to be tangent to the circles 3404 and 3406.

The circumferential shape 3430 of the geometrical element 3400 is represented by the portions of the circles contained between the points of common tangency. The circumferential shape 3430 for the geometrical element 3400 includes four regions. Two of the regions have a radius of curvature R1 and are contributions from the circle 3404 and the circle 3406. A third region has a radius of curvature R3 and is a contribution from the circle 3412. A fourth region has a radius of curvature R2 and is the contribution from the circle 3416. The geometrical element 3400 rotates about the point 3408 (C).

Figure 35:
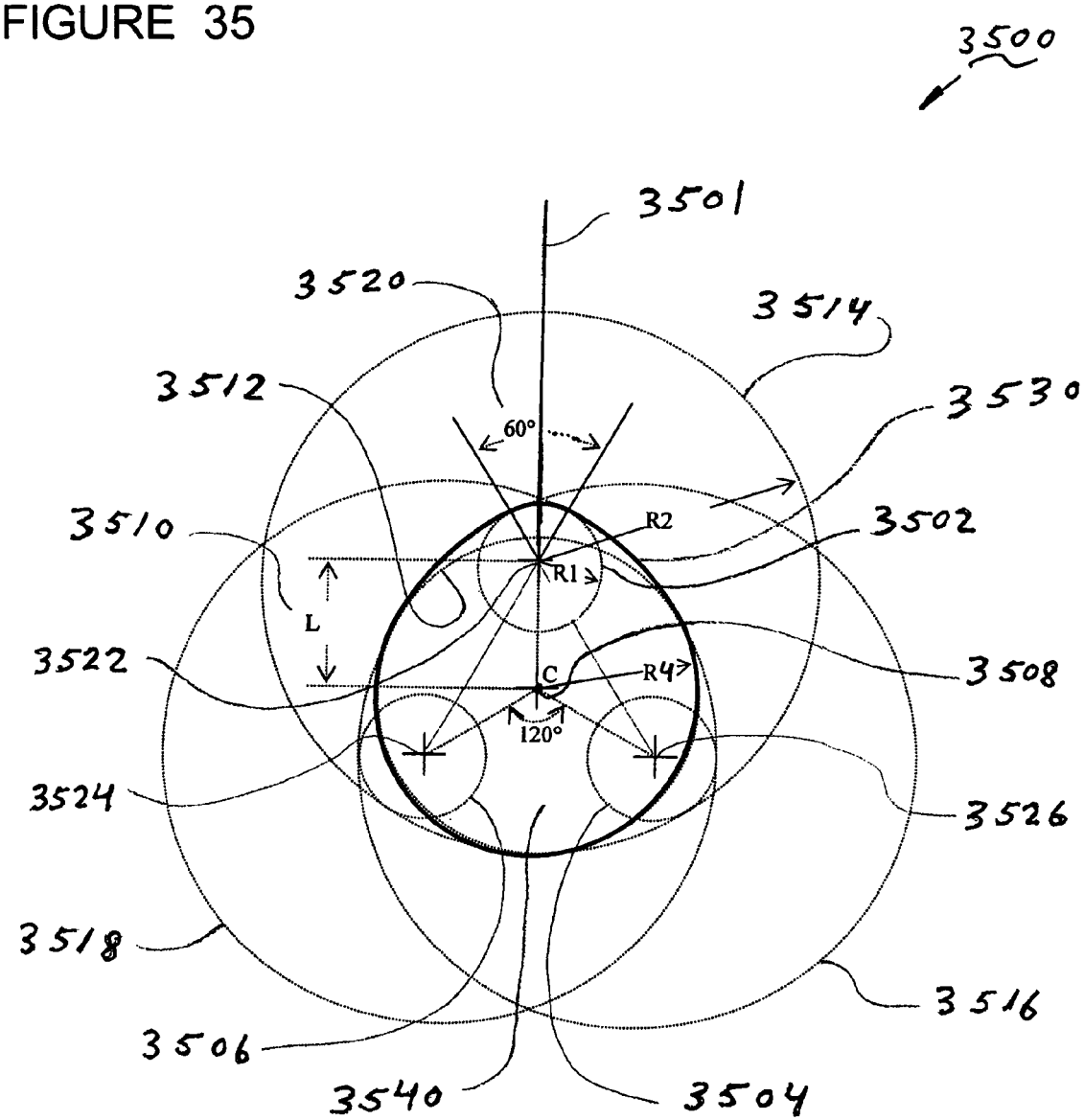
FIG. 35 illustrates a circumferential shape of a geometrical element that is complementary to the geometrical element of FIG. 34, according to one embodiment.

FIG. 35 illustrates a circumferential shape of a geometrical element 3500 that is complementary to the geometrical element of FIG. 34, according to one embodiment. Referring to FIG. 35, a circle of radius R1 is placed at each of the vertices of an equilateral triangle. A point 3508 (C) defines an axis of rotation for the geometrical element 3500. A center 3522 of a circle 3502, having radius R1, is located a distance 3510 (L) along a line 3501. A circle 3504 is located along a line intersecting the point 3508 (C), which makes an angle of 120 degrees with the line 3501. Similarly, a circle 3506 is located along a line intersecting the point 3508 (C) and making an angle of 120 degrees with the line on which the center of the circle 3504 coincides. A circle 3514, having radius R2, is centered at the point 3522 and is sized to be tangent to the circles 3504 and 3506. A circle 3518, having radius R2, is centered at the point 3524 and is tangent to the circles 3502 and 3504. A circle 3516, having radius R2, is centered at the point 3526 and is tangent to the circles 3502 and 3506. A radius R4, of a circle 3512, is selected to be tangent to the circles 3514, 3516, and 3518.

The circumferential shape 3530 of the geometrical element 3500 is represented by the portions of the circles contained between the points of common tangency as indicated by the circumferential shape 3530. The circumferential shape 3530 of the geometrical element 3500 includes four regions. Two of the regions have radius of curvature R2 and are contributions from the circle 3516 and the circle 3518. A third region has a radius of curvature R4 and is a contribution from the circle 3512. A fourth region has a radius of curvature R1 and is the contribution from the circle 3502. The geometrical element 3500 rotates about the point 3508 (C).

Figure 36:
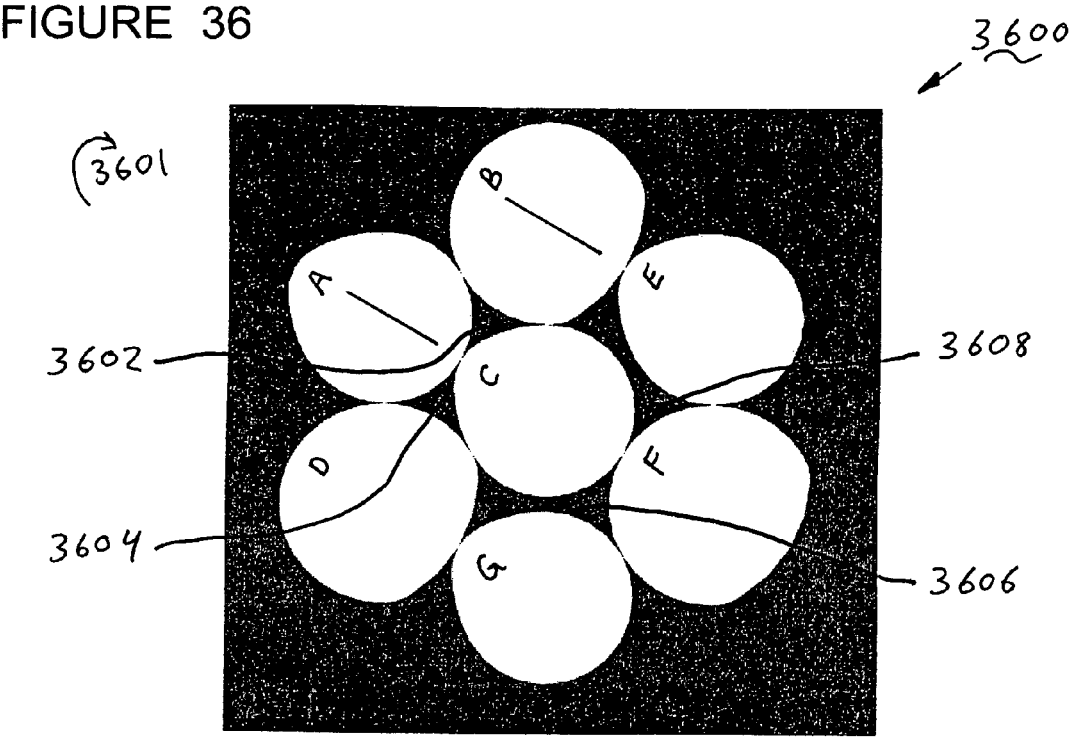
FIG. 36 depicts arrangements of the geometrical elements shown in FIG. 34, and FIG. 35, according to one embodiment.
Figure 36:
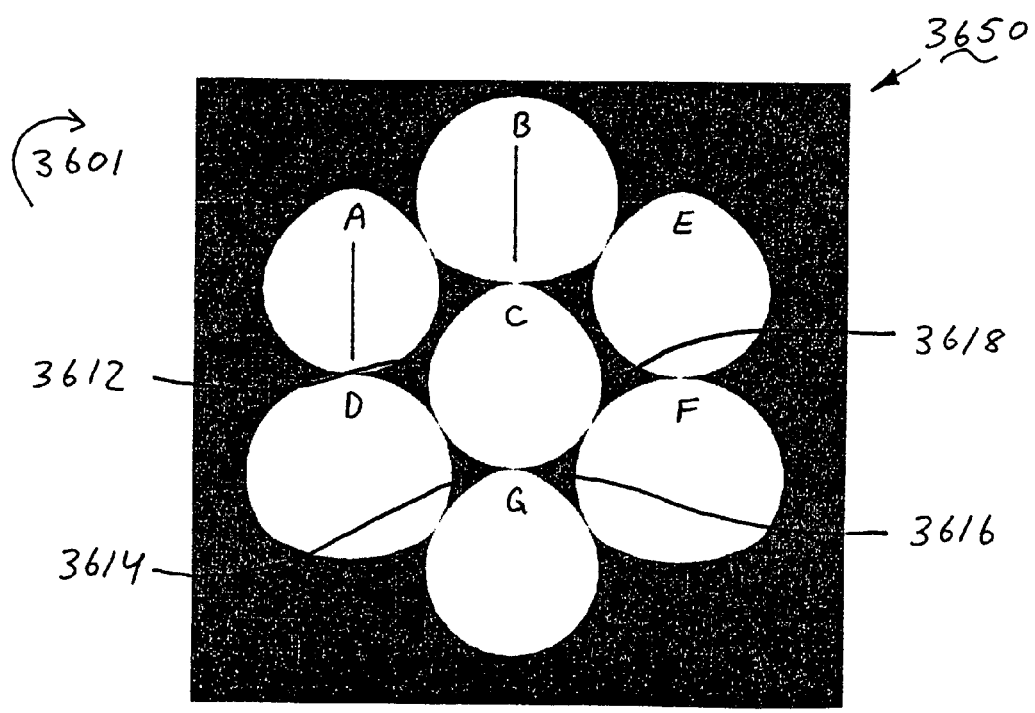
Figure 37:
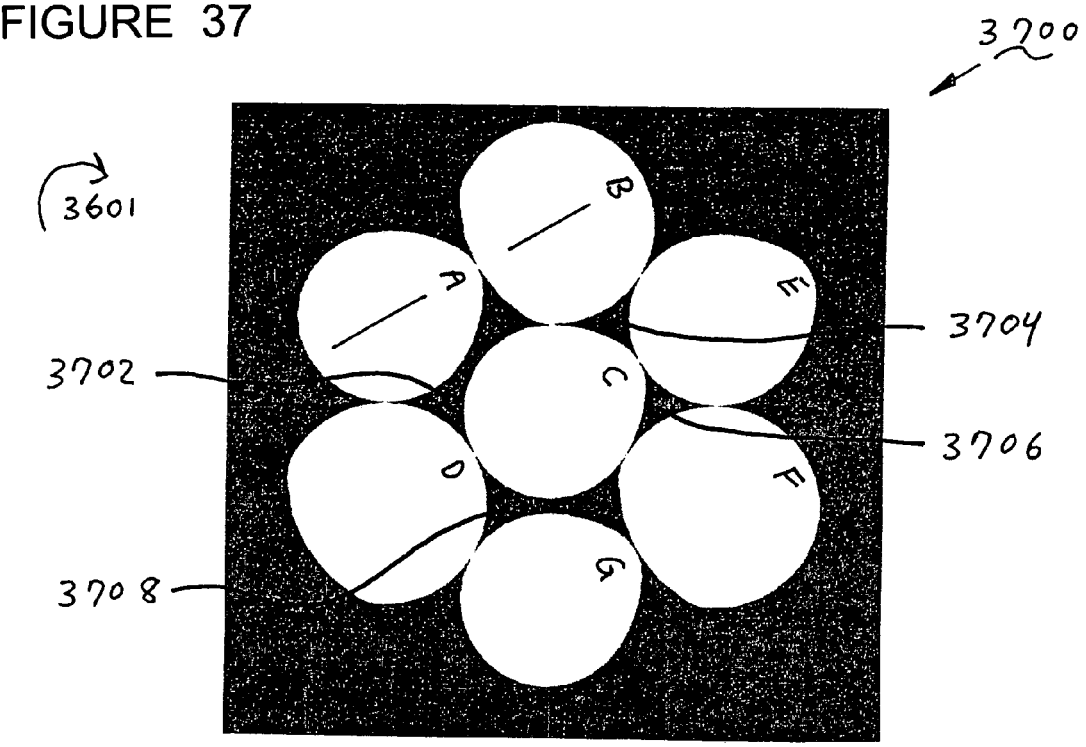
FIG. 37 illustrates rotations of the geometrical elements from the positions depicted in FIG. 36.
Figure 37:
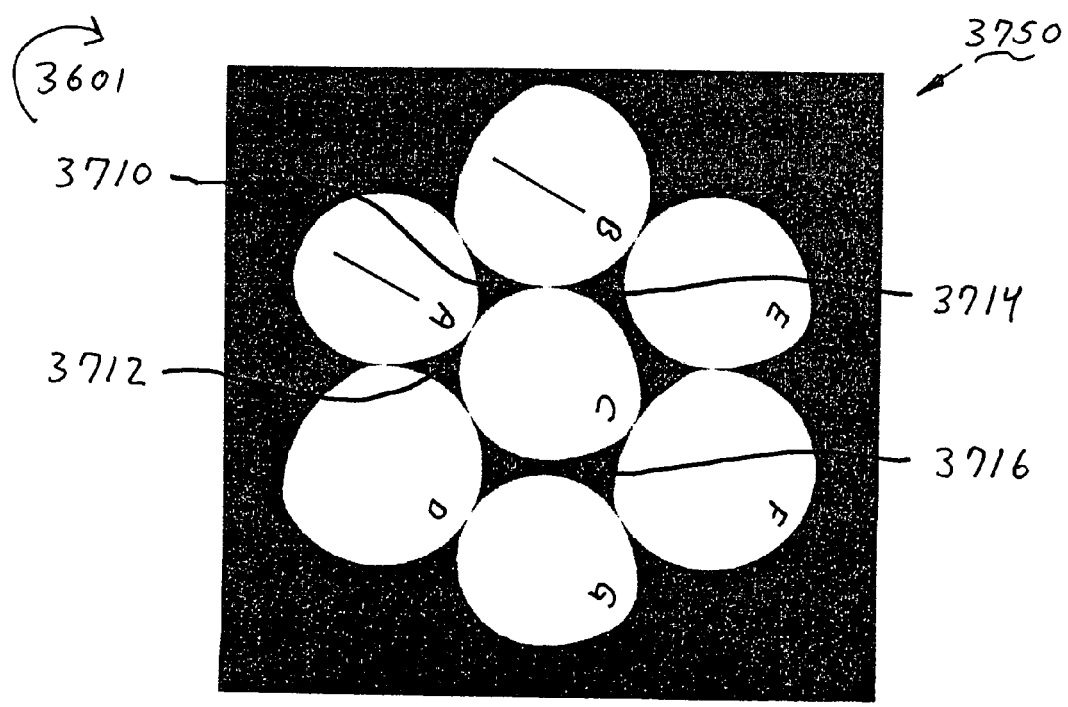

FIG. 36 depicts arrangements of the geometrical elements shown in FIG. 34, and FIG. 35, according to one embodiment. FIG. 36 and FIG. 37 illustrate hybrid geometrical elements and their compliments using alpha markings A, B, C, D, E, F, and G to indicate the same geometrical element across FIG. 36 and FIG. 37 only. Referring back to FIG. 36, two positions of geometrical elements are indicated by 3600 and 3650. In position 3600, geometrical elements A, B, C, D, E, F, and G are arranged for synchronized clockwise rotation as indicated by an arrow 3601. It will be noted that counterclockwise rotation can occur in other embodiments, no limitation is implied by the direction selected for rotation of the geometrical elements. Geometrical elements B, D, and F have been designed according to the principles described in conjunction with FIG. 34. Geometrical elements A, C, G, and E have been designed according to the principles described in conjunction with FIG. 35. Geometrical elements A and B have lines drawn thereon which correspond to the lines 3501 (FIG. 35) and the line 3401 (FIG. 34) to facilitate observation of the rotation of the geometrical elements by the reader.

Four chambers are created by the geometrical elements A, B, C, D, E, F, and G and appropriate planar housings (not shown). A chamber 3602 and a chamber 3604 are nominally at a position corresponding to a minimum volume condition. A chamber 3606 and 3608 are nominally at a position corresponding to a maximum volume condition.

Position 3650 illustrates synchronized rotation of the geometrical elements through an arbitrarily selected angular interval relative to the position 3600. A chamber 3612 has increased in volume relative to the volume of the chambers 3602 and 3604. The increase in volume of the chamber 3612 is accompanied by a merging of the chambers 3602 and 3604 to form a single chamber 3612. A chamber 3618 has maintained approximately the same volume relative to the volume of the chamber 3608. A chamber 3614 and a chamber 3616 have resulted from the chamber 3606. This decrease in volume of the chambers 3614 and 3616 collectively, relative to the volume of the chamber 3606, results in a compression cycle.

FIG. 37 illustrates rotations of the geometrical elements from the positions depicted in FIG. 36. Position 3700 illustrates synchronized rotation of the geometrical elements through an arbitrarily selected angular interval relative to the position 3650 (FIG. 36). A chamber 3702 has maintained approximately the same volume relative to the chamber 3612 (FIG. 36). A chamber 3704 and a chamber 3706 have resulted from the chamber 3618. This decrease in volume of chambers 3704 and 3706 collectively, relative to the volume of the chamber 3618, results in a compression cycle. A chamber 3708 has increased in volume relative to the volume of the chambers 3614 and 3616. The increase in volume of the chamber 3708 is accompanied by a merging of chambers 3614 and 3616 to form a single chamber 3708, resulting in an expansion cycle.

Position 3750 illustrates synchronized rotation of the geometrical elements through an arbitrarily selected angular interval relative to the position 3700. A chamber 3714 has increased in volume relative to the volume of the chambers 3704 and 3706. The increase in volume of the chamber 3714 is accompanied by a merging of chambers 3704 and 3706 to form a single chamber 3714, resulting in an expansion cycle. A chamber 3716 has maintained approximately the same volume relative to the volume of the chamber 3708. A chamber 3712 and a chamber 3710 have resulted from the chamber 3702. This decrease in volume of chambers 3712 and 3710 collectively, relative to the volume of the chamber 3702, results in a compression cycle.

It will be noted that the radii R1 and R2 in FIG. 34 and FIG. 35 can be varied to create different ratios of the maximum to minimum volumes that are created by the adjacent geometrical elements illustrated in FIG. 36 and FIG. 37. In various embodiments, the hybrid geometrical elements and their compliments can be configured for use as internal combustion engines or as pumps, compressors, etc.

Figure 38:
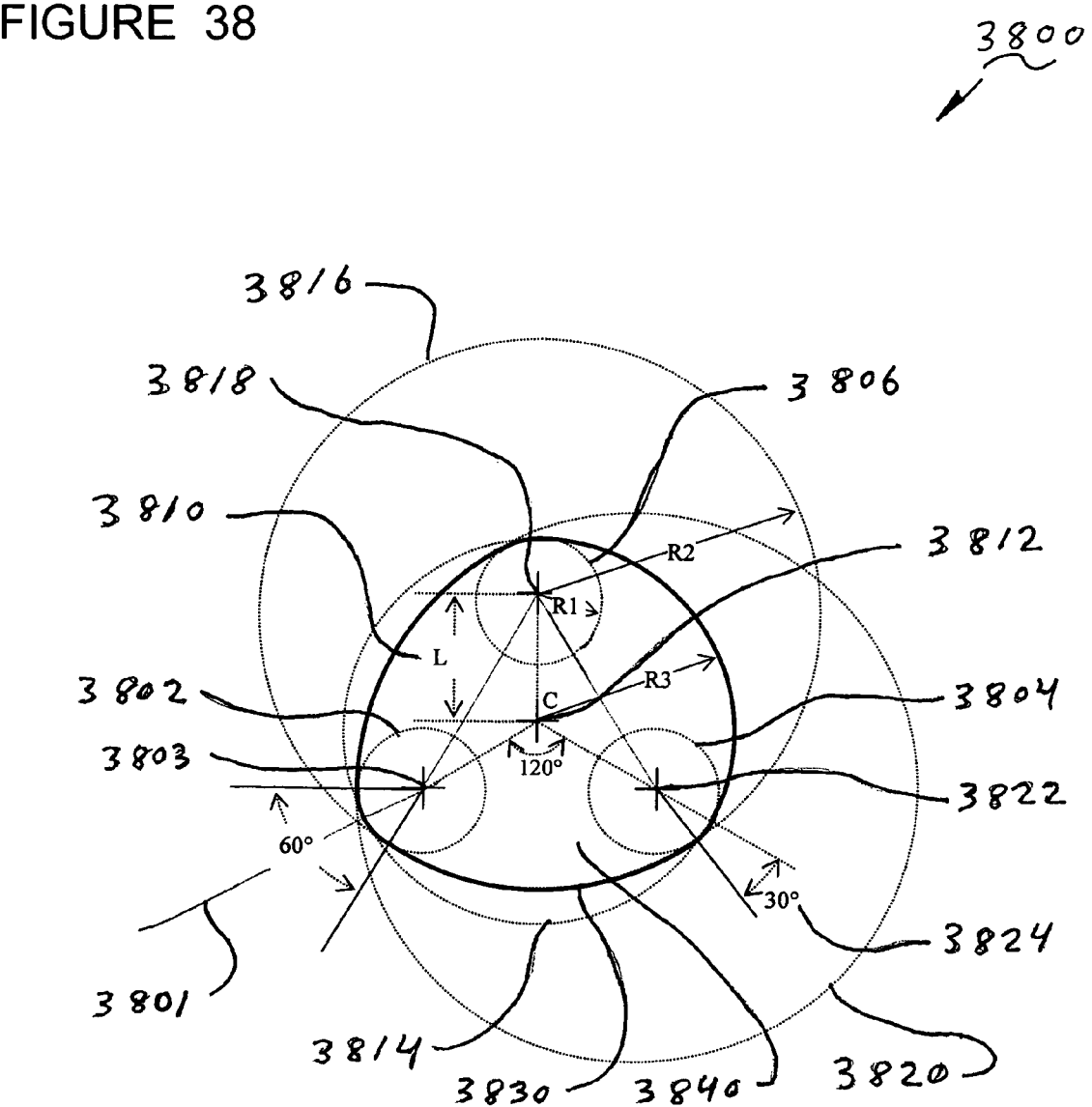
FIG. 38 illustrates a circumferential shape of a hybrid geometrical element according to yet another embodiment.

FIG. 38 illustrates a circumferential shape of a hybrid geometrical element 3800 according to yet another embodiment. Similar alpha and alphanumeric symbols refer to the same quantity in FIG. 38 and FIG. 39 only. Referring to FIG. 38, a circle of radius R1 is placed at each of the vertices of an equilateral triangle. A point 3812 (C) defines an axis of rotation for the geometrical element 3800. A center 3803 of a circle 3802, having radius R1, is located a distance (L) along a line 3801. A center of a circle 3806 is located along a line intersecting the point 3812 (C), which makes an angle of 120 with the line 3801. Similarly, a center of a circle 3804 is located along a line intersecting the point 3812 (C) and makes an angle of 120 degrees with the line on which the center of the circle 3802 coincides. A circle 3814, having radius R3, is centered at the point 3812 (C) and is sized to be tangent to the circles 3802, 3804, and 3806. A circle 3816, having radius R2, is centered at the point 3818 and is sized to be tangent to the circles 3802 and 3804. A circle 3820, having radius R2, is centered at the point 3822 and is sized to be tangent to the circles 3802 and 3806.

The circumferential shape 3830 of the geometrical element 3800 is represented by the portions of the circles contained between the points of common tangency as indicated by the circumferential shape 3830. The circumferential shape 3830 of the geometrical element 3800 includes six regions. Three of the regions have radius of curvature R1 and are contributions from the circles 3802, 3804, and 3806. A fourth region has a radius of curvature R3 and is a contribution from the circle 3814. Fifth and sixth regions have a radius of curvature R2 and are contributions from the circle 3816 and the circle 3820. The geometrical element 3800 rotates about the point 3812 (C).

Figure 39:
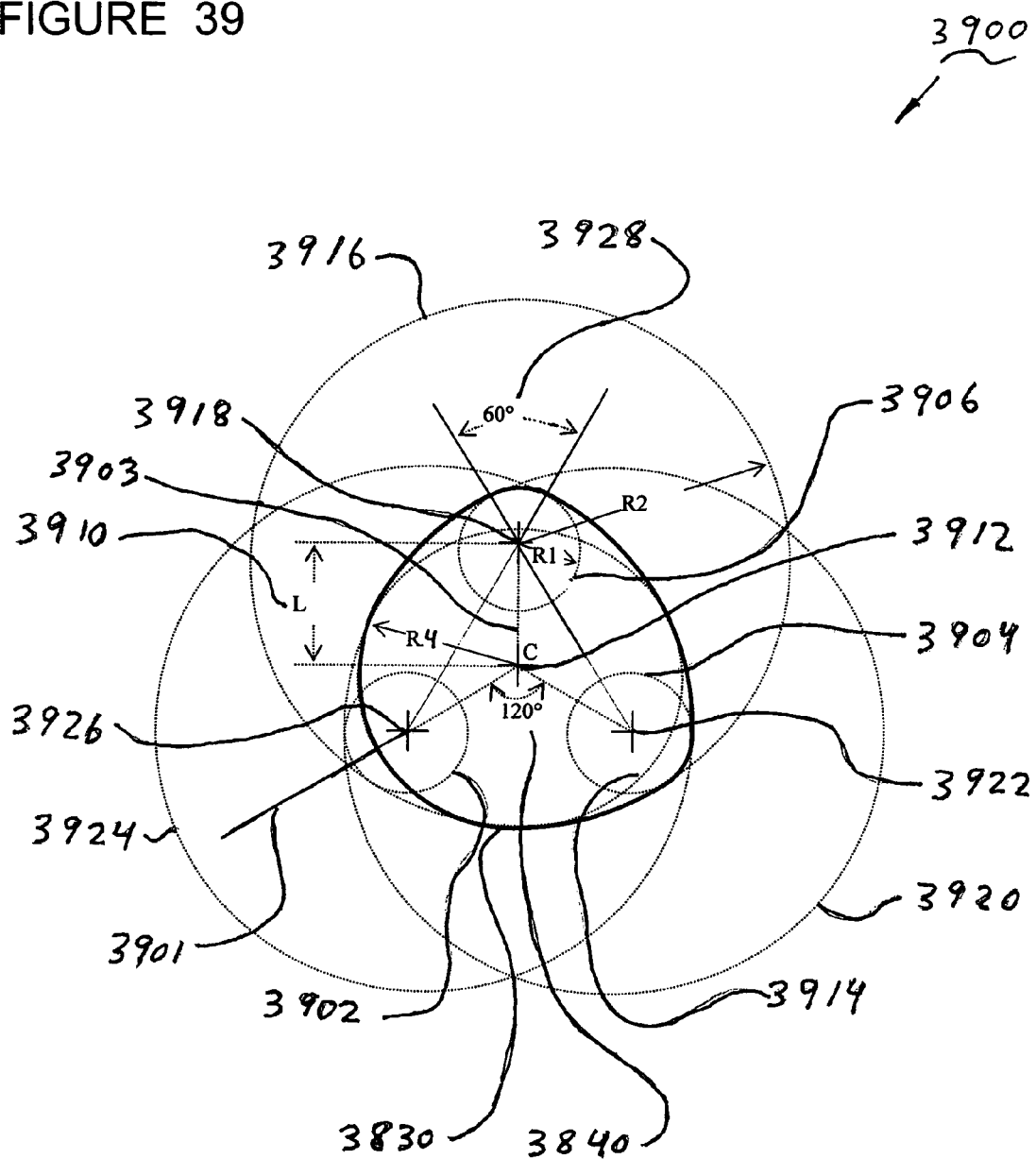
FIG. 39 illustrates a circumferential shape of a geometrical element that is complementary to the geometrical element of FIG. 38, according to one embodiment.

FIG. 39 illustrates a circumferential shape of a geometrical element 3900 that is complementary to the geometrical element of FIG. 38, according to one embodiment. Referring to FIG. 39, a circle of radius R1 is placed at each of the vertices of an equilateral triangle. A point 3912 (C) defines an axis of rotation for the geometrical element 3900. A center 3926 of a circle 3902, having radius R1, is located a distance 3910 (L) along a line 3901. The center of a circle 3904 is located along a line intersecting the point 3912 (C), which makes an angle of 120 with the line 3901. Similarly, the center of a circle 3906 is located along a line intersecting the point 3912 (C) and making an angle of 120 degrees with the line 3901. A circle 3916, having radius R2, is centered at the point 3918 and is sized to be tangent to the circles 3902 and 3904. A circle 3920, having radius R2, is centered at the point 3922 and is tangent to the circles 3902 and 3906. A circle 3924, having radius R2, is centered at the point 3926 and is tangent to the circles 3904 and 3906. A radius R4, of a circle 3914, is selected to be tangent to the circles 3916, 3920, and 3924.

The circumferential shape 3830 of the geometrical element 3900 is represented by the portions of the circles contained between the points of common tangency as indicated by the circumferential shape 3830. The circumferential shape 3830 of the geometrical element 3900 includes six regions. Two of the regions have a radius of curvature R1 and are contributions from the circle 3904 and the circle 3906. A third region has a radius of curvature R4 and is a contribution from the circle 3914. Fourth, fifth and sixth regions have a radius of curvature R2 and are the contributions from the circles 3916, 3920, and 3924. The geometrical element 3900 rotates about the point 3912 (C).

Figure 40:
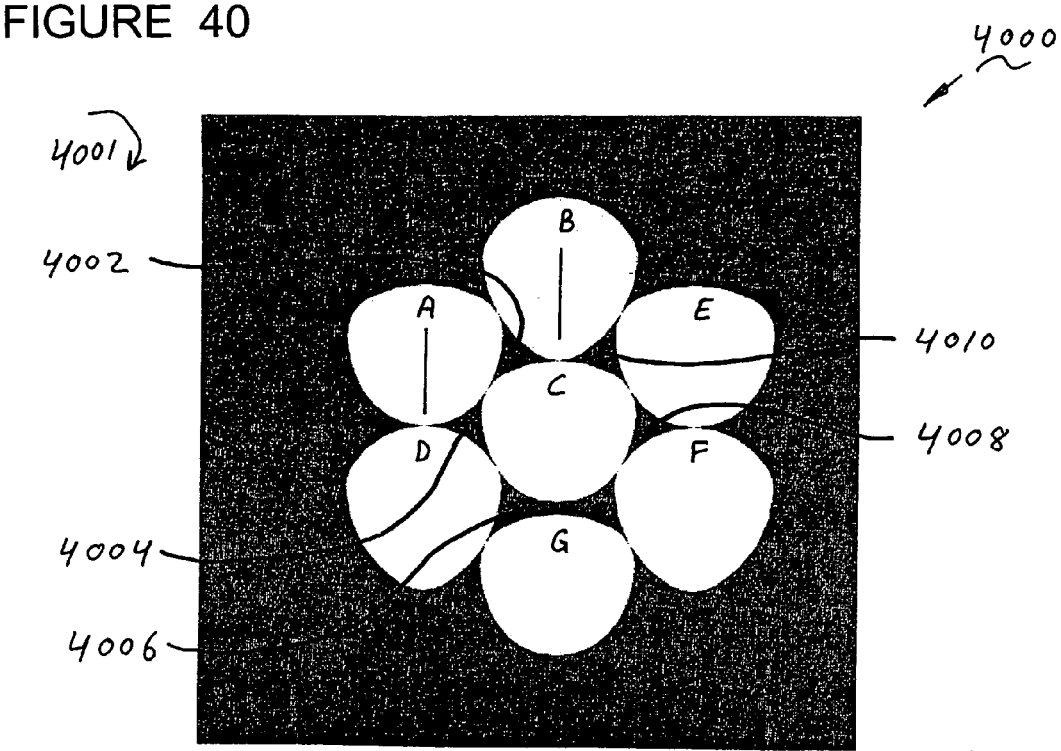
FIG. 40 depicts arrangements of the geometrical elements shown in FIG. 38, and FIG. 39, according to one embodiment.
Figure 40:
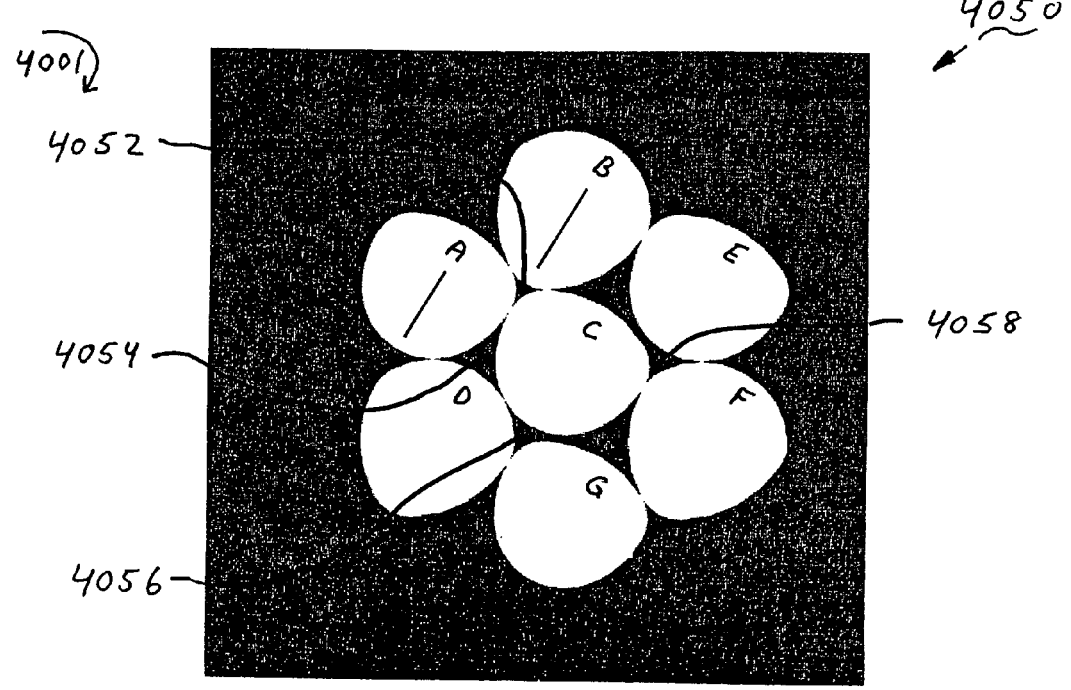
Figure 41:
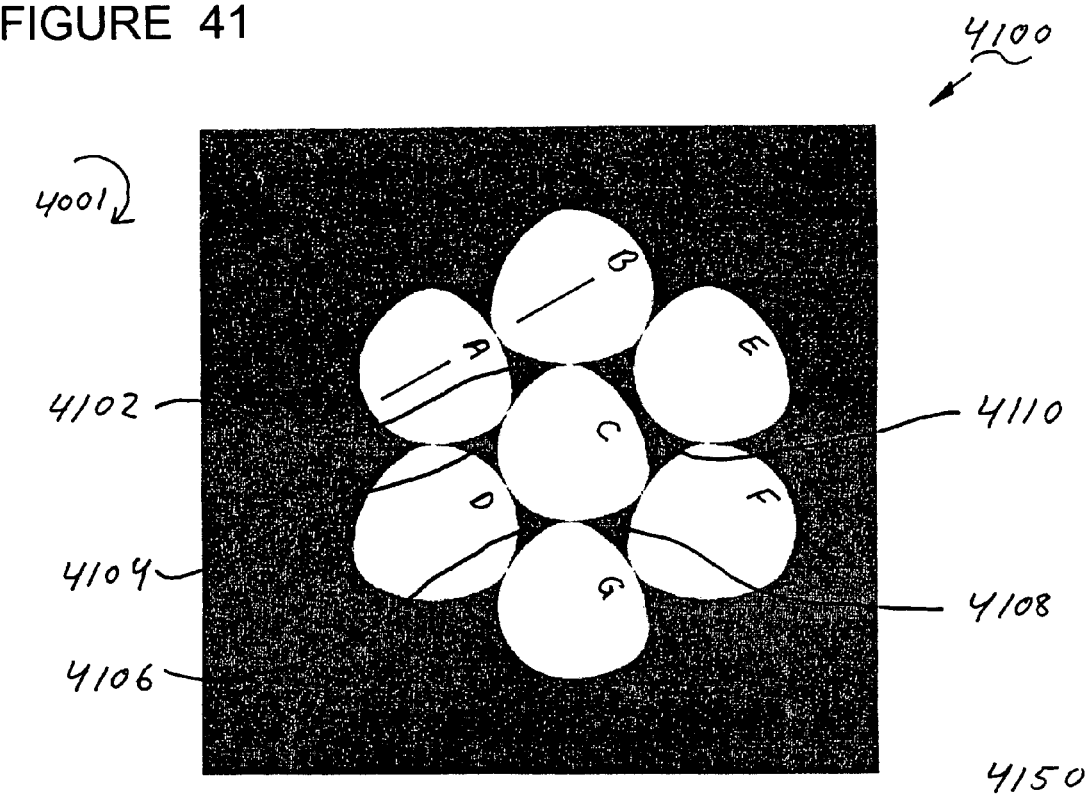
FIG. 41 illustrates rotations of the geometrical elements from the positions depicted in FIG. 40.
Figure 41:
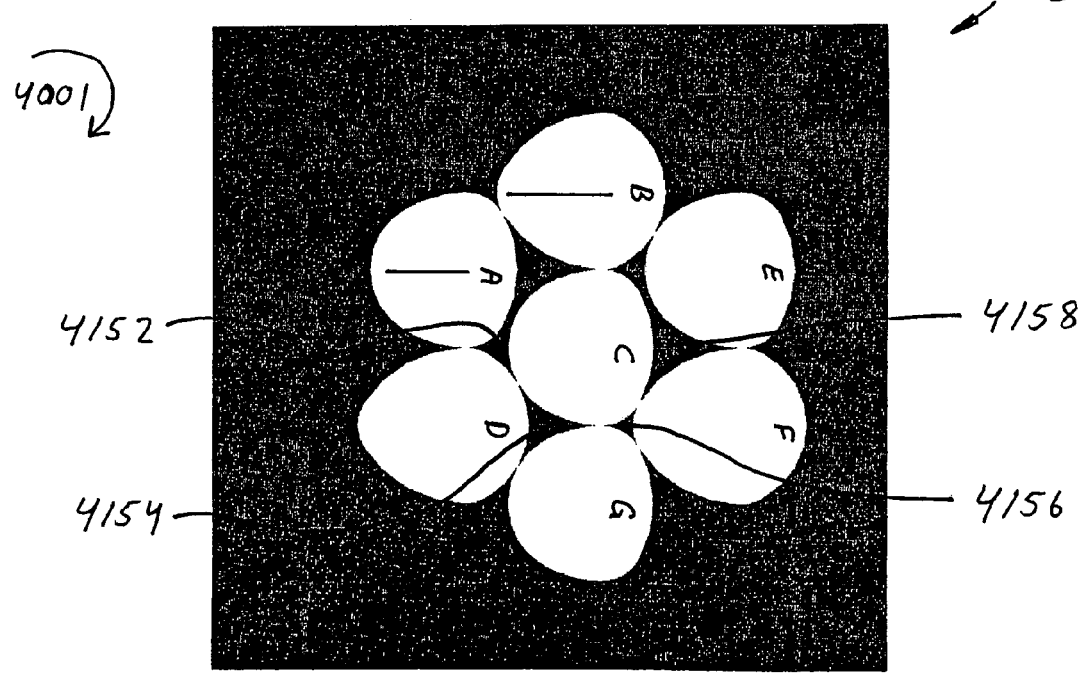

FIG. 40 depicts arrangements of the geometrical elements shown in FIG. 38, and FIG. 39, according to one embodiment. FIG. 40 and FIG. 41 illustrate hybrid geometrical elements and their complements using alpha markings A, B, C, D, E, F, and G to indicate the same geometrical element across FIG. 40 and FIG. 41 only. Referring back to FIG. 40, two positions of geometrical elements are indicated by 4000 and 4050. In position 4000, geometrical elements A, B, C, D, E, F, and G are arranged for synchronized clockwise rotation as indicated by an arrow 4001. It will be noted that counterclockwise rotation can occur in other embodiments, no limitation is implied by the direction selected for rotation of the geometrical elements. Geometrical elements B, D, and F have been designed according to the principles described in conjunction with FIG. 38. Geometrical elements A, C, G, and E have been designed according to the principles described in conjunction with FIG. 39. Geometrical elements A and B have lines drawn thereon which correspond to the lines 3901 (FIG. 39) and the line 3801 (FIG. 38) to facilitate observation of the rotation of the geometrical elements by the reader.

In position 4000, five chambers 4002, 4004, 4006, 4008, and 4010 are created by the geometrical elements A, B, C, D, E, F, and G and appropriate planar housings (not shown).

Position 4050 illustrates synchronized rotation of the geometrical elements through an arbitrarily selected angular interval relative to the position 4000. Four chambers, 4052, 4054, 4056, and 4058 are created by the geometrical elements in position 4050. The chambers 4008 and 4010 have merged into the chamber 4058. The volume of the chamber 4052 has experienced compression relative to the volume of the chamber 4002.

FIG. 41 illustrates rotations of the geometrical elements from the positions depicted in FIG. 40. With reference to FIG. 41, in position 4100, five chambers, 4102, 4104, 4106, 4108, and 4110 have formed between the geometrical elements and the housing (not shown). The chamber 4056 (FIG. 40 position 4050) has separated into two chambers 4106 and 4108.

In position 4150, the former chambers 4102 and 4104 (position 4100) have merged to form a chamber 4152.

It will be noted that the radii R1 and R2 in FIG. 38 and FIG. 39 can be varied to create different ratios of the maximum to minimum volumes that are created by the adjacent geometrical elements illustrated in FIG. 40 and FIG. 41. In various embodiments, the hybrid geometrical elements and their compliments can be configured for use as internal combustion engines or as pumps, compressors, etc.

In various embodiments, the previously described behavior of a chamber that results from utilizing hybrid geometrical elements is used to create a valve(s). For example, referring back to FIG. 41, the chambers 4102 and 4104 are distinct and are not in fluidic communication in the orientation shown at position 4100. In the position 4150 the chambers 4102 and 4104 have merged and are now in fluidic communication with each other. A first fluid pathway can be connected to chamber 4102 and a second fluid pathway can be connected to the chamber 4104 to facilitate flow into chamber 4102 and out of chamber 4104 or vice versa when the geometrical elements are in the position illustrated at 4100. Fluid would be prevented from flowing through the chambers when the geometrical elements are in the position illustrated at 4150.

In various embodiments throughout this description, arrangements of geometrical elements, in contact and/or near contact, have been described. Depending on the application; engine, pump, etc., tolerances and/or distances between adjacent elements can be adjusted to maintain the desired pressure within a chamber. Those of skill in the art will recognize that several design factors contribute to setting an acceptable tolerance and depend on a specific application. Such factors are, for example, the viscosity of the fluid being processed, a maximum design pressure for a camber that is compressing gas, detonation pressure of a fuel, etc.

Figure 42:
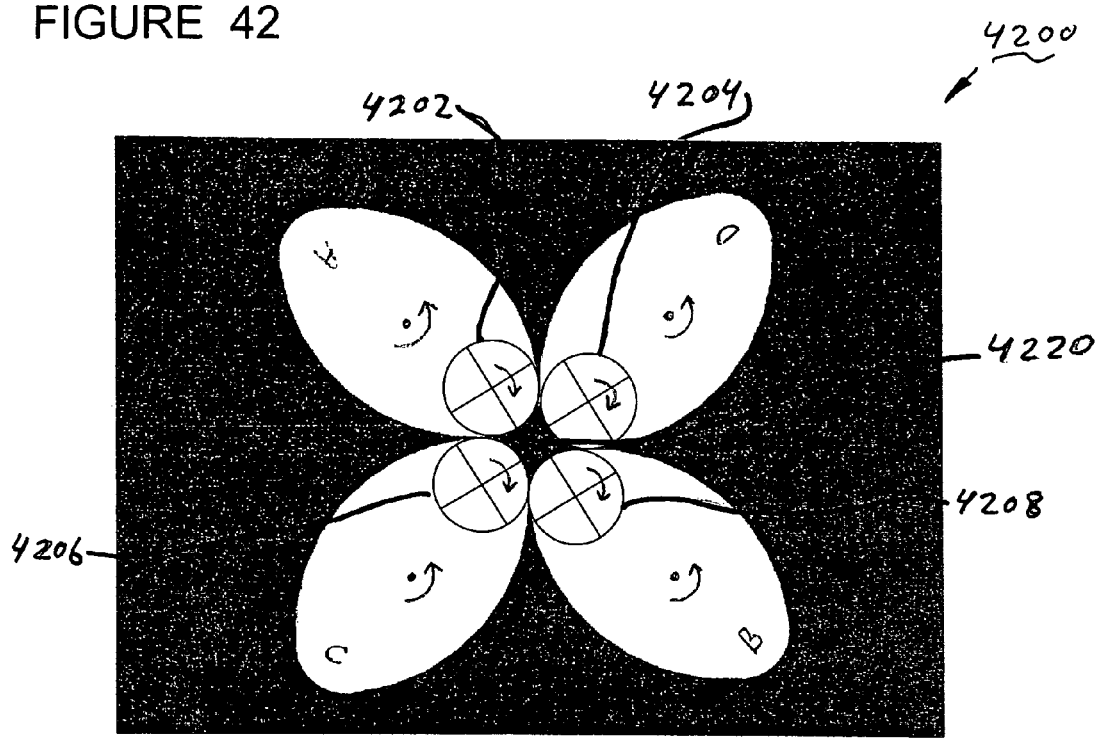
FIG. 42 illustrates a rolling contact between geometrical elements according to one embodiment.
Figure 42:
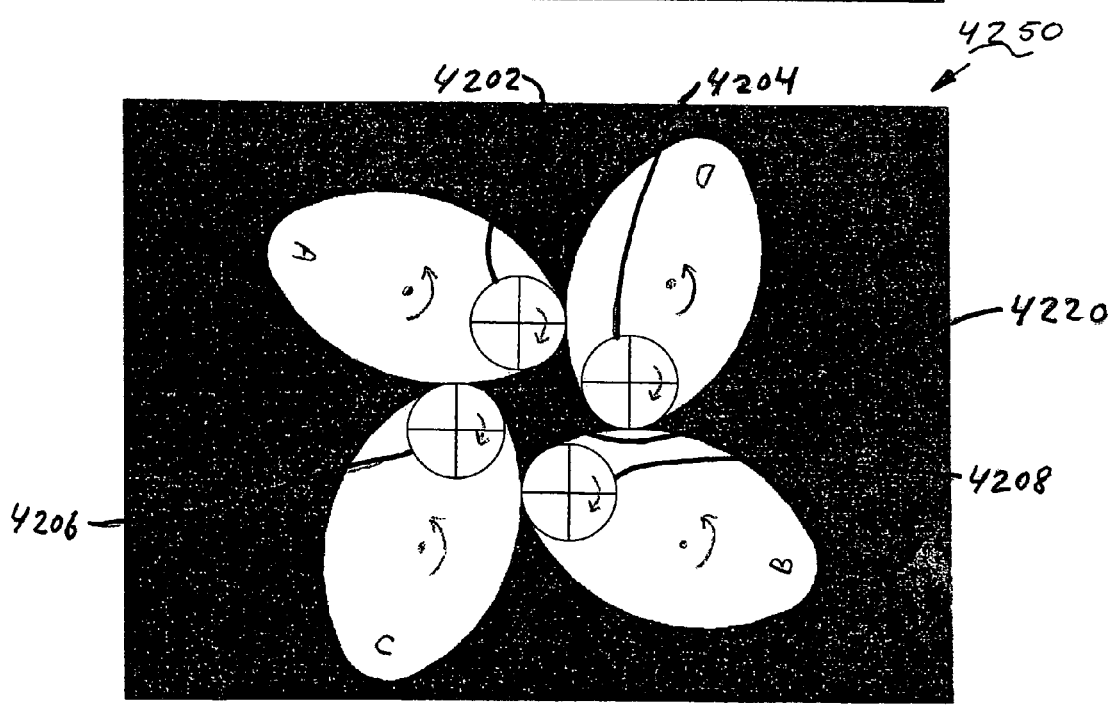

In various embodiments, a seal between adjacent geometrical elements is facilitated by a rolling contact element. FIG. 42 illustrates rolling contact between geometrical elements according to one embodiment. Referring to FIG. 42, a position 4200 illustrates geometrical elements A, B, C, and D configured for synchronized rotation about their respective axes and in the direction indicated by the arrows. In one embodiment, the geometrical elements A, B, C, and D are designed according to the principles described in conjunction with FIG. 15.

The geometrical element A contains a rolling element 4202 having a radius R1 (FIG. 15). Another rolling element (not shown) is located at the opposite end of the geometrical element A. Similarly, the other geometrical elements are each configured with rolling elements 4204, (geometrical element D), 4208 (geometrical element B), and 4206 (geometrical element C). The opposing rolling element, on a given geometrical element, is omitted for clarity within the illustration. A chamber 4220 is formed by the arrangement of the geometrical elements in 4200.

A position 4250 illustrates synchronized rotation of the geometrical elements through an arbitrarily selected angular interval relative to the position 4200. In position 4250 a chamber 4220 has increased in volume and the rolling elements 4202, 4204, 4206, and 4208 have rotated in the clockwise direction as the geometrical elements A, B, C, and D have rotated in the counterclockwise direction. In one embodiment, the rolling elements are mounted within a geometrical element under a preload, such that when a rolling element contacts a geometrical element, a normal force is applied by the rolling element to the adjacent geometrical element. In various embodiments, some of which are illustrated above in the preceding figures, various rolling elements can be employed. It will be noted that rolling elements rotate with constant angular velocity and that in various embodiments; rolling elements can be driven by gears. Additionally, rolling elements can engage the adjacent element with a mating surface that is configured as a gear.

Figure 43:
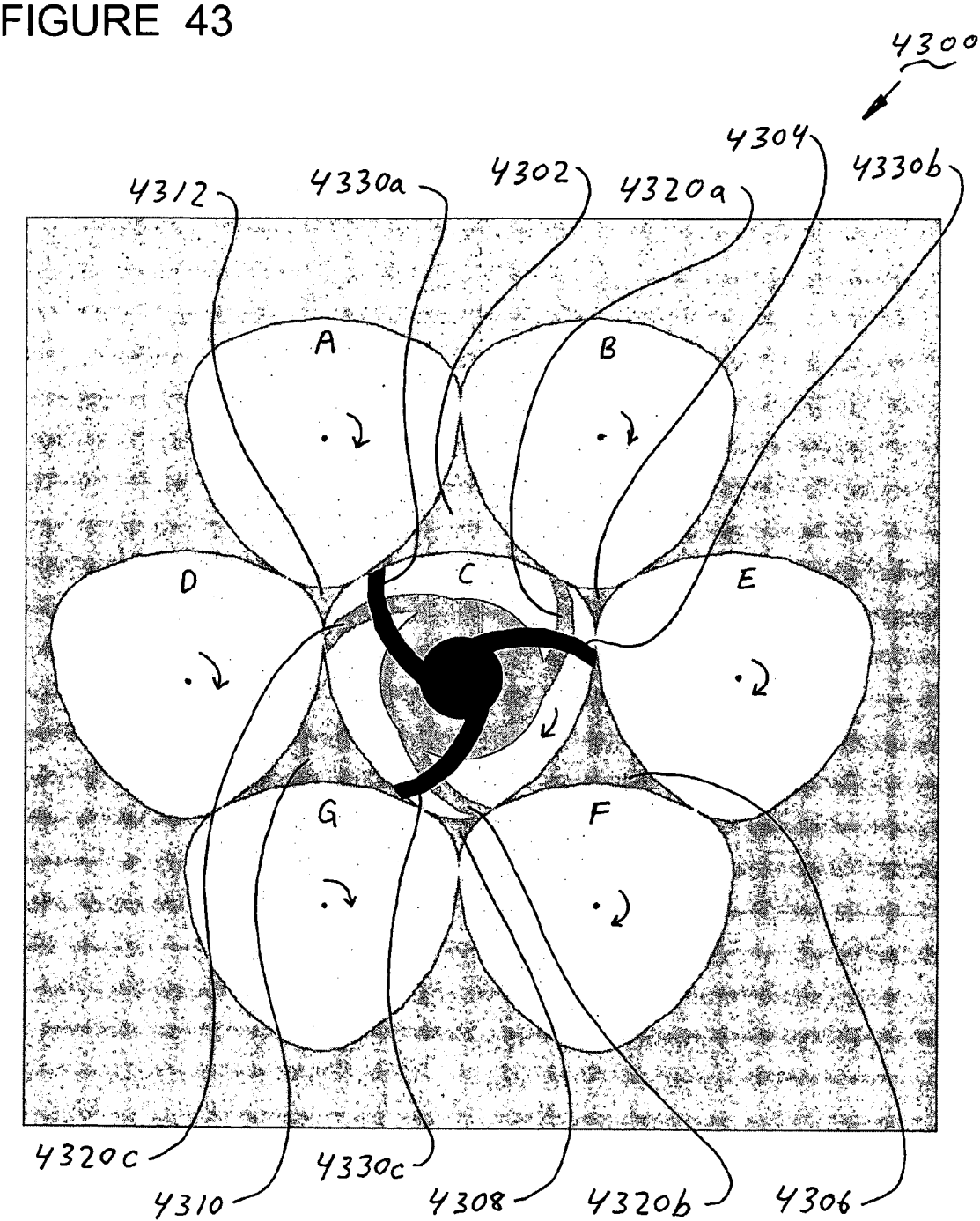
FIG. 43 illustrates a pump according to one embodiment.

FIG. 43 illustrates a pump according to one embodiment. With reference to FIG. 43, an arrangement of geometrical elements and passageways illustrates a pump generally at 4300. In one embodiment, for the purpose of illustration only, the geometrical elements A, B, C, D, E, F, and G are designed according to the principles described in conjunction with FIG. 8. However, embodiments are not limited to the geometrical element described in conjunction with FIG. 8; other geometrical elements can be used in arrangements configured to act as a pump, compressor, etc. As used herein and as described previously, arrangements of geometrical elements pump fluids as well as compress gases.

In the embodiment illustrated in FIG. 43, it will be noted that opposite chambers are out of phase with each other. For example, when a chamber 4302 is at a maximum volume position, an opposite chamber 4308 is at a minimum volume position. Similarly, a chamber 4310 is at a maximum volume position and a chamber 4304 is at a minimum volume position. A chamber 4306 is at a maximum volume position and a chamber 4312 is at a minimum volume position. In one embodiment, an arrangement of passageways is provided to permit fluid or gas to flow into a chamber when the volume of the chamber is increasing and to flow out of a chamber when the volume of a chamber is decreasing.

In one embodiment, common element "C" is configured with three passageways that permit inflow, 4320a, 4320b, and 4320c and three passageways that permit outflow, 4330a, 4330b, and 4330c. The passageways are placed in the common element to coincide with the volume dependencies of the chambers. For example, as the geometrical elements rotate clockwise, as indicated by the arrows, passageway 4330a is coming into fluidic communication with the chamber 4302. The chamber 4302 will start to decrease in volume thereby permitting outflow from the chamber 4302 via passageway 4330a. The opposing chamber 4308 will experience an increase in volume due to further clockwise rotation of the geometrical elements. Inflow into the chamber 4308 will occur through the passageway 4320b as the volume of the chamber 4308 increases. The other two pairs of passageways will permit inflow and outflow to and from the respective chambers as the geometrical elements experience synchronized rotation. In other embodiments, passageways in fluidic communication with the chambers can also be located in a housing (not shown).

Figure 44:
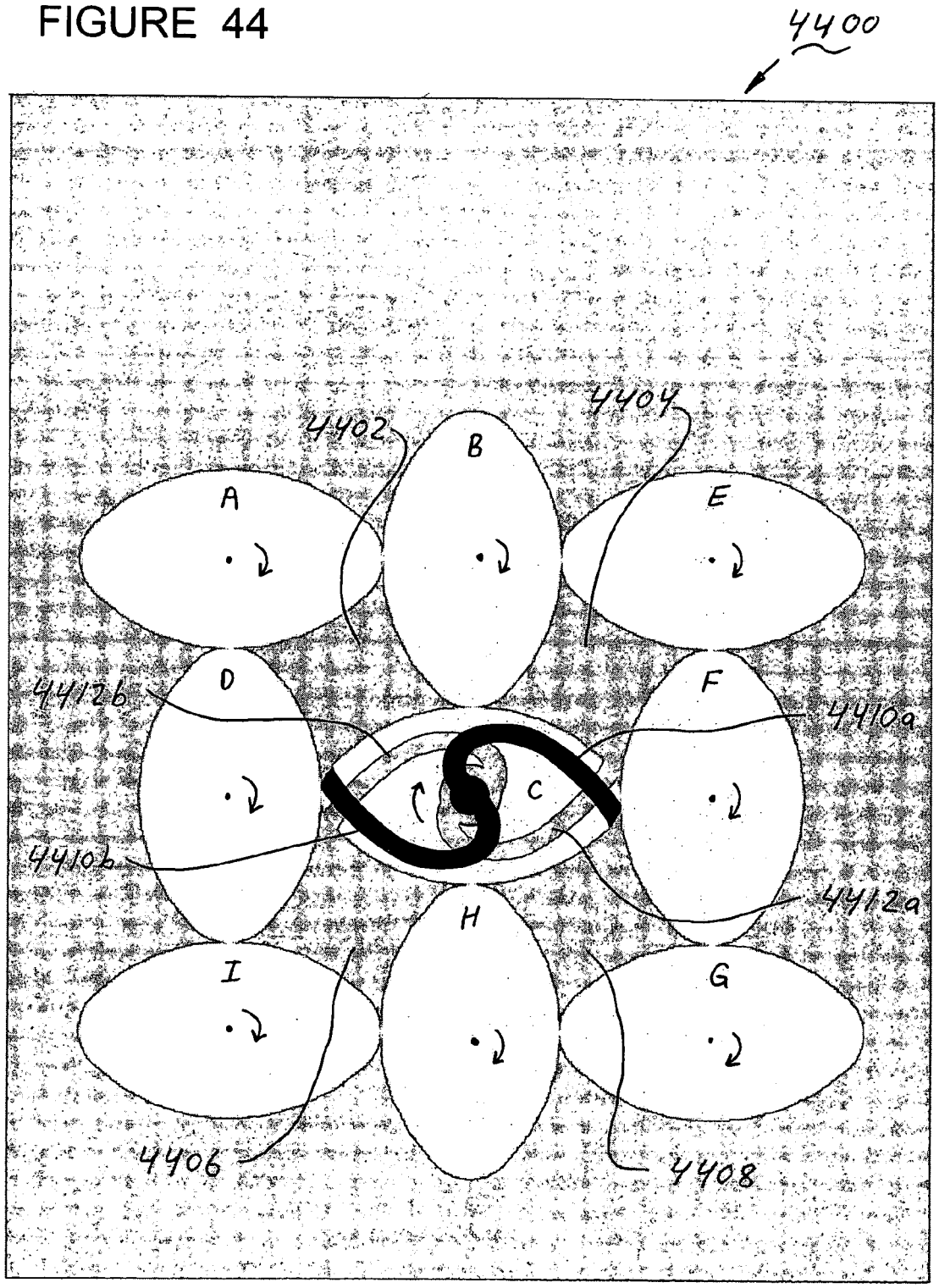
FIG. 44 illustrates a pump according to another embodiment.

FIG. 44 illustrates a pump generally at 4400, according to another embodiment. With reference to FIG. 44, an arrangement of geometrical elements A, B, C, D, E, F, G, H, and I are arranged to function as a pump. The geometrical elements illustrated are designed according to the principles described in conjunction with FIG. 15; however, other geometrical elements (such as spherical geometrical elements, hybrid geometrical elements, etc.) can be configured as a pump, compressor, etc. A passageway 4410a and a passageway 4410b permit outflow. A passageway 4412a and a passageway 4412b permit inflow.

It will be noted that diagonal chambers are in phase and that chambers located directly above and below each other are out of phase. For example, a chamber 4402 and a chamber 4408 are in phase with each other; their volumes decrease and increase in unison. Similarly, a chamber 4404 and a chamber 4406 are in phase with each other; their volumes decrease and increase in unison. The chamber 4402 and the chamber 4406 are out of phase with each other. Similarly, the chamber 4404 and the chamber 4408 are out of phase with each other. The passageways are placed within the geometrical element "C" to permit material to flow into a chamber whose volume is increasing, such as the chamber 4404 and the chamber 4406, and to flow out of a chamber whose volume is decreasing, such as the chamber 4402 and the chamber 4408. It will be noted that the pump direction can be changed to reverse flow through the system without loss of efficiency.

In other embodiments, a pump or a compressor can be configured by scaling geometrical elements to increase a number of chambers in a system as described above in conjunction with the preceding figures. In other embodiments, pumps can be combined with motors or engines by utilizing the teachings presented herein.

For example, in one embodiment a pump is created with geometrical elements and chambers utilizing the principles described in conjunction with FIG. 22 through FIG. 27C. Referring back to FIG. 27C, the shaft 2772 can be rotated by an electric motor (not shown) contained within the sphere of assembly 2712 (FIG. 27B). In various embodiments, the electric motor can have its source of electrical power contained within assembly 2712 or a connection can be provided to an external source of electrical power.

Pumps or compressors constructed with rotating geometrical elements, designed and configured according to the teachings presented herein, can be employed in a variety of uses. Some of the uses are, but are not limited to, an artificial heart pump, a water pump, a sludge pump, an air pump, a compressor, etc.

In another embodiment, an internal combustion engine, constructed from rotating geometrical elements, is used to power a pump that is constructed from rotating geometrical elements. The two arrangements of geometrical elements (engine and pump) can be configured to be proximate to each other and can share common structures that provide for synchronized rotation of the geometrical elements. In other embodiments, the two arrangements of geometrical elements (engine and pump) can be configured individually for synchronized rotation where the two arrangements revolve at two different rotational speeds. As is known to those of skill in the art, structures utilizing gears, belts, pulleys, etc. can be used to provide for the different rotational speeds of the arrangements of geometrical elements.

In various embodiments, internal combustion engines are made with arrangements of rotating geometrical elements, according to the teachings presented herein. An internal combustion engine constructed with rotating geometrical elements, as previously described, does not expend energy translating a geometrical element. The geometrical elements experience a state of pure rotation about their respective axes.

In various embodiments, intake and exhaust from chambers formed with rotating geometrical elements have been described with the use of passageways incorporated into the rotating geometrical elements. Flow into and/or out of a plurality of chambers via a passageway(s) incorporated into the geometrical element(s) services the plurality of chambers and provides a state of uniform flow into and/or out of the chambers when used without external valves. Incorporating passageways into the rotating geometrical elements permits the neighboring chambers to be serviced by the passageways as required during the rotation of the geometrical elements. The power or pumping strokes (depending on the type of system created with the geometrical elements) are evenly distributed along each revolution of the geometrical elements. In other embodiments, one or more valves are configured with the housing and/or geometrical elements to control the flow into and/or out of the chambers.

Some uses of geometrical elements configured as an internal combustion engine are, but are not limited to, lawn care equipment, vehicles for human transportation (motor cycles, cars, trucks, buses, airplanes, hover crafts, etc.), construction equipment, etc.

It will be noted by those of skill in the art, that other circumferential shapes for geometrical elements can be used to create chambers in light of the teachings presented within this description. Accordingly, all of these other circumferential shapes are within the scope contemplated by this description and this description is not limited to the circumferential shapes illustrated herein.

For purposes of discussing and understanding this description, it is to be understood that various terms are used by those knowledgeable in the art to describe techniques and approaches. Furthermore, in this description for purposes of explanation, numerous specific details are set forth in order to provide a thorough understanding. It will be evident, however, to one of ordinary skill in the art that embodiments of the invention may be practiced without these specific details. In some instances, well-known structures and devices are shown in simplified form, rather than in detail, in order to avoid obscuring embodiments of the invention. These embodiments are described in sufficient detail to enable those of ordinary skill in the art to practice the invention, and it is to be understood that other embodiments may be utilized and that logical, mechanical, electrical, and other changes may be made without departing from the scope of the invention.

As used in this description, "one embodiment" or "an embodiment" or similar phrases mean that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. Thus, the description is to be regarded as illustrative instead of limiting and the scope of the invention is defined only by the appended claims.

What is claimed is:

1. An apparatus comprising:
   a housing;
   three geometrical elements, the three geometrical elements and the housing form a first chamber, the three geometrical elements are configured for synchronized rotation and a continuous portion of the first chamber, defined by the three geometrical elements, permits a volume of the first chamber to be varied;
   wherein the volume of the first chamber is a function of rotation of the three geometrical elements; and
   three additional geometrical elements, the three additional geometrical elements are configured with the three geometrical elements to form a second chamber, a third chamber, a fourth chamber, a fifth chamber, a sixth chamber, a seventh, and an eight chamber, wherein each of the geometrical elements contributes to forming a part of four chambers;
   wherein a first common geometrical element, which is one of the three geometrical elements, contributes to forming a first set of four of the eight chambers and a second common geometrical element, which is one of the three additional geometrical elements, contributes to forming a second set of four of the eight chambers.

2. An apparatus comprising:

a housing;

three geometrical elements, the three geometrical elements and the housing form a first chamber, the three geometrical elements are configured for synchronized rotation and a continuous portion of the first chamber, defined by the three geometrical elements, permits a volume of the first chamber to be varied;

wherein the volume of the first chamber is a function of rotation of the three geometrical elements; and three additional geometrical elements, the three additional geometrical elements are configured with the three geometrical elements to form a second chamber, a third chamber, a fourth chamber, a fifth chamber, a sixth chamber, a seventh, and an eight chamber, wherein each of the geometrical elements contributes to forming a part of four chambers;

wherein a first common geometrical element, which is one of the three geometrical elements, contributes to forming a first set of four of the eight chambers and a second common geometrical element, which is one of the three additional geometrical elements, contributes to forming a second set of four of the eight chambers;

wherein the first common geometrical element provides fluidic coupling with a chamber through a passageway.

3. An apparatus comprising:

a housing;

three geometrical elements, the three geometrical elements and the housing form a first chamber, the three geometrical elements are configured for synchronized rotation and a continuous portion of the first chamber, defined by the three geometrical elements, permits a volume of the first chamber to be varied;

wherein the volume of the first chamber is a function of rotation of the three geometrical elements; and three additional geometrical elements, the three additional geometrical elements are configured with the three geometrical elements to form a second chamber, a third chamber, a fourth chamber, a fifth chamber, a sixth chamber, a seventh, and an eight chamber, wherein each of the geometrical elements contributes to forming a part of four chambers;

wherein a first common geometrical element, which is one of the three geometrical elements, contributes to forming a first set of four of the eight chambers and a second common geometrical element, which is one of the three additional geometrical elements, contributes to forming a second set of four of the eight chambers;

wherein the second common geometrical element provides fluidic coupling with a chamber through a passageway.

\* \* \* \* \*